(12) United States Patent
Jeong et al.

(10) Patent No.: US 11,808,889 B2
(45) Date of Patent: Nov. 7, 2023

(54) LIDAR DEVICE

(71) Applicant: SOS LAB CO., LTD, Gwangju (KR)

(72) Inventors: Ji Seong Jeong, Gwangju (KR); Jun Hwan Jang, Seoul (KR); Dong Kyu Kim, Jinju-si (KR); Sung Hi Hwang, Jeollanam-do (KR)

(73) Assignee: SOS LAB Co., Ltd., Gwangju (KR)

( * ) Notice: Subject to any disclaimer, the term of this patent is extended or adjusted under 35 U.S.C. 154(b) by 932 days.

(21) Appl. No.: 16/709,729

(22) Filed: Dec. 10, 2019

(65) Prior Publication Data

US 2020/0241118 A1 Jul. 30, 2020

Related U.S. Application Data

(63) Continuation of application No. 16/240,512, filed on Jan. 4, 2019.
(Continued)

(30) Foreign Application Priority Data

Jan. 8, 2018 (KR) .................. 10-2018-0002494
Mar. 6, 2018 (KR) .................. 10-2018-0026560
(Continued)

(51) Int. Cl.
*G01S 7/481* (2006.01)
*G01S 17/08* (2006.01)
*G01S 17/42* (2006.01)

(52) U.S. Cl.
CPC ............ *G01S 7/4817* (2013.01); *G01S 17/08* (2013.01); *G01S 17/42* (2013.01)

(58) Field of Classification Search
CPC ...... G01S 7/4808; G01S 7/481; G01S 7/4817; G01S 17/08; G01S 17/42; G01S 17/89; G02B 5/09
See application file for complete search history.

(56) References Cited

U.S. PATENT DOCUMENTS 3,944,323 A 3/1976 Starkweather
5,006,721 A 4/1991 Cameron et al.
(Continued)

FOREIGN PATENT DOCUMENTS

CN 101071285 A 11/2007
CN 107272212 A 10/2017
(Continued)

OTHER PUBLICATIONS

United States Office Action, U.S. Appl. No. 16/291,813, filed Oct. 31, 2019, 16 pages.
(Continued)

*Primary Examiner* — Yuqing Xiao
*Assistant Examiner* — Benjamin Richard Hebert
(74) *Attorney, Agent, or Firm* — Knobbe Martens Olson & Bear LLP

(57) ABSTRACT

The present invention relates to a light detecting and ranging (LiDAR) device for obtaining information on a distance from an object using laser light. A light detection and ranging (LiDAR) device according to the present invention may include: a laser emitting unit configured to emit a laser, a first scanner configured to obtain the laser emitted by the laser emitting unit and continuously change a travel path of the laser so as to extend a irradiation area to a line shape, a second scanner configured to obtain and continuously changes the travel path of the laser projected from the first scanner which has a line-shaped irradiation area, so as to extend the irradiation area to a plane shape, and a sensor configured to detect a laser reflected from an object located in a scanning area by the laser projected from the second scanner, wherein the first scanner comprises nodding mirror which extend the irradiation area to a line shape by changing a travel path of the laser while nodding within a preset angle range, and wherein the second scanner comprises a rotating
(Continued)

polygon mirror which changes the travel path of the laser which has the line-shaped irradiation area by rotating on one axis so as to extend the irradiation area to a plane shape.

12 Claims, 43 Drawing Sheets

Related U.S. Application Data

(60) Provisional application No. 62/671,305, filed on May 14, 2018.

(30) Foreign Application Priority Data

| Mar. 8, 2018 | (KR) | 10-2018-0027385 |
|---|---|---|
| Jul. 13, 2018 | (KR) | 10-2018-0081896 |
| Aug. 16, 2018 | (KR) | 10-2018-0095385 |
| Oct. 22, 2018 | (KR) | 10-2018-0126278 |

(56) References Cited

U.S. PATENT DOCUMENTS

| 5,268,565 | A | 12/1993 | Katoh et al. |
|---|---|---|---|
| 5,493,388 | A | 2/1996 | Adachi |
| 6,104,524 | A | 8/2000 | Hisano et al. |
| 6,304,321 | B1 | 10/2001 | Wangler et al. |
| 6,317,202 | B1 | 11/2001 | Hosokawa et al. |
| 7,235,778 | B2* | 6/2007 | Asai ............... G02B 26/0833 |
| | | | 250/235 |
| 8,619,237 | B2 | 12/2013 | Hillman et al. |
| 10,133,144 | B2 | 11/2018 | Inada et al. |
| 10,261,389 | B2 | 4/2019 | Skirlo et al. |
| 10,324,170 | B1 | 6/2019 | Engberg, Jr. et al. |
| 10,408,416 | B2 | 9/2019 | Khorasaninejad et al. |
| 10,422,990 | B2 | 9/2019 | Inada et al. |
| 10,557,924 | B1 | 2/2020 | Jang et al. |
| 10,578,721 | B2 | 3/2020 | Jang et al. |
| 10,591,598 | B2 | 3/2020 | Jeong et al. |
| 10,613,224 | B2 | 4/2020 | Jeong et al. |
| 10,705,190 | B2 | 7/2020 | Jang et al. |
| 11,493,630 | B2 | 11/2022 | Jeong et al. |
| 2003/0043364 | A1 | 3/2003 | Jamieson et al. |
| 2004/0036630 | A1 | 2/2004 | Jamieson et al. |
| 2005/0173770 | A1 | 8/2005 | Linden et al. |
| 2005/0179976 | A1 | 8/2005 | Davis et al. |
| 2005/0219504 | A1 | 10/2005 | Adachi et al. |
| 2005/0280879 | A1 | 12/2005 | Gibson et al. |
| 2006/0169880 | A1 | 8/2006 | Asai |
| 2007/0023621 | A1 | 2/2007 | Blick et al. |
| 2007/0071056 | A1 | 3/2007 | Chen |
| 2008/0174845 | A1 | 7/2008 | Shikii et al. |
| 2009/0004151 | A1 | 1/2009 | Abediasl |
| 2009/0073417 | A1 | 3/2009 | Urata et al. |
| 2009/0321633 | A1 | 12/2009 | Blick et al. |
| 2010/0002278 | A1 | 1/2010 | Maeno et al. |
| 2011/0204327 | A1 | 8/2011 | Hiruma et al. |
| 2011/0248880 | A1* | 10/2011 | Miyahara ............... G01S 7/4802 |
| | | | 342/54 |
| 2012/0140240 | A1 | 6/2012 | Hillman et al. |
| 2012/0273662 | A1 | 11/2012 | Caldwell et al. |
| 2013/0313517 | A1 | 11/2013 | Choi |
| 2014/0078514 | A1 | 3/2014 | Zhu |
| 2014/0224989 | A1 | 8/2014 | Long et al. |
| 2014/0233599 | A1 | 8/2014 | Park et al. |
| 2014/0286367 | A1 | 9/2014 | Scofield et al. |
| 2015/0131080 | A1 | 5/2015 | Retterath et al. |
| 2015/0219764 | A1 | 8/2015 | Lipson |
| 2015/0293225 | A1* | 10/2015 | Riley .................... G05D 1/104 |
| | | | 356/4.01 |
| 2015/0346340 | A1 | 12/2015 | Yaacobi et al. |
| 2016/0266242 | A1 | 9/2016 | Gilliland et al. |
| 2016/0341399 | A1 | 11/2016 | Raz et al. |
| 2017/0082263 | A1 | 3/2017 | Byrnes et al. |
| 2017/0153528 | A1 | 6/2017 | Kim et al. |
| 2017/0184705 | A1* | 6/2017 | Fujii ........................ G01S 17/08 |
| 2017/0235126 | A1 | 8/2017 | DiDomenico |
| 2017/0242103 | A1 | 8/2017 | Dussan |
| 2017/0287151 | A1 | 10/2017 | Han et al. |
| 2017/0358204 | A1 | 12/2017 | Modica et al. |
| 2018/0039102 | A1 | 2/2018 | Baik et al. |
| 2018/0045953 | A1 | 2/2018 | Fan et al. |
| 2018/0059221 | A1 | 3/2018 | Slobodyanyuk et al. |
| 2018/0059408 | A1* | 3/2018 | Murayama ........... H04N 1/0283 |
| 2018/0062341 | A1 | 3/2018 | Kim et al. |
| 2018/0107157 | A1 | 4/2018 | Park et al. |
| 2018/0113200 | A1 | 4/2018 | Steinberg et al. |
| 2018/0120434 | A1 | 5/2018 | Jeong et al. |
| 2018/0129866 | A1 | 5/2018 | Hicks et al. |
| 2018/0216797 | A1 | 8/2018 | Khorasaninejad et al. |
| 2018/0224574 | A1 | 8/2018 | Lee et al. |
| 2018/0252857 | A1 | 9/2018 | Glik et al. |
| 2018/0284237 | A1 | 10/2018 | Campbell et al. |
| 2018/0301875 | A1 | 10/2018 | Burroughs et al. |
| 2018/0332677 | A1 | 11/2018 | Ku et al. |
| 2019/0004151 | A1 | 1/2019 | Abediasl et al. |
| 2019/0011556 | A1 | 1/2019 | Pacala et al. |
| 2019/0025409 | A1* | 1/2019 | Kawazoe ............... G01S 7/4817 |
| 2019/0025509 | A1 | 1/2019 | Kim et al. |
| 2019/0041500 | A1 | 2/2019 | Isono |
| 2019/0107623 | A1* | 4/2019 | Campbell ............. G01S 17/931 |
| 2019/0137075 | A1 | 5/2019 | Aieta et al. |
| 2019/0154816 | A1* | 5/2019 | Hughes ................... G01S 7/497 |
| 2019/0154877 | A1 | 5/2019 | Capasso et al. |
| 2019/0183635 | A1 | 6/2019 | MacInnis |
| 2019/0196068 | A1 | 6/2019 | Tsai et al. |
| 2019/0204423 | A1 | 7/2019 | O'Keeffe |
| 2019/0212419 | A1 | 7/2019 | Jeong et al. |
| 2019/0235060 | A1 | 8/2019 | Iwasawa et al. |
| 2019/0243208 | A1 | 8/2019 | Peng et al. |
| 2019/0256995 | A1 | 8/2019 | Leach et al. |
| 2019/0271769 | A1 | 9/2019 | Raly et al. |
| 2019/0293765 | A1 | 9/2019 | Jeong et al. |
| 2019/0302022 | A1 | 10/2019 | Sun et al. |
| 2019/0302325 | A1 | 10/2019 | Sorbel et al. |
| 2019/0310351 | A1 | 10/2019 | Hughes et al. |
| 2019/0317011 | A1 | 10/2019 | Hu |
| 2020/0319316 | A1 | 10/2020 | Jang et al. |
| 2023/0045515 | A1 | 2/2023 | Jeong et al. |

FOREIGN PATENT DOCUMENTS

| JP | H01-133017 A | 5/1989 |
|---|---|---|
| JP | H 01-262520 A | 10/1989 |
| JP | H07-72239 A | 3/1995 |
| JP | H08184673 A | 7/1996 |
| JP | 2000009422 A * | 1/2000 |
| JP | 2004317134 A * | 11/2004 |
| JP | 2005-107070 A | 4/2005 |
| JP | 2008-298520 A | 12/2008 |
| JP | 2009-033656 A | 2/2009 |
| JP | 2009-098111 A | 5/2009 |
| JP | 2010-071725 A | 4/2010 |
| JP | 2011-160433 A | 8/2011 |
| JP | 2011-203122 A | 10/2011 |
| JP | 2011-257193 A | 12/2011 |
| JP | 2014-161899 A | 9/2014 |
| JP | 2014-235075 A | 12/2014 |
| JP | 2015-178975 A | 10/2015 |
| JP | 2016-033482 A | 3/2016 |
| JP | 2017-090144 A | 5/2017 |
| JP | 2018-005183 A | 1/2018 |
| KR | 2001-0081616 A | 8/2001 |
| KR | 10-2014-0025041 A | 3/2014 |
| KR | 10-2015-0004743 A | 1/2015 |
| KR | 10-2016-0096454 A | 8/2016 |
| KR | 10-1687994 B1 | 12/2016 |
| KR | 10-2017-0069702 A | 6/2017 |
| KR | 10-2017-0104879 A | 9/2017 |
| KR | 10-2018-0013598 A | 2/2018 |
| KR | 10-2018-0051225 A | 5/2018 |
| KR | 10-1887477 B1 | 8/2018 |
| KR | 10-2019-0011497 A | 2/2019 |

(56) References Cited

FOREIGN PATENT DOCUMENTS

| KR | 10-1947404 B1 | 2/2019 |
|---|---|---|
| KR | 10-1979374 B1 | 5/2019 |
| KR | 10-2009025 B1 | 8/2019 |
| KR | 10-2019-0130495 A | 11/2019 |
| WO | WO 2016/168173 A1 | 10/2016 |
| WO | WO 2017/143217 A1 | 8/2017 |
| WO | WO 2017/168500 A1 | 10/2017 |

OTHER PUBLICATIONS

United States Office Action, U.S. Appl. No. 16/240,512, filed Jan. 13, 2021, 22 pages.
European Patent Office, Extended European Search Report, European Patent Application No. 18898056.9, dated Sep. 10, 2021, eight pages.
PCT International Search Report and Written Opinion, PCT Application No. PCT/KR2018/014921, dated Mar. 6, 2019, 22 pages.
PCT International Search Report and Written Opinion, PCT Application No. PCT/KR2018/014923, dated Mar. 6, 2019, 19 pages.
Korean Intellectual Property Office, Notice of Final Rejection, Korean Patent Application No. 10-2018-0026560, dated Apr. 20, 2020, eight pages.
Korean Intellectual Property Office, Notification of Reason for Refusal, Korean Patent Application No. 10-2018-0027385, dated Dec. 22, 2019, 12 pages.
Korean Intellectual Property Office, Notice of Allowance, Korean Patent Application No. 10-2018-0027385, dated Aug. 4, 2020, 10 pages.
Korean Intellectual Property Office, Grant of Patent, Korean Patent Application No. 10-2018-0026560, dated Nov. 23, 2020, five pages.
Korean Intellectual Property Office, Notice of Allowance, Korean Patent Application No. 10-2018-0002494, dated Nov. 22, 2019, five pages.
Korean Intellectual Property Office, Office Action, Korean Patent Application No. 10-2018-0026560, dated Nov. 19, 2019, 12 pages.
United States Office Action, U.S. Appl. No. 16/455,645, filed Oct. 9, 2019, 9 pages.
Chinese Office Action, re CN Application No. 201811224331.8, dated Oct. 9, 2022.
Chinese Office Action, re CN Application No. 201910130712.8, dated Nov. 2, 2022.
Chinese Office Action, re CN Application No. 201910167782.0, dated Nov. 16, 2022.
International Search Report and Written Opinion, re PCT Application No. PCT/KR2019/010954, dated Dec. 19, 2019, 14 pages.
International Search Report and Written Opinion, re PCT Application No. PCT/KR2020/011860, dated Dec. 18, 2020, 17 pages.
Korean Notice of Allowance, KR Application No. 10-2018-0002494, dated Nov. 22, 2019, 5 pages.
Korean Notice of Allowance, KR Application No. 10-2018-0095385, dated May 30, 2019, 2 pages.
Korean Office Action, KR Application No. 10-2018-013972, dated Feb. 7, 2019, 11 pages.
Korean Office Action, KR Application No. 10-2018-0143975, dated Sep. 23, 2019, 11 pages.
Korean Notice of Allowance, KR Application No. 10-2018-0143975, dated Aug. 4, 2020, 2 pages.
Korean Notification of Reason for Refusal, KR Application No. 10-2019-0017433, dated May 7, 2020, 12 pages.
Korean Notice of Allowance, KR Application No. 10-2010-0112473, dated Apr. 20, 2021.
Korean Notice of Allowance, KR Application No. 10-2020-0146383, dated May 25, 2022.
U.S. Office Action, re U.S. Appl. No. 16/240,512, dated Jan. 13, 2021, 22 pages.
U.S. Notice of Allowance, re U.S. Appl. No. 16/240,512, dated Aug. 12, 2022.
U.S. Office Action, U.S. Appl. No. 17/949,443, dated Jan. 12, 2023, 20 pages.

* cited by examiner

8500

LIDAR DEVICE

CROSS-REFERENCE TO RELATED APPLICATIONS

This application is a continuation application of U.S. patent application Ser. No. 16/240,512 filed on Jan. 4, 2019, which claims priority under 35 U.S.C. 119(e) to U.S. provisional application No. 62/671,305 filed on May 14, 2018 and claims priority under 35 U.S.C. 119(a) to Republic of Korea patent application no. 10-2018-0002494 filed on Jan. 8, 2018, Republic of Korea patent application no. 10-2018-0026560 filed on Mar. 6, 2018, Republic of Korea patent application no. 10-2018-0027385 filed on Mar. 8, 2018, Republic of Korea patent application no. 10-2018-0095385 filed on Aug. 16, 2018, Republic of Korea patent application no. 10-2018-0081896 filed on Jul. 13, 2018, and Republic of Korea Patent application no. 10-2018-0126278 filed on Oct. 22, 2018, which are incorporated by reference herein in their entirety.

TECHNICAL FIELD

The present invention relates to a light detecting and ranging (LiDAR) device for obtaining information on a distance from an object using laser light, and more particularly, to a lidar device for obtaining distance information by irradiating a scan field with laser light and sensing laser light reflected from an object present within the scan field.

BACKGROUND

A light detecting and ranging (LiDAR) device is a device for detecting a distance from an object using laser light. Also, the lidar device is a device capable of generating a point cloud using laser light and obtaining location information on an object present in the vicinity of the lidar device. Research on meteorological observation, three dimensional (3D) mapping, autonomous driving vehicles, autonomous driving drones, unmanned robotic sensors, and the like using the lidar device have been actively carried out.

Using a conventional lidar device, a scan field has been expanded by mechanically rotating the lidar device itself or using a diffusing lens. However, when the lidar device itself is mechanically rotated, there has been a thermal problem that occurs in multiple rays of laser light or a problem in terms of stability, durability, or the like due to the mechanical rotation. Also, in the case of the lidar device that expands a scan field using a diffusing lens, there has been a problem in that a measured distance decreases due to laser light diffusion.

In recent years, to solve such problems, a scan field may be expanded without mechanical rotation of a lidar device itself, and research for improving performance of the lidar device has been continuously carried out.

SUMMARY

A problem to be solve according to an embodiment relates to a light detecting and ranging (LiDAR) device which may have a desired scan field just by using laser light in a single channel.

A problem to be solved according to another embodiment relates to a lidar device capable of, without diffusing laser light, detecting an object located at a longer distance using minimum power.

A problem to be solved according to still another embodiment relates to a lidar device capable of detecting an object located at a longer distance using minimum power by increasing an amount of received laser light.

A problem to be solved according to yet another embodiment relates to a lidar device capable of efficiently detecting an object by arranging a nodding mirror.

A problem to be solved according to yet another embodiment relates to a lidar device capable of generating various scan patterns.

Problems to be solved by the present invention are not limited to those mentioned above, and other unmentioned problems should be clearly understood by those of ordinary skill in the art to which the present invention pertains from the present specification and the accompanying drawings.

According to an embodiment, a lidar device includes a laser emitting unit which emits a laser, a first scanner which obtains the laser emitted by the laser emitting unit and continuously changes a travel path of the laser so as to extend a irradiation area to a line shape, a second scanner which obtains and continuously changes the travel path of the laser projected from the first scanner which has a line-shaped irradiation area, so as to extend the irradiation area to a plane shape, and a sensor which detects a laser reflected from an object located in a scanning area by the laser projected from the second scanner, wherein the first scanner comprises nodding mirror which extend the irradiation area to a line shape by changing a travel path of the laser while nodding within a preset angle range, and wherein the second scanner comprises a rotating polygon mirror which changes the travel path of the laser which has the line-shaped irradiation area by rotating on one axis so as to extend the irradiation area to a plane shape.

According to another embodiment, a lidar device a laser emitting unit which emits a laser, a first scanner which obtains the laser emitted by the laser emitting unit and continuously changes a travel path of the laser so as to extend a irradiation area to a line shape, a second scanner which obtains and continuously changes the travel path of the laser projected from the first scanner which has a line-shaped irradiation area, so as to extend the irradiation area to a plane shape, and a sensor which detects a laser reflected from an object located in a scanning area by the laser projected from the second scanner, wherein the LiDAR device includes irradiation path which is route of emitted laser from the laser emitting unit to the object which is placed in the scanning area and reception path which is route of reflected laser from the object to the sensor, wherein the irradiation path is set to toward the scanning area sequentially through the first scanner and the second scanner, wherein the reception path is set to toward the sensor through only the second scanner among the first scanner and the second scanner.

According to still another embodiment, a rotating polygon mirror used in a lidar device includes a body which is coupled to a driving unit and receives a driving force to rotate by the driving unit, and a reflecting surface for reflecting a received laser, wherein the body includes upper part, lower part and connection part connecting the upper part and the lower part, wherein the body rotates around a rotating shaft passing vertically through the center of the upper part and the lower part, wherein the reflecting surface is located on a side part excluding the upper and lower part of the body and includes irradiation portion which acquires an emitted laser for distance measurement and reflects the laser to a scanning area and reception portion which acquires a laser reflected by an object located in the scanning area and reflects the laser According to yet another embodiment, a lidar device includes a laser light emitting unit configured to output laser light, a scanner configured to obtain and reflect the laser light output from the laser light emitting unit and continuously change a traveling path of the laser light to expand an irradiation field of the laser light, and a sensor configured to detect laser light reflected from an object located in a scan field, wherein the scanner includes a nodding mirror, the nodding mirror nods within a preset angle range, wherein the preset angle refers to an angle at which the nodding mirror nods from an offset state, the nodding mirror includes a reflective surface configured to change a traveling path of the laser light to expand an irradiation field of the laser light, and the reflective surface has a size that is less than or equal to the maximum diameter of the laser light output from the laser light emitting unit.

According to yet another embodiment, a lidar device includes a laser light emitting unit configured to output laser light, a first scanner configured to obtain the laser light output from the laser light emitting unit and continuously change a traveling path of the laser light to expand an irradiation field of the laser light in the form of a line, a second scanner configured to obtain the laser light whose irradiation field is in the form of a line that is irradiated from the first scanner and continuously change a traveling path of the laser light to expand the irradiation field of the laser light in the form of a plane, and a sensor configured to detect laser light reflected from an object located in a scan field, wherein the first scanner includes a nodding mirror, the nodding mirror nods within a preset angle range, wherein the preset angle refers to an angle at which the nodding mirror nods from an offset state, the nodding mirror includes a reflective surface configured to change a traveling path of the laser light to expand an irradiation field of the laser light, the reflective surface has a size that is less than or equal to the maximum diameter of the laser light output from the laser light emitting unit, and the second scanner includes a rotating polygon mirror configured to rotate about one axis set in a vertical direction and change a traveling path of the laser light whose irradiation field is in the form of a vertical line in a horizontal direction to expand the irradiation field in the form of a plane.

According to yet another embodiment, a nodding mirror includes a body configured to nod within a preset angle range, wherein the preset angle refers to an angle at which the nodding mirror nods from an offset state, and a reflective surface configured to reflect the obtained laser light, the reflective surface having a size less than or equal to the maximum diameter of the laser light.

According to yet another embodiment, a lidar device includes a laser light emitting unit configured to output laser light, a scanner configured to obtain and reflect the laser light output from the laser light emitting unit and continuously change a traveling path of the laser light to expand an irradiation field of the laser light, and a sensor configured to detect laser light reflected from an object located in a scan field, wherein the scanner includes a nodding mirror, the nodding mirror nods within a preset angle range, wherein the preset angle refers to an angle at which the nodding mirror nods from an offset state, the nodding mirror includes a reflective surface configured to change a traveling path of the laser light to expand an irradiation field of the laser light, and a maximum distance measurable by the lidar device continuously changes as the nodding mirror nods.

According to yet another embodiment, a lidar device includes a laser light emitting unit configured to output laser light, a scanner configured to irradiate the laser light output from the laser light emitting unit and generate a scan pattern, and a sensor configured to detect laser light reflected from an object included in a scan field, which is a field scannable by the lidar device, wherein a direction of the laser light irradiated from the lidar device includes a horizontal component and a vertical component, the scan pattern shows a repeated form of the direction in which the laser light is irradiated that changes over time, the scan pattern includes a horizontal pattern, which is a pattern in the horizontal direction, and a vertical pattern, which is a pattern in the vertical direction, each of the horizontal pattern and the vertical pattern includes a maximum value, a minimum value, and a cycle in which a field of view is formed repeatedly, the horizontal pattern has a form in which the horizontal component increases over time within the cycle of the horizontal pattern, the vertical pattern has a form in which the vertical component decreases and increases over time within the cycle of the vertical pattern, and the cycle of the horizontal pattern is longer than the cycle of the vertical pattern.

According to yet another embodiment, a lidar device includes a laser light emitting unit configured to output laser light, a scanner configured to irradiate the laser light output from the laser light emitting unit and generate a scan pattern, and a sensor configured to detect laser light reflected from an object included in a scan field, which is a field scannable by the lidar device, wherein a direction of the laser light irradiated from the lidar device includes a horizontal component and a vertical component, the scan pattern shows a repeated form of the direction in which the laser light is irradiated that changes over time, the scan pattern includes a horizontal pattern, which is a pattern in the horizontal direction, and a vertical pattern, which is a pattern in the vertical direction, each of the horizontal pattern and the vertical pattern includes a maximum value, a minimum value, and a cycle in which a field of view is formed repeatedly, the horizontal pattern has a form in which the horizontal component increases over time within the cycle of the horizontal pattern, the vertical pattern has a form in which the vertical component decreases and increases over time within the cycle of the vertical pattern, and the cycle of the vertical pattern is longer than the cycle of the horizontal pattern.

According to yet another embodiment, a lidar device includes a laser light emitting unit configured to output laser light, a first scanner configured to obtain the laser light output from the laser light emitting unit and continuously change a traveling path of the laser light to expand an irradiation field of the laser light in the form of a line, a second scanner configured to obtain the laser light whose irradiation field is in the form of a line that is irradiated from the first scanner and continuously change a traveling path of the laser light to expand the irradiation field of the laser light in the form of a plane, and a sensor configured to detect laser light reflected from an object located within the scan field, wherein the first scanner includes a nodding mirror configured to nod within a preset angle range and change the traveling path of the laser light in a vertical direction to expand the irradiation field of the laser light in the form of a vertical line, the second scanner includes a rotating polygon mirror configured to rotate about one axis set in the vertical direction and change a traveling path of the laser light whose irradiation field is in the form of a vertical line in a horizontal direction to expand the scan field in the form of a plane, and a nodding speed of the nodding mirror is higher than a rotating speed of the rotating polygon mirror.

Means for solving the above-described problems are not limited to those described above, and other unmentioned means for solving the problems should be clearly understood by those of ordinary skill in the art to which the present invention pertains from the present specification and the accompanying drawings.

A lidar device according to an embodiment uses a rotating polygon mirror to expand a scan field so that the scan field can be expanded just by using laser light in a single channel.

A lidar device according to another embodiment changes a traveling direction of laser light to expand a scan field so that an object located at a longer distance can be detected using minimum power.

A lidar device according to still another embodiment uses a rotating polygon mirror to receive light to increase an amount of received laser light so that an object located at a longer distance can be detected using minimum power.

A lidar device according to yet another embodiment uses a difference in amounts of reflected laser light due to arrangement of a nodding mirror so that an object can be efficiently detected.

Advantageous effects of the present invention are not limited to those described above, and other unmentioned advantageous effects should be clearly understood by those of ordinary skill in the art to which the present invention pertains from the present specification and the accompanying drawings.

DETAILED DESCRIPTION

Figure 1:
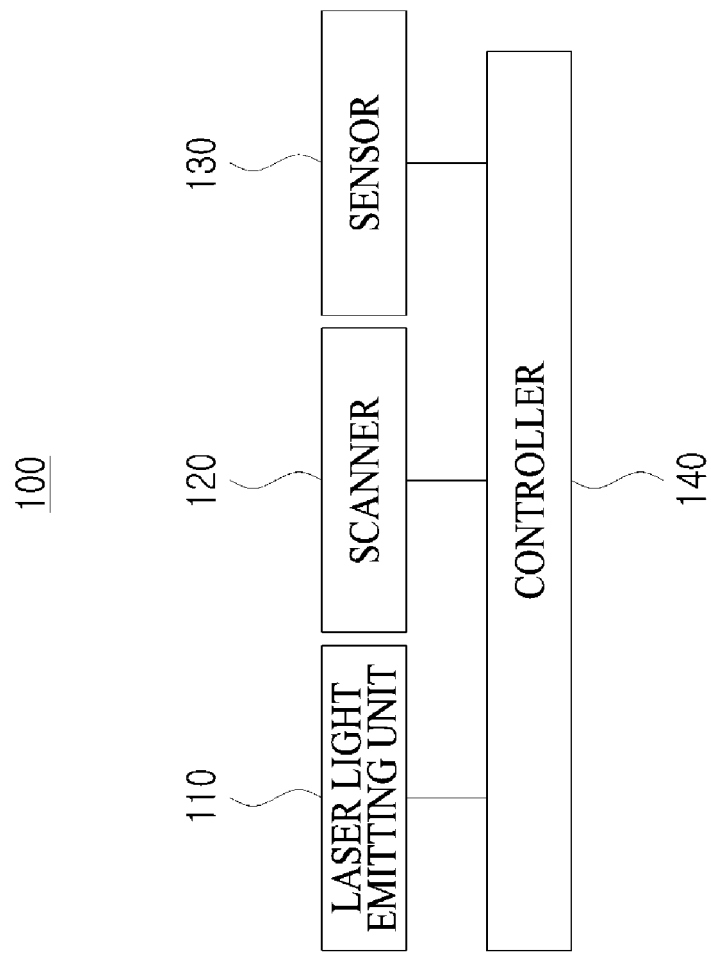
FIG. 1 is a block diagram illustrating a light detecting and ranging (LiDAR) device according to an embodiment.

Embodiments described herein are for clearly describing the idea of the present invention to those of ordinary skill in the art to which the present invention pertains. Therefore, the present invention is not limited to the embodiments described herein, and the scope of the present invention should be interpreted as including changes or modifications that do not depart from the idea of the present invention.

General terms currently widely used have been selected as terms used herein in consideration of functions in the present invention. However, the terms used herein may vary according to intentions or practices of those of ordinary skill in the art to which the present invention pertains or the emergence of new technologies. However, when, unlike the above, a specific term is used by being defined as having an arbitrary meaning, the meaning of the term will be described separately. Therefore, the terms used herein should be interpreted on the basis of content throughout the present specification and substantial meanings of the terms instead of simply the names of the terms.

The accompanying drawings herein are for easily describing the present invention. The shapes illustrated in the drawings may have been exaggerated as necessary to assist understanding of the present invention. Therefore, the present invention is not limited by the drawings.

In the present specification, when it is determined that detailed description of known configurations or functions related to the present invention may obscure the gist of the present invention, the detailed description thereof will be omitted as necessary.

According to an embodiment, there is provided a light detecting and ranging (LiDAR) device for measuring a distance using laser light, the lidar device including a laser emitting unit which emits a laser, a first scanner which obtains the laser emitted by the laser emitting unit and continuously changes a travel path of the laser so as to extend a irradiation area to a line shape, a second scanner which obtains and continuously changes the travel path of the laser projected from the first scanner which has a line-shaped irradiation area, so as to extend the irradiation area to a plane shape, and a sensor which detects a laser reflected from an object located in a scanning area by the laser projected from the second scanner, wherein the first scanner comprises nodding mirror which extend the irradiation area to a line shape by changing a travel path of the laser while nodding within a preset angle range, and wherein the second scanner comprises a rotating polygon mirror which changes the travel path of the laser which has the line-shaped irradiation area by rotating on one axis so as to extend the irradiation area to a plane shape.

Here, the lidar device may have a irradiation path which is route of emitted laser from the laser emitting unit to the object which is placed in the scanning area and reception path which is route of reflected laser from the object to the sensor, wherein the irradiation path is set to toward the scanning area sequentially through the nodding mirror and the rotating polygon mirror, wherein the reception path is set to toward the sensor through only the rotating polygon mirror among the nodding mirror and the rotating polygon mirror.

Here, the rotating polygon mirror may include an irradiation portion which obtains the laser emitted by the first scanner and which reflects toward the scanning area and reception portion which obtains the laser reflected by the object located in the scanning area and which reflects the laser toward the sensor, wherein the irradiation portion is located on the rotating polygon mirror in the shape of a plane extending a line in the direction of rotation of the rotating polygon mirror, wherein the line formed by meeting the irradiation area of the laser projected from the nodding mirror and the rotating polygon mirror, wherein the reception portion is located on the rotating polygon mirror in the shape of a plane extending a portion of the rotating polygon mirror which reflects the laser toward the sensor in the direction of rotation of the rotating polygon mirror.

Here, the irradiation portion of the rotating polygon mirror may be included in the irradiation path, and the light reception portion of the rotating polygon mirror may be included in the light reception path.

Here, a size of the light reception portion of the rotating polygon mirror may be set to be at least larger than a size of the irradiation portion of the rotating polygon mirror.

Here, any one of the irradiation portion and the light reception portion may be located at an upper side of a virtual cross-section which is perpendicular to the rotating shaft of the rotating polygon mirror, and the other one of the irradiation portion and the light reception portion may be located at a lower side of the virtual cross-section which is perpendicular to the rotating shaft of the rotating polygon mirror.

Here, the irradiation portion and the light reception portion may be located spaced apart from each other.

Here, a height of the rotating polygon mirror may be at least larger than a value of the sum of the height of the irradiation portion and the height of the light reception portion of the rotating polygon mirror.

Here, the height of the irradiation portion may be determined on the basis of the preset angle range of the nodding mirror and a distance between the nodding mirror and the rotating polygon mirror.

Here, the height of the light reception portion may be determined on the basis of the size of the sensor.

According to another embodiment, there is provided a rotating polygon mirror used in a lidar device for measuring a distance using laser light, the rotating polygon mirror including a body which is coupled to a driving unit and receives a driving force to rotate by the driving unit, a reflecting surface for reflecting a received laser, wherein the body includes upper part, lower part and connection part connecting the upper part and the lower part, wherein the body rotates around a rotating shaft passing vertically through the center of the upper part and the lower part, wherein the reflecting surface is located on a side part excluding the upper and lower part of the body and includes irradiation portion which acquires an emitted laser for distance measurement and reflects the laser to a scanning area and reception portion which acquires a laser reflected by an object located in the scanning area and reflects the laser.

Here, a size of the light reception portion of the rotating polygon mirror may be at least larger than a size of the irradiation portion of the rotating polygon mirror.

Here, one of the irradiation portion and the reception portion is located on a virtual cross section perpendicular to the rotating shaft of the rotating polygon mirror, and the other is located below the virtual cross section perpendicular to the rotating shaft of the rotating polygon mirror.

Here, a height of the rotating polygon mirror may be at least larger than a value of the sum of the height of the irradiation portion and the height of the light reception portion of the rotating polygon mirror.

According to still another embodiment, there is provided a lidar device for measuring a distance using laser light, the lidar device including a laser emitting unit which emits a laser, a first scanner which obtains the laser emitted by the laser emitting unit and continuously changes a travel path of the laser so as to extend a irradiation area to a line shape, a second scanner which obtains and continuously changes the travel path of the laser projected from the first scanner which has a line-shaped irradiation area, so as to extend the irradiation area to a plane shape, and a sensor which detects a laser reflected from an object located in a scanning area by the laser projected from the second scanner, wherein the LiDAR device includes irradiation path which is route of emitted laser from the laser emitting unit to the object which is placed in the scanning area and reception path which is route of reflected laser from the object to the sensor, wherein the irradiation path is set to toward the scanning area sequentially through the first scanner and the second scanner, wherein the reception path is set to toward the sensor through only the second scanner among the first scanner and the second scanner.

Here, the second scanner may include a rotating polygon mirror which changes the travel path of the laser which has a perpendicular line-shaped irradiation area by rotating on one axis so as to extend the irradiation area to a plane shape.

Here, the rotating polygon mirror may include an irradiation portion which obtains the laser emitted by the first scanner and which reflects toward the scanning area and reception portion which obtains the laser reflected by the object located in the scanning area and which reflects the laser toward the sensor, wherein the rotating polygon mirror includes irradiation portion which obtains and reflects the laser emitted by the first scanner toward the scanning area and reception portion which obtains and reflects the laser reflected by the objet located in the scanning area toward the sensor, wherein the irradiation portion is located on the rotating polygon mirror in the shape of a plane extending a line shaped irradiation area formed by the laser projected from the nodding mirror to meet the rotating polygon mirror in the direction of rotation of the rotating polygon mirror, wherein the reception portion is located on the rotating polygon mirror in the shape of a plane extending a portion of the rotating polygon mirror which reflects the laser toward the sensor in the direction of rotation of the rotating polygon mirror, wherein the irradiation portion is included in the irradiation path, wherein the reception portion is included in the reception path Here, a size of the light reception portion of the rotating polygon mirror may be at least larger than a size of the irradiation portion of the rotating polygon mirror.

Here, any one of the irradiation portion and the light reception portion may be located at an upper side of a virtual cross-section which is perpendicular to the rotating shaft of the rotating polygon mirror, and the other one of the irradiation portion and the light reception portion may be located at a lower side of the virtual cross-section which is perpendicular to the rotating shaft of the rotating polygon mirror.

Here, a height of the rotating polygon mirror may be at least larger than a value of the sum of the height of the irradiation portion and the height of the light reception portion of the rotating polygon mirror, the height of the irradiation portion may be determined on the basis of a distance between the first scanner and the rotating polygon mirror and an angle from the first scanner to the irradiation field, and the height of the light reception portion may be determined on the basis of the size of the sensor.

According to an embodiment, there is provided a lidar device for measuring a distance using laser light, the lidar device including a laser light emitting unit configured to output laser light, a scanner configured to obtain and reflect the laser light output from the laser light emitting unit and continuously change a traveling path of the laser light to expand an irradiation field of the laser light, and a sensor configured to detect laser light reflected from an object located in a scan field, wherein the scanner includes a nodding mirror, the nodding mirror nods within a preset angle range, wherein the preset angle refers to an angle at which the nodding mirror nods from an offset state, the nodding mirror includes a reflective surface configured to change a traveling path of the laser light to expand an irradiation field of the laser light, and the reflective surface has a size that is less than or equal to the maximum diameter of the laser light output from the laser light emitting unit.

Here, an angle "a" between an offset state of the nodding mirror and laser light incident on the nodding mirror may be determined by the equation $\sin(a-b/2)/\sin(a+b/2) > (100-T)/100$, so that a difference between an amount of laser light reflected from the nodding mirror in a state in which the nodding mirror nods at an angle of $-b/2$ from the offset state and an amount of laser light reflected from the nodding mirror in a state in which the nodding mirror nods at an angle of $+b/2$ from the offset state is less than T %.

Here, the angle "a" may be determined to be $(90-b/2)$, wherein "b" refers to the preset angle, so that the laser light output from the laser light emitting unit does not return to the laser light emitting unit.

Here, an angle "a" between an offset state of the nodding mirror and laser light incident on the nodding mirror may be determined by the equation $\sin(a-b/2)/\sin(a+b/2) < (100-U)/100$, so that a difference between an amount of laser light reflected from the nodding mirror in a state in which the nodding mirror nods at an angle of $-b/2$ from the offset state and an amount of laser light reflected from the nodding mirror in a state in which the nodding mirror nods at an angle of $+b/2$ from the offset state exceeds U %.

Here, the preset angle of the nodding mirror may be changed on the basis of a speed of a moving object in which the lidar device is installed.

Here, the preset angle of the nodding mirror may be changed on the basis of one frame of the lidar device.

According to another embodiment, there is provided a lidar device for measuring a distance using laser light, the lidar device including a laser light emitting unit configured to output laser light, a first scanner configured to obtain the laser light output from the laser light emitting unit and continuously change a traveling path of the laser light to expand an irradiation field of the laser light in the form of a line, a second scanner configured to obtain the laser light whose irradiation field is in the form of a line that is irradiated from the first scanner and continuously change a traveling path of the laser light to expand the irradiation field of the laser light in the form of a plane, and a sensor configured to detect laser light reflected from an object located in a scan field, wherein the first scanner includes a nodding mirror, the nodding mirror nods within a preset angle range, wherein the preset angle refers to an angle at which the nodding mirror nods from an offset state, the nodding mirror includes a reflective surface configured to change a traveling path of the laser light to expand an irradiation field of the laser light, the reflective surface has a size that is less than or equal to the maximum diameter of the laser light output from the laser light emitting unit, and the second scanner includes a rotating polygon mirror configured to rotate about one axis set in a vertical direction and change a traveling path of the laser light whose irradiation field is in the form of a vertical line in a horizontal direction to expand the irradiation field in the form of a plane.

Here, an angle "a" between an offset state of the nodding mirror and laser light incident on the nodding mirror may be determined by the equation $\sin(a-b/2)/\sin(a+b/2) > (100-T)/100$, so that a difference between an amount of laser light reflected from the nodding mirror in a state in which the nodding mirror nods at an angle of $-b/2$ from the offset state and an amount of laser light reflected from the nodding mirror in a state in which the nodding mirror nods at an angle of $+b/2$ from the offset state is less than T %.

Here, the angle "a" may be determined to be $(90-b/2)$, wherein "b" refers to the preset angle, so that the laser light output from the laser light emitting unit does not return to the laser light emitting unit.

Here, an angle "a" between an offset state of the nodding mirror and laser light incident on the nodding mirror may be determined by the equation $\sin(a-b/2)/\sin(a+b/2) < (100-U)/100$, so that a difference between an amount of laser light reflected from the nodding mirror in a state in which the nodding mirror nods at an angle of $-b/2$ from the offset state and an amount of laser light reflected from the nodding mirror in a state in which the nodding mirror nods at an angle of $+b/2$ from the offset state exceeds U %.

Here, the preset angle of the nodding mirror may be changed on the basis of a speed of a moving object in which the lidar device is installed.

Here, the preset angle of the nodding mirror may be changed on the basis of rotation of the rotating polygon mirror.

Here, when the number of side surfaces of the rotating polygon mirror is N, the preset angle of the nodding mirror may be changed every 1/N° rotation of the rotating polygon mirror.

According to still another embodiment, there is provided a nodding mirror which obtains laser light inside a lidar device and reflects the laser light to continuously change a traveling path of the laser light inside the lidar device so that an irradiation field of the laser light output from the lidar device to the outside is expanded, the nodding mirror including a body configured to nod within a preset angle range, wherein the preset angle refers to an angle at which the nodding mirror nods from an offset state, and a reflective surface configured to reflect the obtained laser light, the reflective surface having a size less than or equal to the maximum diameter of the laser light.

Here, an angle "a" between an offset state of the nodding mirror and laser light incident on the nodding mirror may be determined by the equation $\sin(a-b/2)/\sin(a+b/2) > (100-T)/100$, so that a difference between an amount of laser light reflected from the nodding mirror in a state in which the nodding mirror nods at an angle of $-b/2$ from the offset state and an amount of laser light reflected from the nodding mirror in a state in which the nodding mirror nods at an angle of $+b/2$ from the offset state is less than T %.

Here, an angle "a" between an offset state of the nodding mirror and laser light incident on the nodding mirror may be determined by the equation $\sin(a-b/2)/\sin(a+b/2) < (100-U)/100$, so that a difference between an amount of laser light reflected from the nodding mirror in a state in which the nodding mirror nods at an angle of $-b/2$ from the offset state and an amount of laser light reflected from the nodding mirror in a state in which the nodding mirror nods at an angle of $+b/2$ from the offset state exceeds U %.

According to yet another embodiment, there is provided a lidar device for measuring a distance using laser light, the lidar device including a laser light emitting unit configured to output laser light, a scanner configured to obtain and reflect the laser light output from the laser light emitting unit and continuously change a traveling path of the laser light to expand an irradiation field of the laser light, and a sensor configured to detect laser light reflected from an object located in a scan field, wherein the scanner includes a nodding mirror, the nodding mirror nods within a preset angle range, wherein the preset angle refers to an angle at which the nodding mirror nods from an offset state, the nodding mirror includes a reflective surface configured to change a traveling path of the laser light to expand an irradiation field of the laser light, and a maximum distance measurable by the lidar device continuously changes as the nodding mirror nods.

According to an embodiment, there is provided a lidar device for measuring a distance using laser, the lidar device including a laser light emitting unit configured to output laser light, a scanner configured to irradiate the laser light output from the laser light emitting unit and generate a scan pattern, and a sensor configured to detect laser light reflected from an object included in a scan field, which is a field scannable by the lidar device, wherein a direction of the laser light irradiated from the lidar device includes a horizontal component and a vertical component, the scan pattern shows a repeated form of the direction in which the laser light is irradiated that changes over time, the scan pattern includes a horizontal pattern, which is a pattern in the horizontal direction, and a vertical pattern, which is a pattern in the vertical direction, each of the horizontal pattern and the vertical pattern includes a maximum value, a minimum value, and a cycle in which a field of view is formed repeatedly, the horizontal pattern has a form in which the horizontal component increases over time within the cycle of the horizontal pattern, the vertical pattern has a form in which the vertical component decreases and increases over time within the cycle of the vertical pattern, and the cycle of the horizontal pattern is longer than the cycle of the vertical pattern.

Here, the horizontal pattern may have a form in which a speed of change of the horizontal component over time when the horizontal component has an intermediate value between the minimum value and the maximum value is lower than a speed of change of the horizontal component over time when the horizontal component has the maximum value or minimum value.

Here, the vertical pattern may have a sinusoidal form in which the vertical component changes sinusoidally over time.

Here, the cycle of the horizontal pattern may include a first horizontal pattern cycle and a second horizontal pattern cycle, the vertical pattern may include a first vertical pattern generated during the first horizontal pattern cycle and a second vertical pattern generated during the second horizontal pattern cycle, and a difference between a maximum value and a minimum value of the first vertical pattern may be larger than a difference between a minimum value and a maximum value of the second vertical pattern.

Here, the cycle of the horizontal pattern may include a first horizontal pattern cycle and a second horizontal pattern cycle, the vertical pattern may include a first vertical pattern generated during the first horizontal pattern cycle and a second vertical pattern generated during the second horizontal pattern cycle, and an intermediate value of the first vertical pattern may be larger than an intermediate value of the second vertical pattern.

According to another embodiment, there is provided a lidar device for measuring a distance using laser light, the lidar device including a laser light emitting unit configured to output laser light, a scanner configured to irradiate the laser light output from the laser light emitting unit and generate a scan pattern, and a sensor configured to detect laser light reflected from an object included in a scan field, which is a field scannable by the lidar device, wherein a direction of the laser light irradiated from the lidar device includes a horizontal component and a vertical component, the scan pattern shows a repeated form of the direction in which the laser light is irradiated that changes over time, the scan pattern includes a horizontal pattern, which is a pattern in the horizontal direction, and a vertical pattern, which is a pattern in the vertical direction, each of the horizontal pattern and the vertical pattern includes a maximum value, a minimum value, and a cycle in which a field of view is formed repeatedly, the horizontal pattern has a form in which the horizontal component increases over time within the cycle of the horizontal pattern, the vertical pattern has a form in which the vertical component decreases and increases over time within the cycle of the vertical pattern, and the cycle of the vertical pattern is longer than the cycle of the horizontal pattern.

Here, the horizontal pattern may have a form in which a speed of change of the horizontal component over time when the horizontal component has an intermediate value between the minimum value and the maximum value is lower than a speed of change of the horizontal component over time when the horizontal component has the maximum value or minimum value.

Here, the vertical pattern may have a sinusoidal form in which the vertical component changes sinusoidally over time.

According to yet another embodiment, there is provided a lidar device for measuring a distance using laser light, the lidar device including a laser light emitting unit configured to output laser light, a first scanner configured to obtain the laser light output from the laser light emitting unit and continuously change a traveling path of the laser light to expand an irradiation field of the laser light in the form of a line, a second scanner configured to obtain the laser light whose irradiation field is in the form of a line that is irradiated from the first scanner and continuously change a traveling path of the laser light to expand the irradiation field of the laser light in the form of a plane, and a sensor configured to detect laser light reflected from an object located within the scan field, wherein the first scanner includes a nodding mirror configured to nod within a preset angle range and change the traveling path of the laser light in a vertical direction to expand the irradiation field of the laser light in the form of a vertical line, the second scanner includes a rotating polygon mirror configured to rotate about one axis set in the vertical direction and change a traveling path of the laser light whose irradiation field is in the form of a vertical line in a horizontal direction to expand the irradiation field in the form of a plane, and a nodding speed of the nodding mirror is higher than a rotating speed of the rotating polygon mirror.

Here, an angle of the nodding mirror may change sinusoidally over time.

Here, the rotating polygon mirror may include N reflective surfaces configured to reflect laser light irradiated from the nodding mirror, and a preset angle of the nodding mirror at an arbitrary time point may differ from a preset angle of the nodding mirror at a time point after the rotating polygon mirror has rotated 360/N°.

Here, the rotating polygon mirror may include a plurality of reflective surfaces configured to reflect laser light irradiated from the nodding mirror, and the plurality of reflective surfaces of the rotating polygon mirror may form different angles with a rotating shaft of the rotating polygon mirror.

Here, the laser light emitting unit may not output laser light when a nodding angle of the nodding mirror is maximum.

1. Lidar Device and Definition of Terms

A lidar device is a device for detecting a distance from an object and a location of the object using laser light. For example, a distance between the lidar device and the object and a location of the object based on the lidar device may be shown using $(R, \theta, \phi)$. Also, embodiments are not limited thereto, and for example, the distance between the lidar device and the object and the location of the object based on the lidar device may be shown using an orthogonal coordinate system $(X, Y, Z)$, a cylindrical coordinate system $(R, \theta, z)$, and the like.

In addition, to determine a distance R from an object, the lidar device may use laser light reflected from the object.

According to an embodiment, to determine the distance R from the object, the lidar device may use time-of-flight (TOF) which is a time difference between time at which laser light is output and time at which the laser light is detected. For example, the lidar device may include a laser light emitting unit configured to output laser light and a sensor configured to detect reflected laser light. The lidar device may check time at which the laser light is output from the laser light emitting unit and check time at which laser light reflected from the object is detected by the sensor to determine a distance from the object on the basis of a difference between the time at which the laser light is output and the time at which the laser light is detected.

In addition, according to an embodiment, to determine the distance R from the object, the lidar device may use a triangular surveying method on the basis of a location at which laser light is detected. For example, when laser light output from the laser light emitting unit is reflected from an object which is relatively close to the laser light emitting unit, the reflected laser may be detected at a point of the sensor relatively distant from the laser light emitting unit. Also, when laser light output from the laser light emitting unit is reflected from an object which is relatively distant from the laser light emitting unit, the reflected laser may be detected at a point of the sensor relatively close to the laser light emitting unit. Accordingly, the lidar device may determine the distance from the object on the basis of a difference between the locations at which the rays of laser light are detected.

In addition, according to an embodiment, to determine the distance R from the object, the lidar device may use a phase shift of detected laser light. For example, the lidar device may modulate an amplitude of laser light output from the laser light emitting unit to sense a phase of the amplitude and sense a phase of an amplitude of laser light reflected from the object present in a scan field to determine the distance from the object present within the scan field on the basis of the phase difference between the output laser light and the detected laser light.

In addition, according to an embodiment, the lidar device may determine a location of an object using an angle at which light is irradiated. For example, when an irradiation angle (θ, φ) of a single ray of laser light which is irradiated from the lidar device toward a scan field of the lidar device is known, if laser light reflected from an object present within the scan field is detected by the sensor, the lidar device may determine the location of the object on the basis of the irradiation angle (θ, φ) of the irradiated laser light.

In addition, according to an embodiment, the lidar device may determine a location of an object using an angle at which laser light is received. For example, when a first object and a second object are at the same distance R from the lidar device but are at different locations (θ, φ) on the basis of the lidar device, laser light reflected from the first object and laser light reflected from the second object may be detected at different points of the sensor. The lidar device may determine the location of the object on the basis of the points at which the reflected rays of laser light are detected by the sensor.

In addition, according to an embodiment, to detect a location of an arbitrary object in the vicinity of the lidar device, the lidar device may have a scan field including the object. Here, the scan field may be a detectable field expressed in a single screen and may refer to a set of points, lines, and surfaces forming a single screen during one frame. Also, the scan field may refer to an irradiation field of laser light irradiated from the lidar device, and the irradiation field may refer to a set of points, lines, and surfaces at which rays of laser light irradiated during one frame meet a spherical surface at the same distance R. Also, a field of view (FOV) may refer to a detectable field and may be defined as an angle range of the scan field with the lidar device as the origin.

2. Configuration of Lidar Device

Hereinafter, each element of the lidar device according to an embodiment will be described in detail.

2.1 Elements of Lidar Device

FIG. 1 is a view illustrating a lidar device according to an embodiment.

Referring to FIG. 1, a lidar device 100 according to an embodiment may include a laser light emitting unit 110, a scanner 120, a sensor 130, and a controller 140. However, the configuration of the lidar device 100 is not limited thereto, and the lidar device 100 may be a device having more or less elements. For example, the lidar device may only include the laser light emitting unit, the sensor, and the controller, without the scanner.

In addition, each of the laser light emitting unit 110, the scanner 120, the sensor 130, and the controller 140 included in the lidar device 100 may be provided in plural. For example, the lidar device may include a plurality of laser light emitting units, a plurality of scanners, and a plurality of sensors. Of course, the lidar device may also include a single laser light emitting unit, a plurality of scanners, and a single sensor.

Each of the laser light emitting unit 110, the scanner 120, the sensor 130, and the controller 140 included in the lidar device 100 may include a plurality of sub-elements. For example, in the lidar device, a plurality of laser light outputting elements, which form a single array, may constitute the laser light emitting unit.

2.1.1 Laser Light Emitting Unit

The laser light emitting unit 110 may output laser light. The lidar device 100 may measure a distance from an object using the output laser light.

In addition, the laser light emitting unit 110 may include one or more laser light output elements. In one embodiment, the laser light emitting unit 110 may include a single laser light output element or include a plurality of laser light output elements. When the laser light emitting unit 110 includes a plurality of laser light output elements, the plurality of laser light output elements may form a single array.

In addition, the laser light emitting unit 110 may output laser light in a wavelength band of 905 nm or output laser light in a wavelength band of 1550 nm. The laser light emitting unit 110 may output laser light in a wide range of wavelengths, e.g., laser light having a wavelength in the range of 800 nm to 1000 nm, or may output laser light in a specific range of wavelengths.

In addition, when a laser light output element of the laser light emitting unit 110 is provided in plural, each laser light output element may output laser light in the same wavelength band or output laser light in different wavelength bands. For example, in the case of the laser light emitting unit including two laser light output elements, one laser light output element may output laser light in the wavelength band of 905 nm, and the other laser light output element may output laser light in the wavelength band of 1550 nm.

In addition, the laser light output element may include a laser diode (LD), a solid-state laser, a high power laser, a light emitting diode (LED), a vertical cavity surface emitting laser (VCSEL), an external cavity diode laser (ECDL), and the like but is not limited thereto.

2.1.2 Scanner

The scanner 120 may change an irradiation direction and/or size of laser light output from the laser light emitting unit 110. For example, the scanner 120 may change a traveling direction of output laser light to change the irradiation direction of the laser light, may diffuse the output laser light or change a phase thereof to change the size of the laser light or change the irradiation direction thereof, or may diffuse laser light and change a traveling direction of the laser light to change the irradiation direction and size of the laser light.

In addition, the scanner 120 may change the irradiation direction and/or size of the laser light irradiated from the laser light emitting unit 110 to expand a scan field of the lidar device 100 or change a scan direction thereof.

In addition, the scanner 120 may include a fixing mirror configured to change a traveling direction of laser light at a fixed angle to change the traveling direction of the output laser light, a nodding mirror configured to nod within a preset angle range and continuously change a traveling direction of laser light, and a rotary mirror configured to rotate about one axis and continuously change a traveling direction of laser but is not limited thereto.

In addition, the scanner 120 may include a lens, a prism, a microfluidic lens, liquid crystal, or the like to diffuse the output laser light but is not limited thereto.

In addition, the scanner 120 may include an optical phased array (OPA) or the like to change a phase of the output laser light and change an irradiation direction of the laser light thereby but is not limited thereto.

In addition, the nodding mirror may nod within a preset angle range by continuously changing a traveling direction of the output laser light to expand or change an irradiation field of the laser light. Here, the nodding may refer to rotating about one or a plurality of shafts and reciprocating within a predetermined angle range. Also, the nodding mirror may be a resonance scanner, a micro-electro mechanical systems (MEMS) mirror, a voice coil motor (VCM) or the like but is not limited thereto.

In addition, the rotary mirror may rotate about one axis by continuously changing a traveling direction of the output laser to expand or change an irradiation field of the laser light. The rotary mirror may be a cross-section mirror rotating about an axis, a conical mirror rotating about an axis, or a multi-face mirror rotating about an axis but is not limited thereto and may be any mirror rotating about an axis without a limitation in an angle range.

In addition, the scanner 120 may be configured with a single scanner or configured with a plurality of scanners. Also, the scanner may include one or more optical elements, but the configuration of the scanner is not limited thereto.

2.1.3 Sensor

The sensor 130 may detect laser light reflected from an object located in a scan field of the lidar device 100.

In addition, the sensor 130 may include one or more sensor elements. In one embodiment, the sensor 130 may include a single sensor element or include a sensor array formed of a plurality of sensor elements. For example, the sensor 130 may include a single avalanche photodiode (APD) or include silicon photomultipliers (SiPM) in which an array is formed of a plurality of single-photon avalanche diodes (SPAD). Also, a plurality of APDs may be formed of a single channel or formed of a plurality of channels.

When the sensor is provided in plural, each of the plurality of sensors may be formed of different sensors. For example, when there are three sensors, one sensor may be formed of an APD, another sensor may be formed of an SPAD, and the remaining sensor may be formed of SiPM.

In addition, when the sensor is provided in plural and the laser light emitting unit outputs light in a plurality of wavelengths, the plurality of sensors may be formed of sensors for different wavelengths. For example, when the laser light emitting unit outputs rays of laser light in the wavelength band of 905 nm and the wavelength band of 1550 nm and there are two sensors, one sensor may detect the laser light in the wavelength of 905 nm, and the other sensor may detect the laser light in the wavelength of 1550 nm.

In addition, the sensor element may include a PN photodiode, a phototransistor, a PIN photodiode, an APD, a SPAD, SiPM, a charge-coupled device (CCD), or the like but is not limited thereto.

2.1.4 Controller

The controller 140 may determine a distance from the lidar device to an object located in a scan field on the basis of detected laser light. Also, the controller 140 may control operations of each element of the lidar device such as the laser light emitting unit 110, the scanner 120, and the sensor 130.

2.2 Scanner

Hereinafter, the scanner 120 will be described in more detail.

Figure 2:
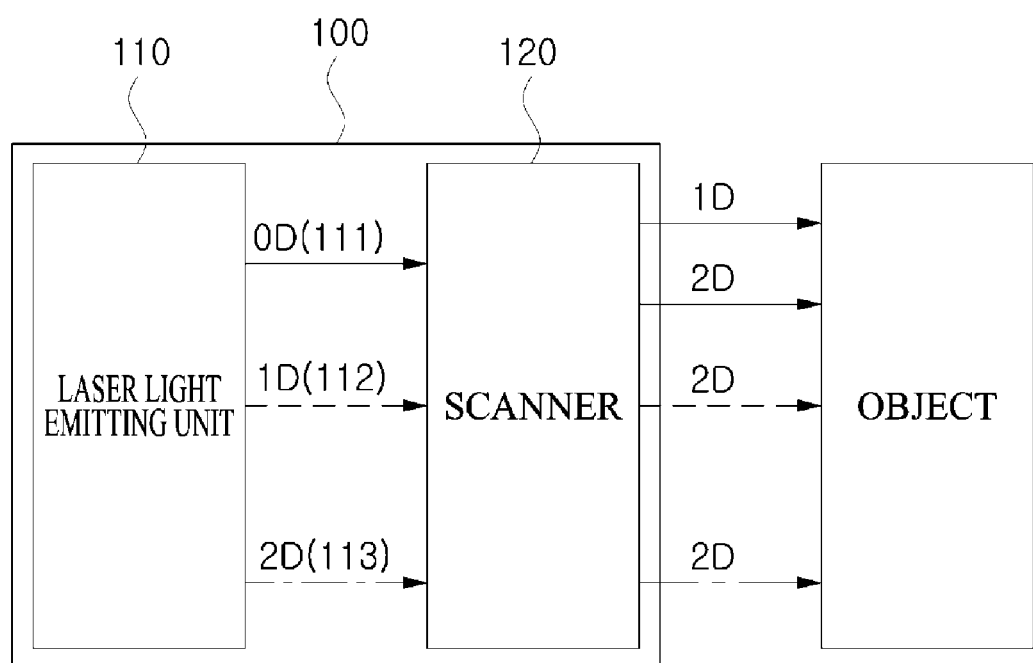
FIG. 2 is a view for describing a function of a scanner in the lidar device according to an embodiment.

FIG. 2 is a view for describing a function of a scanner in the lidar device according to an embodiment.

Referring to FIG. 2, a function of the scanner 120 may vary according to an irradiation field of laser light output from the laser light emitting unit 110.

2.2.1 when Irradiation Field of Laser Light Output from Laser Light Emitting Unit is in the Form of Point According to an embodiment, when the laser light emitting unit 110 has a single laser light output element, an irradiation field of laser light 111 output from the laser light emitting unit may be in the form of a point. In this case, the scanner 120 may change an irradiation direction and size of the laser light 111. Accordingly, a scan field of the lidar device may be expanded in the form of a line or a plane.

In addition, the scanner 120 may continuously change a traveling direction of the laser light 111 whose irradiation field is in the form of a point to change the irradiation direction of the laser light. Accordingly, the scan field of the lidar device may be expanded in the form of a plane.

In addition, the scanner 120 may diffuse the laser light 111 whose irradiation field is in the form of a point to change the size of the laser light. Accordingly, the scan field of the lidar device may be expanded in the form of a line or a plane.

In addition, the scanner 120 may change a phase of the laser light 111 whose irradiation field is in the form of a point to change the size and irradiation direction of the laser light. Accordingly, the scan field of the lidar device may be expanded in the form of a line or a plane.

In addition, the scanner 120 may, first, continuously change a traveling direction of the laser light 111 whose irradiation field is in the form of a point and then, second, change the traveling direction of the laser light to a direction different from the previous traveling direction to change an irradiation direction of the laser light. Accordingly, the scan field of the lidar device 100 may be expanded in the form of a plane.

In addition, the scanner 120 may, first, continuously change a traveling direction of the laser light 111 whose irradiation field is in the form of a point and then, second, diffuse the laser light to change the irradiation direction and size of the laser light. Accordingly, the scan field of the lidar device may be expanded in the form of a plane.

In addition, the scanner 120 may, first, diffuse the laser light 111 whose irradiation field is in the form of a point and then, second, continuously change a traveling direction of the diffused laser light to change the irradiation direction and size of the laser light. Accordingly, the scan field of the lidar device may be expanded in the form of a plane.

2.2.2 when Irradiation Field of Laser Light Output from Laser Light Emitting Unit is in the Form of Line According to another embodiment, when the laser light emitting unit 110 is formed of a plurality of laser light output elements, an irradiation field of laser light 112 output from the laser light emitting unit may be in the form of a line. Here, the scanner 120 may change an irradiation direction and a size of the laser light 112. Accordingly, a scan field of the lidar device may be expanded in the form of a plane.

In this case, the scanner 120 may continuously change a traveling direction of the laser light 112 whose irradiation field is in the form of a line to change an irradiation direction of the laser light. Accordingly, the scan field of the lidar device may be expanded in the form of a plane.

In addition, the scanner 120 may diffuse the laser light 112 whose irradiation field is in the form of a line to change the size of the laser light. Accordingly, the scan field of the lidar device may be expanded in the form of a plane.

In addition, the scanner 120 may change a phase of the laser light 112 whose irradiation field is in the form of a line to change the irradiation direction and size of the laser light.

Accordingly, the scan field of the lidar device may be expanded in the form of a plane.

According to another embodiment, when the laser light emitting unit 110 includes an array of laser light output elements arranged in a row, the irradiation field of the laser light 112 output from the laser light emitting unit 110 may be in the form of a line. Here, the scanner 120 may change the irradiation direction and size of the laser light 112. Accordingly, the scan field of the lidar device may be expanded in the form of a plane.

In this case, the scanner 120 may continuously change a traveling direction of the laser light 112 whose irradiation field is in the form of a line to change the irradiation direction of the laser light. Accordingly, the scan field of the lidar device may be expanded in the form of a plane.

In addition, the scanner 120 may diffuse the laser light 112 whose irradiation field is in the form of a line to change the size of the laser light. Accordingly, the scan field of the lidar device may be expanded in the form of a plane.

In addition, the scanner 120 may change a phase of the laser light 112 whose irradiation field is in the form of a line to change the irradiation direction and size of the laser light. Accordingly, the scan field of the lidar device may be expanded in the form of a plane.

2.2.3 when Irradiation Field of Laser Light Output from Laser Light Emitting Unit is in the Form of Plane According to another embodiment, when the laser light emitting unit 110 is formed of a plurality of laser light output elements, an irradiation field of laser light 113 output from the laser light emitting unit 110 may be in the form of a plane. Here, the scanner 120 may change an irradiation direction and a size of the laser light. Accordingly, a scan field of the lidar device may be expanded or a scanning direction may be changed.

In this case, the scanner 120 may continuously change a traveling direction of the laser light 113 whose irradiation field is in the form of a plane to change an irradiation direction of the laser light. Accordingly, the scan field of the lidar device may be expanded or the scanning direction may be changed.

In addition, the scanner 120 may diffuse the laser light 113 whose irradiation field is in the form of a plane to change the size of the laser light. Accordingly, the scan field of the lidar device may be expanded or the scanning direction may be changed.

In addition, the scanner 120 may change a phase of the laser light 113 whose irradiation field is in the form of a plane to change the irradiation direction and size of the laser light. Accordingly, the scan field of the lidar device may be expanded or the scanning direction may be changed.

According to another embodiment, when the laser light emitting unit 110 includes laser light output elements forming a planar array, the irradiation field of the laser light 113 output from the laser light emitting unit 110 may be in the form of a plane. Here, the scanner 120 may change the irradiation direction and size of the laser light. Accordingly, the scan field of the lidar device may be expanded or the scanning direction may be changed.

In this case, the scanner 120 may continuously change a traveling direction of the laser light 113 whose irradiation field is in the form of a plane to change the irradiation direction of the laser light. Accordingly, the scan field of the lidar device may be expanded or the scanning direction may be changed.

In addition, the scanner 120 may diffuse the laser light 113 whose irradiation field is in the form of a plane to change the size of the laser light. Accordingly, the scan field of the lidar device may be expanded or the scanning direction may be changed.

In addition, the scanner 120 may change a phase of the laser light 113 whose irradiation field is in the form of a plane to change the irradiation direction and size of the laser light. Accordingly, the scan field of the lidar device may be expanded or the scanning direction may be changed.

Hereinafter, the lidar device in which the irradiation field of laser light output from the laser light emitting unit is in the form of a point will be described in detail.

3. Embodiment of Lidar Device 3.1 Configuration of Lidar Device

Figure 3:
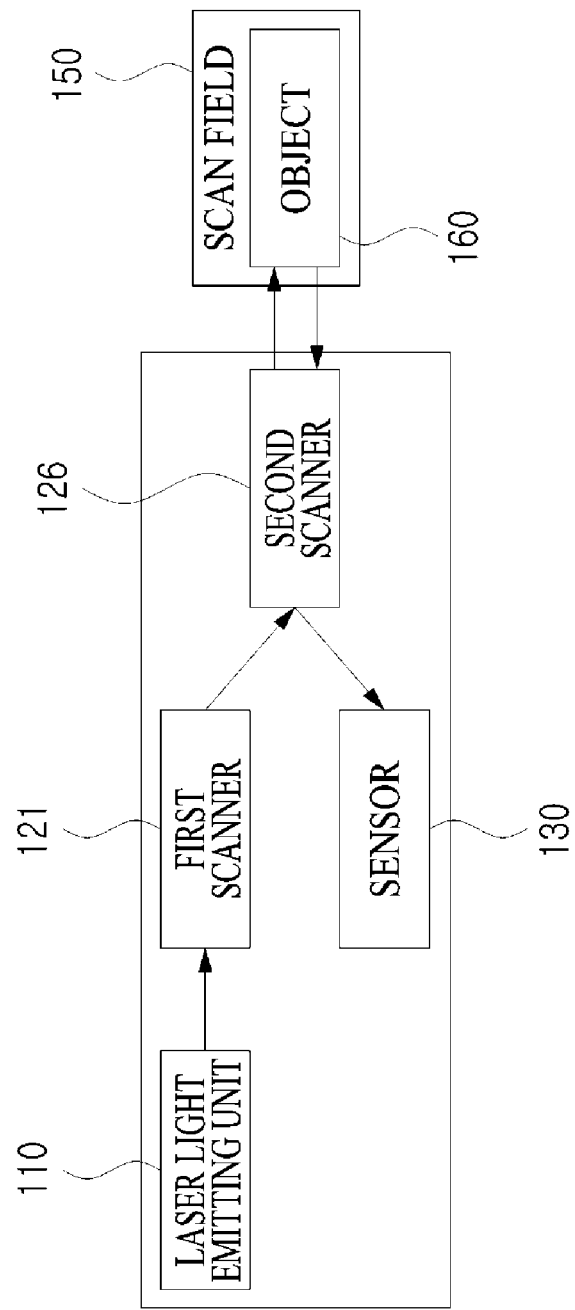
FIG. 3 is a block diagram illustrating a lidar device according to another embodiment.

FIG. 3 is a block diagram illustrating a lidar device according to another embodiment.

Referring to FIG. 3, the lidar device according to an embodiment may include a laser light emitting unit 110, a first scanner 121, a second scanner 126, and a sensor 130.

Since the laser light emitting unit 110 and the sensor 130 have been described above with reference to FIGS. 1 and 2, detailed description on the laser light emitting unit 110 and the sensor 130 will be omitted below.

The scanner 120 described above with reference to FIGS. 1 and 2 may include the first scanner 121 and the second scanner 126.

The first scanner 121 may change an irradiation direction and/or a size of the output laser light to expand an irradiation field of the laser light in the form of a line. For example, the first scanner 121 may continuously change a traveling direction of the output laser light to expand the irradiation field of the laser light in the form of a line. Also, the first scanner 121 may diffuse the output laser light in the form of a line to expand the irradiation field of the laser light in the form of a line.

In addition, the second scanner 126 may change the irradiation direction and/or size of the laser light irradiated from the first scanner 121 to expand the irradiation field of the laser light in the form of a plane. For example, the second scanner 126 may continuously change a traveling direction of the laser light irradiated from the first scanner 121 to expand the irradiation field of the laser light in the form of a plane. Also, the second scanner 126 may diffuse the laser light irradiated from the first scanner to expand the irradiation field of the laser light in the form of a plane. Accordingly, a scan field 150 of the lidar device 100 may be expanded in the form of a plane.

3.2. Operation of Lidar Device

Referring to FIG. 3, an optical path of laser light output from the lidar device 100 is indicated in FIG. 3. Specifically, the laser light emitting unit 110 may output laser light. The laser light output from the laser light emitting unit 110 may reach the first scanner 121, and the first scanner 121 may irradiate the laser light toward the second scanner 126. Also, the laser light may reach the second scanner 126, and the second scanner 126 may irradiate the laser toward the scan field 150. Also, the laser light irradiated to the scan field 150 of the lidar device 100 may be reflected from an object 160 present within the scan field 150 and be irradiated toward the sensor 130 via the second scanner 126. The sensor 130 may detect the laser light irradiated via the second scanner 126.

3.2.1 Irradiation Method of Lidar Device

The lidar device 100 may be a device for measuring a distance from the lidar device 100 to the object 160 using laser light. Therefore, the lidar device 100 should irradiate laser light toward the object 160. Accordingly, the lidar device 100 may have an irradiation method for efficiently measuring the distance from the object. Here, the irradiation method may include a method for determining an irradiation path along which the laser light output from the laser light emitting unit 110 reaches the object 160 located within the scan field 150 and determining the scan field 150. Therefore, the irradiation path and the scan field 150 of the lidar device will be described below.

Specifically, the laser light emitting unit 110 may output laser light toward the first scanner 121, the first scanner 121 may irradiate the output laser light toward the second scanner 126, and the second scanner 126 may irradiate the laser light irradiated thereto toward the scan field 150 of the lidar device 100.

More specifically, the irradiation field of the laser light output from the laser light emitting unit 110 may be in the form of a point, and the output laser light may be irradiated toward the second scanner 126 via the first scanner 121. In this case, the first scanner 121 may change the irradiation direction and/or size of the laser light whose irradiation field is in the form of a point to expand the irradiation field of the laser light in the form of a line. That is, the first scanner 121 may receive the laser light whose irradiation field is in the form of a point from the laser light emitting unit 110 and irradiate the laser light whose irradiation field is in the form of a line toward the second scanner 126.

In this case, the second scanner 126 may change the irradiation direction and/or size of the laser whose irradiation field is in the form of a line to expand the irradiation field of the laser light in the form of a plane, and the laser light irradiated from the first scanner 121 may be irradiated toward the scan field via the second scanner 126. That is, the second scanner 126 may receive the laser light whose irradiation field is in the form of a line from the first scanner 121 and irradiate the laser light whose irradiation field is in the form of a plane toward the scan field 150. Then, the second scanner 126 may irradiate the laser light whose irradiation field is in the form of a plane to expand the scan field 150 of the lidar device 100 in the form of a plane.

3.2.2 Light Reception Method of Lidar Device

The lidar device 100 should detect laser light reflected from an object. Accordingly, the lidar device 100 may have a light reception method for efficiently measuring a distance from an object. Here, the light reception method may include a method for determining a light reception path along which laser light reflected from an object reaches a sensor and determining an amount of laser light that reaches the sensor. Therefore, the light reception path of the lidar device 100 and the amount of laser light reaching the sensor will be described below.

Specifically, laser light irradiated to the scan field 150 of the lidar device 100 may be reflected from the object 160 present within the scan field 150 of the lidar device. Also, the laser light reflected from the object 160 may move toward the second scanner 126, and the second scanner 126 may receive and reflect the laser light reflected from the object 160 to irradiate the laser light toward the sensor 130. In this case, properties of the laser light reflected from the object 160 may vary according to the color, material, or the like of the object 160 or an incident angle or the like of the laser light.

In addition, the laser light reflected from the object 160 may be irradiated toward the sensor 130 via the second scanner 126. That is, the laser light reflected from the object 160 may be irradiated toward the sensor only via the second scanner 126 or may pass through both the first scanner 121 and the second scanner 126 but not be irradiated toward the sensor 130. Also, the laser light reflected from the object 160 may be irradiated toward the sensor 130 only via the second scanner 126 or may pass through neither the first scanner 121 nor the second scanner 126 nor be irradiated toward the sensor 130. Therefore, the amount of laser light reaching the sensor 130 may be determined on the basis of the second scanner 126.

In addition, although the laser light reflected from the object 160 is indicated as being irradiated toward the sensor 130 only via the second scanner 126 in FIG. 3, embodiments are not limited thereto. According to circumstances, the laser light reflected from the object 160 may also reach the sensor 130 via the first scanner 121 and the second scanner 126. The laser light reflected from the object 160 may also reach the sensor 130 without passing through the first scanner 121 and the second scanner 126.

As described above, the lidar device including the laser light emitting unit 110 outputting laser light in the form of a point, the first scanner 121, and the second scanner 126 may expand the scan field 150 in the form of a plane using the first scanner 121 and the second scanner 126. Therefore, as compared with the lidar device that expands a scan field in the form of a plane through mechanical rotation of the lidar device itself, the lidar device according to the present invention may be more advantageous in terms of durability and stability. Also, as compared with the lidar device that expands a scan field in the form of a plane using diffusion of laser light, the lidar device according to the present invention may measure a longer distance. Also, the lidar device according to the present invention may irradiate laser light to a desired region of interest by controlling operations of the first scanner 121 and the second scanner 126.

4. Lidar Device Using Nodding Mirror and Rotating Polygon Mirror

When an irradiation field of laser light output from the laser light emitting unit 110 of the lidar device 100 is in the form of a point, the lidar device 100 may include the first scanner 121 and the second scanner 126. Here, the irradiation field of the laser light whose irradiation field is in the form of a point may be expanded in the form of a plane by the first scanner 121 and the second scanner 126. Accordingly, the scan field 150 of the lidar device 100 may be expanded in the form of a plane.

In addition, the FOV required for the lidar device 100 may vary according to purposes of use of the lidar device 100. For example, as wide a FOV as possible in the vertical and horizontal directions may be required in the case of a fixed type lidar device used for three dimensional (3D) mapping, and a relatively narrower FOV may be required in the vertical direction in comparison to a relatively wide FOV in the horizontal direction in the case of a lidar device disposed in a vehicle. Also, as wide a FOV as possible in the vertical and horizontal directions may be required for a lidar device disposed in a drone. Therefore, when a FOV required in the vertical direction and a FOV required in the horizontal direction are different, the first scanner 121 may change a traveling direction of laser light in a direction in which a relatively narrower FOV is required, and the second scanner 126 may change a traveling direction of the laser light in a direction in which a relatively wide FOV is required so that the overall size of the lidar device 100 is reduced.

In addition, when laser light irradiated toward the scan field 150 is reflected from the object 160 present within the scan field 150, the lidar device 100 may detect the reflected laser light to measure a distance between the lidar device 100 and the object 160. Here, the laser light may be irregularly reflected in all directions according to the color or material of the object 160 present within the scan field 150 or the incident angle or the like of the laser light irradiated toward the object 160. Therefore, the lidar device 100 may have to reduce diffusion of the laser light to measure a distance between the lidar device 100 and an object 160 disposed at a long distance from the lidar device 100. To this end, the first scanner 121 and the second scanner 126 may not expand the size of the laser light but expand the irradiation field of the laser light by continuously changing the traveling direction of the laser light.

In addition, to perform 3D scanning, the first scanner 121 and the second scanner 126 of the lidar device 100 may change the traveling direction of the laser light in different directions. For example, the first scanner 121 may continuously change the traveling direction of the laser light in a direction perpendicular to the ground, and the second scanner 126 may continuously change the traveling direction of the laser light in a direction horizontal to the ground.

In addition, in the lidar device 100, while the first scanner 121 receives laser light whose irradiation field is in the form of a point from the laser light emitting unit 110, the second scanner 126 may receive laser light whose irradiation field is in the form of a line from the first scanner 121. Therefore, a size of the second scanner 126 may be larger than that of the first scanner 121. Accordingly, a scanning speed of the first scanner 121, whose size is smaller, may be higher than that of the second scanner 126, whose size is larger. Here, the scanning speed may refer to a speed at which the traveling direction of the laser light is continuously changed.

In addition, when the laser light irradiated toward the scan field 150 is reflected from the object 160 present within the scan field 150, the lidar device 100 may detect the reflected laser light to measure a distance between the lidar device 100 and the object 160. Here, the laser light may be irregularly reflected in all directions according to the color or material of the object 160 present within the scan field 150 or the incident angle or the like of the laser light irradiated toward the object 160. Therefore, the lidar device 100 may have to increase the amount of laser light detectable by the sensor 130 to measure a distance between the lidar device 100 and an object 160 disposed at a long distance from the lidar device 100. To this end, the laser light reflected from the object 160 may be irradiated toward the sensor 130 only via the second scanner 126, whose size is larger, among the first scanner 121 and the second scanner 126.

Therefore, for the above-described functions to be smoothly performed, the first scanner 121 of the lidar device 100 may include a nodding mirror, and the second scanner 126 of the lidar device 100 may include a rotating polygon mirror.

The lidar device in which the first scanner 121 includes the nodding mirror and the second scanner 126 includes the rotating polygon mirror will be described in detail below.

4.1 Configuration of Lidar Device

Figure 4:
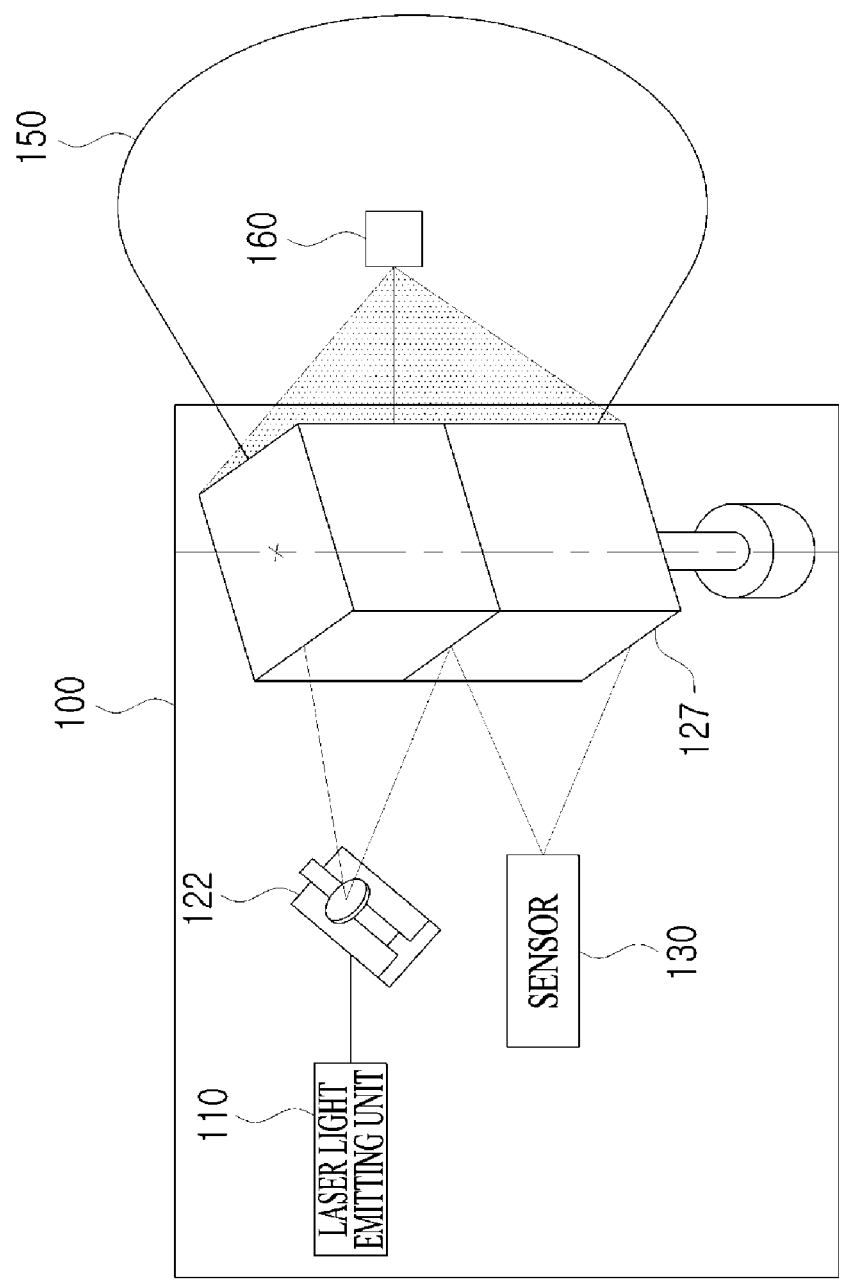
FIG. 4 is a view related to the lidar device according to an embodiment.

FIG. 4 is a view related to the lidar device according to an embodiment.

Referring to FIG. 4, a lidar device 100 according to an embodiment may include a laser light emitting unit 110, a nodding mirror 122, a rotating polygon mirror 127, and a sensor 130.

Since the laser light emitting unit 110 and the sensor 130 have been described above with reference to FIGS. 1 and 2, detailed description on the laser light emitting unit 110 and the sensor 130 will be omitted below.

The first scanner 121 described above with reference to FIG. 3 may include the nodding mirror 122, and the second scanner 126 may include the rotating polygon mirror 127.

The nodding mirror 122 may be an implementation of the above-described first scanner 121. The nodding mirror 122 may nod within a preset angle range about one axis or may also nod within preset angle ranges about two axes. In this case, when the nodding mirror 122 nods within a present angle range about one axis, an irradiation field of laser light irradiated from the nodding mirror may be in the form of a line. Also, when the nodding mirror 122 nods within present angle ranges about two axes, an irradiation field of laser light irradiated from the nodding mirror may be in the form of a plane.

In addition, a nodding speed of the nodding mirror 122 may be the same throughout the entire preset angle range or may also be different within the entire preset angle range. For example, the nodding mirror 122 may nod at the same angular speed throughout the entire preset angle range. Also, for example, the nodding mirror 122 may nod at a relatively lower angular speed at both ends of the preset angle and may nod at a relatively higher angular speed at a central portion of the preset angle.

In addition, the nodding mirror 122 may receive and reflect laser light output from the laser light emitting unit 110 and may nod within a preset angle range to continuously change a traveling direction of the laser light. Accordingly, an irradiation field of the laser light may be expanded in the form of a line or a plane.

In addition, the rotating polygon mirror 127 may be an implementation of the above-described second scanner 126. The rotating polygon mirror 127 may rotate about one axis. Here, the rotating polygon mirror 127 may receive and reflect laser light irradiated from the nodding mirror 122 and may rotate about one axis to continuously change a traveling direction of the laser light. Then, accordingly, an irradiation field of the laser light may be expanded in the form of a plane, and as a result, a scan field 310 of the lidar device 100 may be expanded in the form of a plane.

In addition, a rotating speed of the rotating polygon mirror 127 may be the same throughout the entire rotation angle range or may also be different within the entire rotation angle range. For example, a rotating speed when laser light irradiated from the rotating polygon mirror 127 moves toward a central portion of the scan field 310 may be relatively lower than a rotating speed when laser light irradiated from the rotating polygon mirror 127 moves toward a side portion of the scan field 310. Also, the rotating speed of the rotating polygon mirror 127 may vary according to the number of rotations of the rotating polygon mirror 127.

In addition, when a vertical FOV of the lidar device 100 is set to be narrower than a horizontal FOV thereof, the nodding mirror 122 may continuously change a traveling direction of laser light output from the laser light emitting unit 110 in the direction perpendicular to the ground to expand an irradiation field of the laser light in the form of a line which is perpendicular to the ground. In addition, in this case, the rotating polygon mirror 127 may continuously change a traveling direction of the laser light irradiated from the nodding mirror 122 in the direction horizontal to the ground to expand the irradiation field of the laser light in the form of a plane. Accordingly, the scan field 310 of the lidar device 100 may be expanded in the form of a plane. Therefore, the nodding mirror 122 may expand the scan field 310 vertically, and the rotating polygon mirror 127 may expand the scan field 310 horizontally.

In addition, since the nodding mirror 122 reflects laser light output from the laser light emitting unit 110, the size of the nodding mirror 122 may be similar to a diameter of the laser light. However, since laser light irradiated from the nodding mirror 122 has an irradiation field in the form of a line, the size of the rotating polygon mirror 127 may be larger than or equal to that of the irradiation field so that the rotating polygon mirror 127 reflects the laser light irradiated from the nodding mirror 122. Therefore, the size of the nodding mirror 122 may be smaller than the size of the rotating polygon mirror 127, and the nodding speed of the nodding mirror 122 may be higher than the rotating speed of the rotating polygon mirror 127.

A laser light irradiation method and a laser light reception method of the lidar device 100 having the above-described configuration will be described below.

4.2 Operation of Lidar Device

Referring back to FIG. 4, a traveling path of laser light until the laser light is detected after being output in the lidar device 100 is known. Specifically, laser light output from the laser light emitting unit 110 of the lidar device 100 may be irradiated toward the rotating polygon mirror 127 via the nodding mirror 122, and the laser light irradiated toward the rotating polygon mirror 127 may be irradiated toward the scan field 150 of the lidar device 100 via the rotating polygon mirror 127. Also, the laser light irradiated toward the scan field 150 of the lidar device 100 may be reflected from the object 160 present within the scan field 150 and be irradiated toward the sensor 130 via the rotating polygon mirror 127. Also, the sensor 130 may detect the laser light irradiated thereto via the rotating polygon mirror 127.

4.2.1 Irradiation Method of Lidar Device

The lidar device 100 may be a device for measuring a distance from the lidar device 100 to the object 160 using laser light. Therefore, the lidar device 100 should irradiate laser light toward the object 160. Accordingly, the lidar device 100 may have an irradiation method for efficiently measuring the distance from the object 160. Here, the irradiation method may include a method for determining an irradiation path along which the laser light output from the laser light emitting unit 110 reaches the object 160 located within the scan field 150 and determining the scan field 150. Therefore, the irradiation path and the scan field 150 of the lidar device 100 will be described below.

Specifically, the laser light emitting unit 110 may output laser light toward the nodding mirror 122, the nodding mirror 122 may receive and reflect the output laser light to irradiate the laser light toward the rotating polygon mirror 127, and the rotating polygon mirror 127 may receive and reflect the laser light irradiated thereto to irradiate the laser light toward the scan field 150 of the lidar device 100.

In this case, the laser light emitting unit 110 may output laser light toward the nodding mirror 122, and, here, an irradiation field of the output laser light may be in the form of a point.

Here, the laser light output from the laser light emitting unit 110 may be irradiated toward the rotating polygon mirror 127 via the nodding mirror 122. In this case, the nodding mirror 122 may change an irradiation direction of the laser light whose irradiation field is in the form of a point to expand the irradiation field of the laser light in the form of a line. That is, the nodding mirror 122 may receive the laser light whose irradiation field is in the form of a point and irradiate laser light whose irradiation field is in the form of a line toward the rotating polygon mirror 127.

In this case, the nodding mirror 122 may continuously change a traveling direction of the laser light output from the laser light emitting unit 110 in a direction perpendicular to the ground to expand the irradiation field of the laser light in the form of a line which is perpendicular to the ground.

In addition, laser light irradiated from the nodding mirror 122 may be irradiated toward the scan field 150 via the rotating polygon mirror 127. In this case, the rotating polygon mirror 127 may change an irradiation direction of the laser light whose irradiation field is in the form of a line to expand an irradiation field of the laser light in the form of a plane. That is, the rotating polygon mirror 127 may receive the laser light whose irradiation field is in the form of a line from the nodding mirror 122 and irradiate laser light whose irradiation field is in the form of a plane toward the scan field 150. Then, the rotating polygon mirror 127 may irradiate the laser light whose irradiation field is in the form of a plane to expand the scan field 150 of the lidar device 100 in the form of a plane.

In addition, the rotating polygon mirror 127 may continuously change a traveling direction of the laser light irradiated from the nodding mirror 122 in a direction horizontal to the ground to expand the irradiation field of the laser light in the form of a plane.

In addition, in this case, the scan field 150 of the lidar device 100 may be determined on the basis of a preset angle of the nodding mirror 122 and the number of reflective surfaces of the rotating polygon mirror 127. Accordingly, a FOV of the lidar device 100 may be determined. For example, when the nodding mirror 122 continuously changes a traveling direction of the laser light in the direction perpendicular to the ground, a vertical FOV of the lidar device 100 may be determined on the basis of the preset angle of the nodding mirror 122. Also, when the rotating polygon mirror 127 continuously changes the traveling direction of the laser light in the direction horizontal to the ground, a horizontal FOV of the lidar device 100 may be determined on the basis of the number of reflective surfaces of the rotating polygon mirror 127.

4.2.2 Light Reception Method of Lidar Device

The lidar device 100 may be a device for measuring a distance from the lidar device 100 to the object 160 using laser light. Therefore, the lidar device 100 should detect laser light reflected from the object 160. Accordingly, the lidar device 100 may have a light reception method for efficiently measuring the distance from the object 160. Here, the light reception method may include a method for determining a light reception path along which laser light reflected from the object 160 reaches the sensor 130 and determining an amount of laser light reaching the sensor 130. Therefore, the light reception path of the lidar device 100 and the amount of laser light reaching the sensor 130 will be described below.

Specifically, laser light irradiated to the scan field 150 of the lidar device 100 may be reflected from the object 160 present within the scan field 150 of the lidar device 100. Also, the laser light reflected from the object 160 may move toward the rotating polygon mirror 127, and the rotating polygon mirror 127 may receive and reflect the laser light reflected from the object 160 to irradiate the laser light toward the sensor 130. In this case, properties of the laser light reflected from the object 160 may vary according to the color, material or the like of the object 160 or an incident angle or the like of the laser light.

In addition, the laser light reflected from the object 160 may be irradiated toward the sensor 130 via the rotating polygon mirror 127. That is, the laser light reflected from the object 160 may be irradiated toward the sensor 130 only via the rotating polygon mirror 127 or may pass through both the nodding mirror 122 and the rotating polygon mirror 127 but not be irradiated toward the sensor 130. Also, the laser light reflected from the object 160 may be irradiated toward the sensor 130 only via the rotating polygon mirror 127 or may pass through neither the nodding mirror 122 nor the rotating polygon mirror 127 nor be irradiated toward the sensor 130. Therefore, the amount of laser light reaching the sensor 130 may be determined on the basis of the rotating polygon mirror 127.

Here, irradiating the laser light reflected from the object 160 toward the sensor 130 only via the rotating polygon mirror 127 may increase the amount of laser light reaching the sensor 130 and cause the amount of laser light reaching the sensor 130 to be more even as compared with irradiating the laser light reflected from the object 160 toward the sensor 130 via both the nodding mirror 122 and the rotating polygon mirror 127.

Specifically, when the laser light reflected from the object 160 is irradiated toward the sensor 130 only via the rotating polygon mirror 127, the amount of laser light reaching the sensor 130 may be determined on the basis of a size of the reflective surface of the rotating polygon mirror 127 and a rotating angle of the rotating polygon mirror 127.

Conversely, when the laser light reflected from the object 160 is irradiated toward the sensor 130 via both the nodding mirror 122 and the rotating polygon mirror 127, the amount of laser light reaching the sensor 130 may be determined on the basis of a size of the nodding mirror 122, a nodding angle of the nodding mirror 122, the size of the reflective surface of the rotating polygon mirror 127, and the rotating angle of the rotating polygon mirror 127. That is, the amount of laser light reaching the sensor 130 may be determined on the basis of a smaller size of the size of the nodding mirror 122 and the size of the rotating polygon mirror 127 and may vary according to the nodding angle of the nodding mirror 122 and the rotating angle of the rotating polygon mirror 127. Therefore, the amount of laser light reaching the sensor 130 may be smaller and a change in the amount of laser light reaching the sensor 130 may be larger as compared with when the laser light is irradiated toward the sensor 130 only via the rotating polygon mirror 127.

5. Rotating Polygon Mirror 5.1 Structure

Figure 5:
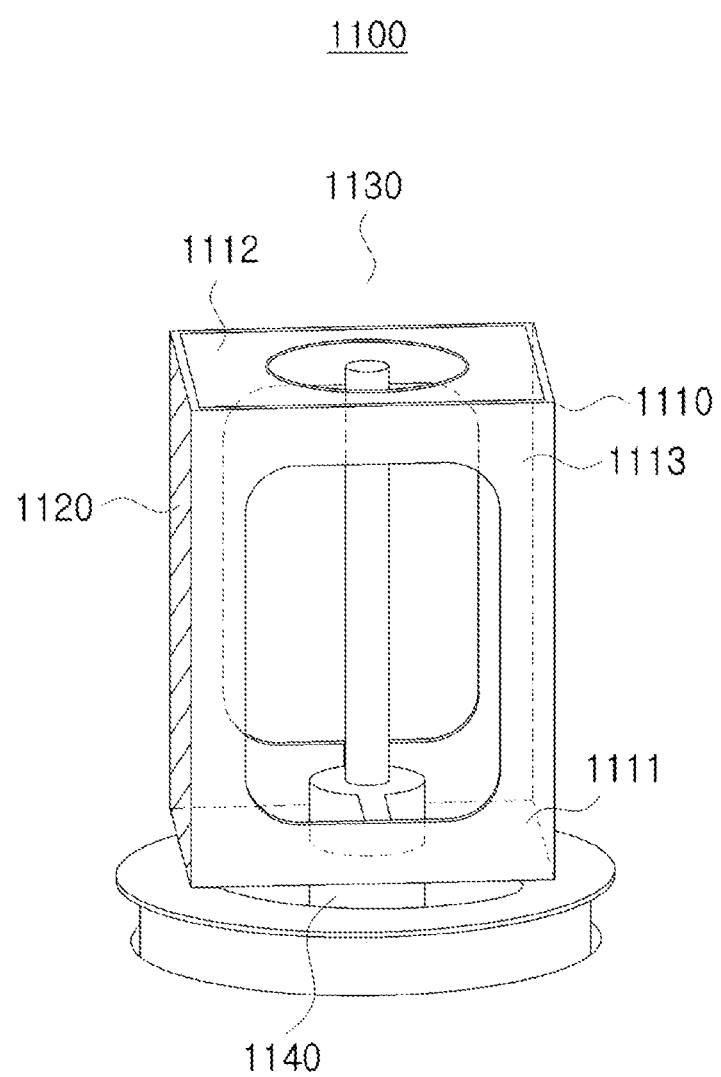
FIG. 5 is a view for describing a rotating polygon mirror according to an embodiment.

FIG. 5 is a view for describing a rotating polygon mirror according to an embodiment.

Referring to FIG. 5, a rotating polygon mirror 1100 according to an embodiment may include reflective surfaces 1120 and a body 1110 and may rotate about a rotating shaft 1130 which vertically passes through centers of an upper portion 1112 and a lower portion 1111 of the body 1110. However, the rotating polygon mirror 1100 may include only some of the above-described elements or include more elements. For example, the rotating polygon mirror 1100 may include the reflective surfaces 1120 and the body 1110, and the body 1110 may only include the lower portion 1111. In this case, the reflective surfaces 1120 may be supported by the lower portion 1111 of the body 1110.

The reflective surfaces 1120 are surfaces for reflecting received laser light and may include a reflective mirror, reflective plastic, or the like but are not limited thereto.

In addition, the reflective surfaces 1120 may be installed at side surfaces of the body 1110 excluding the lower portion 1111 and the upper portion 1112 thereof and may be installed so that the rotating shaft 1130 and a normal line of each reflective surface 1120 are perpendicular to each other. This may be to cause scan fields of rays of laser light irradiated from the reflective surfaces 1120 to be equal in order to scan the same scan field repeatedly.

In addition, the reflective surfaces 1120 may be installed at the side surfaces of the body 1110 excluding the lower portion 1111 and the upper portion 1112 thereof and may be installed so that normal lines of the reflective surfaces 1120 form different angles with the rotating shaft 1130. This may be to cause scan fields of rays of laser light irradiated from the reflective surfaces 1120 to be different in order to expand the scan field of the lidar device.

In addition, the reflective surfaces 1120 may have a rectangular shape but is not limited thereto and may have various other shapes such as a triangular shape and a trapezoidal shape.

In addition, the body 1110 may be configured to support the reflective surfaces 1120 and may include the upper portion 1112, the lower portion 1111, and a column 1113 connecting the upper portion 1112 and the lower portion 1111. In this case, the column 1113 may be installed to connect centers of the upper portion 1112 and the lower portion 1111 of the body 1110, may be installed to connect each vertex of the upper portion 1112 and the lower portion 1111 of the body 1110, or may be installed to connect each corner of the upper portion 1112 and the lower portion 1111 of the body 1110, but the column 1113 may have any other structure capable of connecting and supporting the upper portion 1112 and the lower portion 1111 of the body 1110 without limitations.

In addition, the body 1110 may be engaged with a driver 1140 to receive a driving force for rotation, may be engaged with the driver 1140 via the lower portion 1111 of the body 1110, or may be engaged with the driver 1140 via the upper portion 1112 of the body 1110.

In addition, the upper portion 1112 and the lower portion 1111 of the body 1110 may have a polygon shape. In this case, the shapes of the upper portion 1112 of the body 1110 and the lower portion 1111 of the body 1110 may be the same, but embodiments are not limited thereto, and the shapes of the upper portion 1112 of the body 1110 and the lower portion 1111 of the body 1110 may also be different from each other.

In addition, sizes of the upper portion 1112 and the lower portion 1111 of the body 1110 may be the same. However, embodiments are not limited thereto, and the sizes of the upper portion 1112 of the body 1110 and the lower portion 1111 of the body 1110 may also be different from each other.

In addition, the upper portion 1112 and/or the lower portion 1111 of the body 1110 may include empty space through which air may pass.

Although the rotating polygon mirror 1100 is illustrated in FIG. 5 to have a hexahedral shape which is in the form of a quadrangular column including four reflective surfaces 1120, the number of reflective surfaces 1120 of the rotating polygon mirror 1100 is not necessarily four, and the rotating polygon mirror 1100 does not necessarily have the hexahedral shape in the form of the quadrangular column.

In addition, to detect a rotating angle of the rotating polygon mirror 1100, the lidar device may further include an encoder. The lidar device may control an operation of the rotating polygon mirror 1100 using the detected rotating angle. In this case, the encoder may be included in the rotating polygon mirror 1100 or disposed to be spaced apart from the rotating polygon mirror 1100.

5.2 FOV

The FOV required for the lidar device may vary according to purposes of use of the lidar device. For example, as wide a FOV as possible in the vertical and horizontal directions may be required in the case of a fixed type lidar device used for 3D mapping, and a relatively narrower FOV may be required in the vertical direction in comparison to a relatively wide FOV in the horizontal direction in the case of a lidar device disposed in a vehicle. Also, as wide a FOV as possible in the vertical and horizontal directions may be required for a lidar device disposed in a drone.

In addition, the scan field of the lidar device may be determined on the basis of the number of reflective surfaces of the rotating polygon mirror, and accordingly, the FOV of the lidar device may be determined. Therefore, the number of reflective surfaces of the rotating polygon mirror may be determined on the basis of the required FOV of the lidar device.

5.2.1 Number of Reflective Surfaces and FOV

Figure 6:
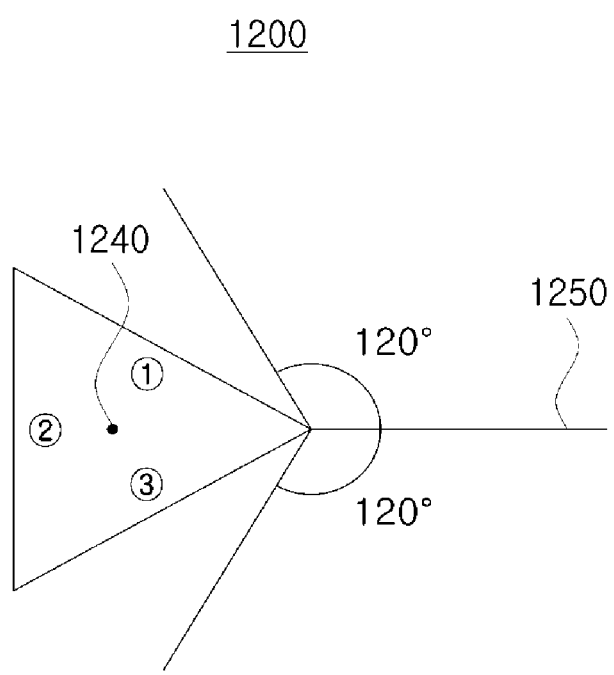
FIG. 6 is a top view for describing a field of view of a rotating polygon mirror which has three reflective surfaces and a body having an upper portion and a lower portion each formed in the shape of an equilateral triangle.
Figure 7:
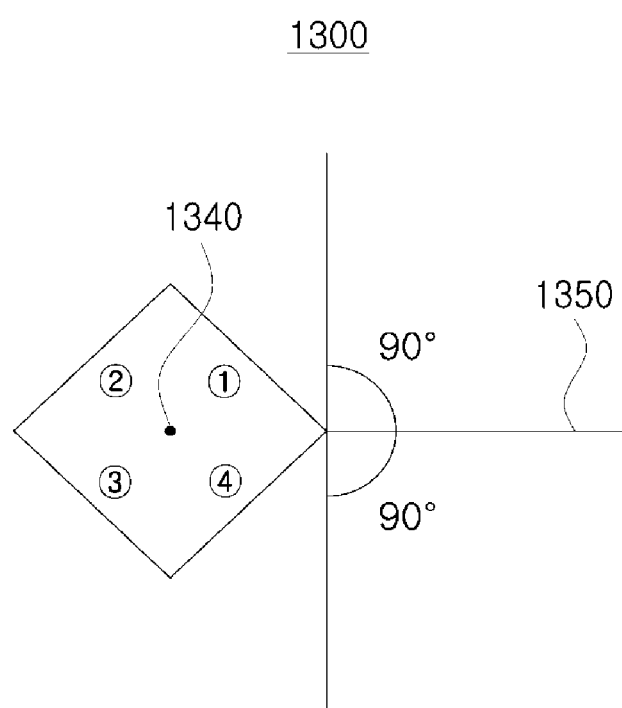
FIG. 7 is a top view for describing a field of view of a rotating polygon mirror which has four reflective surfaces and a body having an upper portion and a lower portion each formed in the shape of a square.
Figure 8:
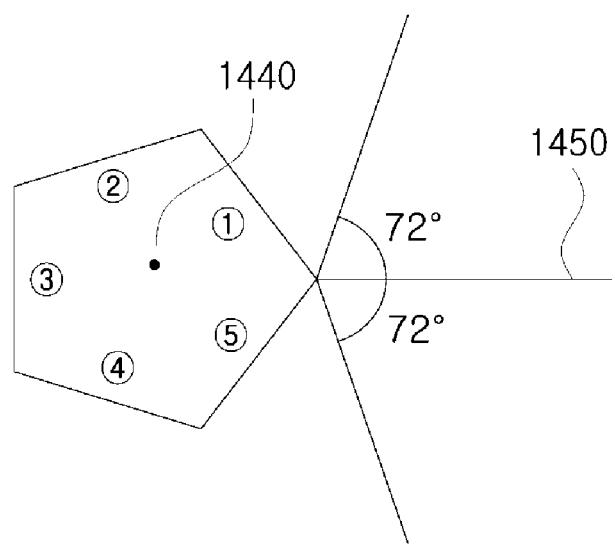
FIG. 8 is a top view for describing a field of view of a rotating polygon mirror which has five reflective surfaces and a body having an upper portion and a lower portion each formed in the shape of a regular pentagon.

FIGS. 6 to 8 are views for describing the relationship between the number of reflective surfaces and the FOV.

The cases in which the number of reflective surfaces is three, four, and five will be described with reference to FIGS. 6 to 8, respectively, but the number of reflective surfaces is not limited thereto, and the FOV may be easily calculated by analogy with the following description even when the number of reflective surfaces is none of the above. Also, the cases in which the upper portion and the lower portion of the body have a regular polygon shape will be described with reference to FIGS. 6 to 8, but the FOV may be easily calculated by analogy with the following description even when the upper portion and the lower portion of the body do not have a regular polygon shape.

FIG. 6 is a top view for describing a FOV of a rotating polygon mirror 1200 which has three reflective surfaces and a body having an upper portion and a lower portion each formed in the shape of an equilateral triangle.

Referring to FIG. 6, laser light 1250 may be incident in a direction coinciding with a rotating shaft 1240 of the rotating polygon mirror 1200. Here, since an upper portion of the rotating polygon mirror 1200 has the shape of an equilateral triangle, angles formed between the three reflective surfaces may be 60°. Also, referring to FIG. 6, when the rotating polygon mirror 1200 is disposed in a state in which it is slightly rotated clockwise, laser light may be reflected upward in the drawing, and when the rotating polygon mirror 1200 is disposed in a state in which it is slightly rotated counterclockwise, laser light may be reflected downward in the drawing. Therefore, when a path of reflected laser light is calculated by referring to FIG. 6, a maximum FOV of the rotating polygon mirror is known.

For example, when laser light is reflected via a first reflective surface of the rotating polygon mirror 1200, the reflected laser light may be reflected upward at an angle of 120° with the incident laser light 1250. Also, when laser light is reflected via a third reflective surface of the rotating polygon mirror, the reflected laser light may be reflected downward at an angle of 120° with the incident laser light.

Therefore, when the number of reflective surfaces of the rotating polygon mirror 1200 is three and the upper portion and the lower portion of the body have the shape of an equilateral triangle, the maximum FOV of the rotating polygon mirror may be 240°.

FIG. 7 is a top view for describing a FOV of a rotating polygon mirror which has four reflective surfaces and a body having an upper portion and a lower portion each formed in the shape of a square.

Referring to FIG. 7, laser light 1350 may be incident in a direction coinciding with a rotating shaft 1340 of a rotating polygon mirror 1300. Here, since an upper portion of the rotating polygon mirror 1300 has the shape of a square, angles formed between the four reflective surfaces may be 90°. Also, referring to FIG. 7, when the rotating polygon mirror 1300 is disposed in a state in which it is slightly rotated clockwise, laser light may be reflected upward in the drawing, and when the rotating polygon mirror 1300 is disposed in a state in which it is slightly rotated counterclockwise, laser light may be reflected downward in the drawing. Therefore, when a path of reflected laser light is calculated by referring to FIG. 7, a maximum FOV of the rotating polygon mirror 1300 is known.

For example, when laser light is reflected via a first reflective surface of the rotating polygon mirror 1300, the reflected laser light may be reflected upward at an angle of 90° with the incident laser light 1350. Also, when laser light is reflected via a fourth reflective surface of the rotating polygon mirror 1300, the reflected laser light may be reflected downward at an angle of 90° with the incident laser light 1350.

Therefore, when the number of reflective surfaces of the rotating polygon mirror 1300 is four and the upper portion and the lower portion of the body have the shape of a square, the maximum FOV of the rotating polygon mirror 1300 may be 180°.

FIG. 8 is a top view for describing a FOV of a rotating polygon mirror which has five reflective surfaces and a body having an upper portion and a lower portion each formed in the shape of a regular pentagon.

Referring to FIG. 8, laser light 1450 may be incident in a direction coinciding with a rotating shaft 1440 of a rotating polygon mirror 1400. Here, since an upper portion of the rotating polygon mirror 1400 has the shape of a regular pentagon, angles formed between the five reflective surfaces may be 108°. Also, referring to FIG. 8, when the rotating polygon mirror 1400 is disposed in a state in which it is slightly rotated clockwise, laser light may be reflected upward in the drawing, and when the rotating polygon mirror 1400 is disposed in a state in which it is slightly rotated counterclockwise, laser light may be reflected downward in the drawing. Therefore, when a path of reflected laser light is calculated by referring to FIG. 8, a maximum FOV of the rotating polygon mirror is known.

For example, when laser light is reflected via a first reflective surface of the rotating polygon mirror 1400, the reflected laser light may be reflected upward at an angle of 72° with the incident laser light 1450. Also, when laser light is reflected via a fifth reflective surface of the rotating polygon mirror 1400, the reflected laser light may be reflected downward at an angle of 72° with the incident laser light 1450.

Therefore, when the number of reflective surfaces of the rotating polygon mirror 1400 is five and the upper portion and the lower portion of the body have the shape of a regular pentagon, the maximum FOV of the rotating polygon mirror may be 144°.

As a result, referring to FIGS. 6 to 8 described above, in the case in which the number of reflective surfaces of the rotating polygon mirror is N and the upper portion and the lower portion of the body have the shape of a polygon having N sides, if an internal angle of the polygon having N sides is θ, the maximum FOV of the rotating polygon mirror may be (360°−2θ).

However, since the above-described FOV of the rotating polygon mirror is merely a calculated maximum value, a FOV determined by the rotating polygon mirror in the lidar device may be smaller than the calculated maximum value. Also, in this case, the lidar device may only use a portion of each reflective surface of the rotating polygon mirror in scanning.

5.3 Irradiation Portion and Light Reception Portion

When the scanner of the lidar device includes the rotating polygon mirror, the rotating polygon mirror may be used to irradiate laser light output from the laser light emitting unit toward the scan field of the lidar device or may be used to cause the sensor to receive laser light reflected from an object present within the scan field.

Here, a portion of each reflective surface of the rotating polygon mirror used to irradiate the output laser light toward the scan field of the lidar device will be referred to as the irradiation portion. Also, a portion of each reflective surface of the rotating polygon mirror used to cause the sensor to receive the laser light reflected from the object present within the scan field will be referred to as the light reception portion.

Figure 9:
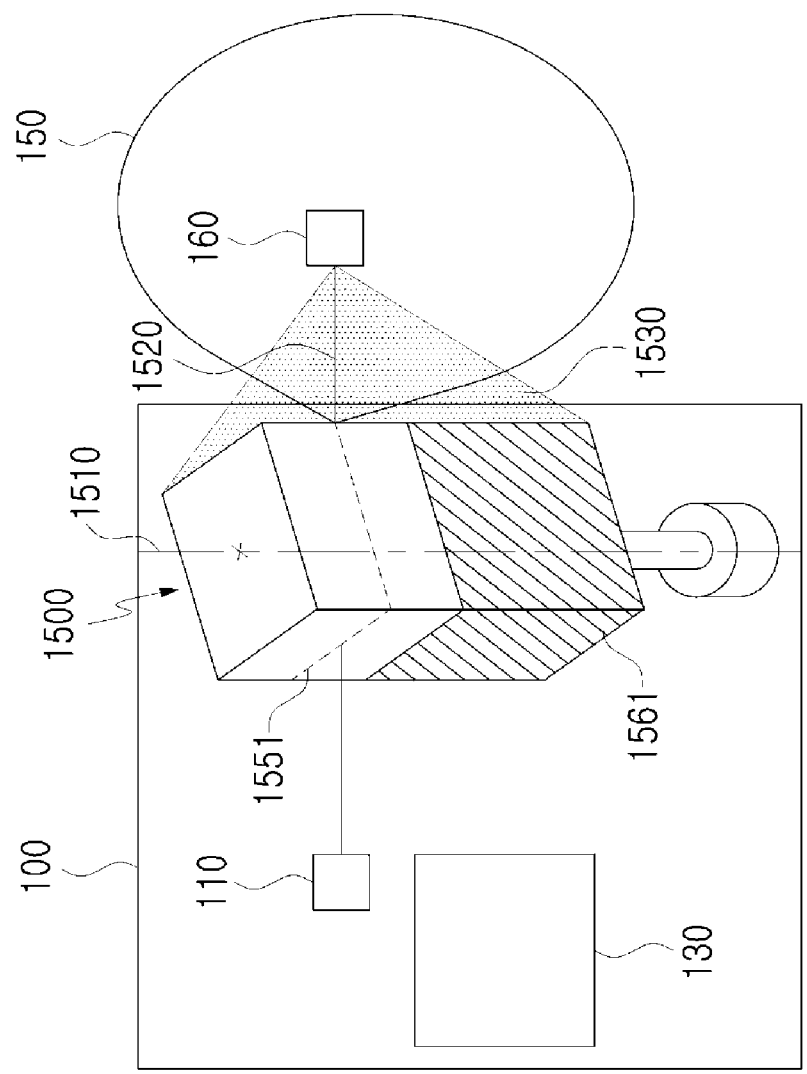
FIG. 9 is a view for describing an irradiation portion and a light reception portion of a rotating polygon mirror according to an embodiment.

5.3.1 Rotating Polygon Mirror Having Irradiation Portion and Light Reception Portion 5.3.1.1 Rotating Polygon Mirror of Lidar Device Including Rotating Polygon Mirror FIG. 9 is a view for describing an irradiation portion and a light reception portion of a rotating polygon mirror according to an embodiment.

Referring to FIG. 9, laser light output from the laser light emitting unit 110 may have an irradiation field in the form of a point and may be incident on reflective surfaces of a rotating polygon mirror 1500. However, although not shown in FIG. 9, the laser light output from the laser light emitting unit 110 may also have an irradiation field in the form of a line or a plane.

When the laser light output from the laser light emitting unit 110 has an irradiation field in the form of a point, in the rotating polygon mirror 1500, an irradiation portion 1551 may have the form of a line in which points where the output laser light meets the rotating polygon mirror are connected in a rotating direction of the rotating polygon mirror. Therefore, in this case, the irradiation portion 1551 of the rotating polygon mirror 1500 may be disposed, at each reflective surface, in the form of a line which is perpendicular to a rotating shaft 1510 of the rotating polygon mirror 1500.

In addition, the laser light irradiated from the irradiation portion 1551 of the rotating polygon mirror 1500 and then irradiated toward the scan field 150 of the lidar device 100 may be reflected from the object 160 present within the scan field 150, and laser light 1530 reflected from the object 160 may be reflected within a wider range than the irradiated laser light 1520. Therefore, the laser light 1530 reflected from the object 160 may be parallel with the irradiated laser light and may be received within a wider range by the lidar device 100.

In this case, the laser light 1530 reflected from the object 160 may be transmitted in a larger size than a size of each reflective surface of the rotating polygon mirror 1500. A light reception portion 1561 of the rotating polygon mirror 1500 is a portion for causing the sensor 130 to receive the laser light 1530 reflected from the object 160 and may be a portion of the reflective surface of the rotating polygon mirror 1500 whose size is smaller than that of the reflective surface. For example, when, as shown in FIG. 9, the laser light 1530 reflected from the object 160 is transmitted toward the sensor 130 via the rotating polygon mirror 1500, a portion of the reflective surface of the rotating polygon mirror 1500 reflecting the laser light 1530 toward the sensor 130 so that the laser light 1530 is transmitted thereto may be the light reception portion 1561. Therefore, the light reception portion 1561 of the rotating polygon mirror 1500 may be a portion at which a portion of the reflective surface reflecting the laser light 1530 toward the sensor 130 so that the laser light 1530 is transmitted thereto is extended in the rotating direction of the rotating polygon mirror 1500.

In addition, when the lidar device 100 further includes a condensing lens disposed between the rotating polygon mirror 1500 and the sensor 130, the light reception portion 1561 of the rotating polygon mirror 1500 may be a portion at which a portion of the reflective surface reflecting the laser light 1530 toward the condensing lens so that the laser light 1530 is transmitted thereto is extended in the rotating direction of the rotating polygon mirror 1500.

Although the irradiation portion 1551 and the light reception portion 1561 of the rotating polygon mirror 1500 have been illustrated in FIG. 9 as being spaced apart from each other, the irradiation portion 1551 and the light reception portion 1561 of the rotating polygon mirror 1500 may also partially overlap with each other, or the irradiation portion 1551 may be included inside the light reception portion 1561.

Figure 10:
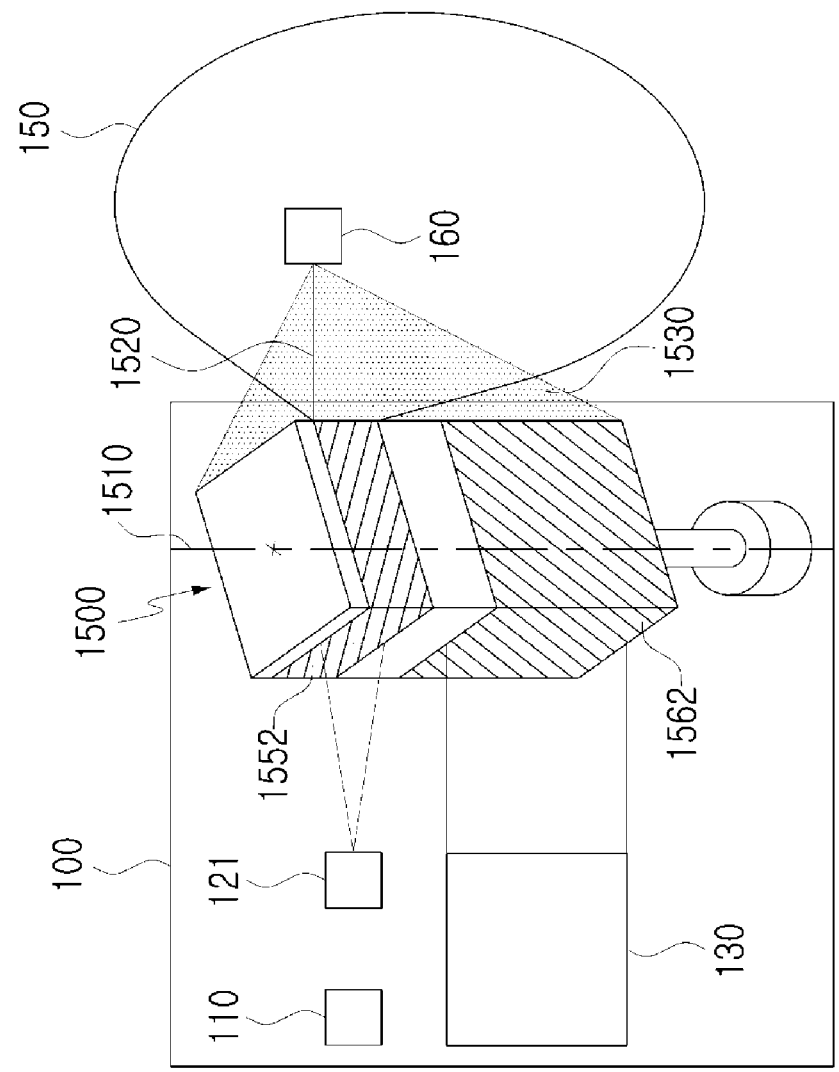
FIG. 10 is a view for describing an irradiation portion and a light reception portion of a rotating polygon mirror according to another embodiment.

5.3.1.2 Rotating Polygon Mirror of Lidar Device Including First Scanner and Rotating Polygon Mirror FIG. 10 is a view for describing an irradiation portion and a light reception portion of a rotating polygon mirror according to another embodiment.

Referring to FIG. 10, laser light irradiated from the first scanner 121 may have an irradiation field in the form of a line and may be incident on a reflective surface of the rotating polygon mirror 1500. Although not shown in FIG. 10, the laser light irradiated from the first scanner 121 may also have an irradiation field in the form of a plane.

When the laser light irradiated from the first scanner 121 has an irradiation field in the form of a line, in the rotating polygon mirror 1500, an irradiation portion 1552 may have the form of a plane in which a group of points forming a line where the irradiation field of the irradiated laser light meets the rotating polygon mirror 1500 is connected in a rotating direction of the rotating polygon mirror 1500. Therefore, in this case, the irradiation portion 1552 of the rotating polygon mirror 1500 may be disposed, at each reflective surface, in the form of a plane having a normal line perpendicular to the rotating shaft 1510 of the rotating polygon mirror.

In addition, the laser light irradiated from the irradiation portion 1552 of the rotating polygon mirror 1500 and then irradiated toward the scan field 150 of the lidar device 100 may be reflected from the object 160 present within the scan field 150, and laser light 1530 reflected from the object 160 may be reflected within a wider range than the irradiated laser light. Therefore, the laser light 1530 reflected from the object 160 may be parallel with the irradiated laser light 1520 and may be received within a wider range by the lidar device 100.

In this case, the laser light 1530 reflected from the object 160 may be transmitted in a larger size than a size of each reflective surface of the rotating polygon mirror 1500. A light reception portion 1562 of the rotating polygon mirror 1500 is a portion for causing the sensor 130 to receive the laser light 1530 reflected from the object 160 and may be a portion of the reflective surface of the rotating polygon mirror 1500 whose size is smaller than that of the reflective surface. For example, when, as shown in FIG. 10, the laser light 1530 reflected from the object 160 is transmitted toward the sensor 130 via the rotating polygon mirror 1500, a portion of the reflective surface of the rotating polygon mirror 1500 reflecting the laser light 1530 toward the sensor 130 so that the laser light 1530 is transmitted thereto may be the light reception portion 1562. Therefore, the light reception portion 1562 of the rotating polygon mirror 1500 may be a portion at which a portion of the reflective surface reflecting the laser light 1530 toward the sensor 130 so that the laser light 1530 is transmitted thereto is extended in the rotating direction of the rotating polygon mirror 1500.

In addition, when the lidar device 100 further includes a condensing lens disposed between the rotating polygon mirror 1500 and the sensor 130, the light reception portion 1562 of the rotating polygon mirror 1500 may be a portion at which a portion of the reflective surface reflecting the laser light 1530 toward the condensing lens so that the laser light 1530 is transmitted thereto is extended in the rotating direction of the rotating polygon mirror 1500.

Although the irradiation portion 1552 and the light reception portion 1562 of the rotating polygon mirror 1500 have been illustrated in FIG. 10 as being spaced apart from each other, the irradiation portion 1552 and the light reception portion 1562 of the rotating polygon mirror 1500 may also partially overlap with each other, or the irradiation portion 1552 may be included inside the light reception portion 1562.

Figure 11:
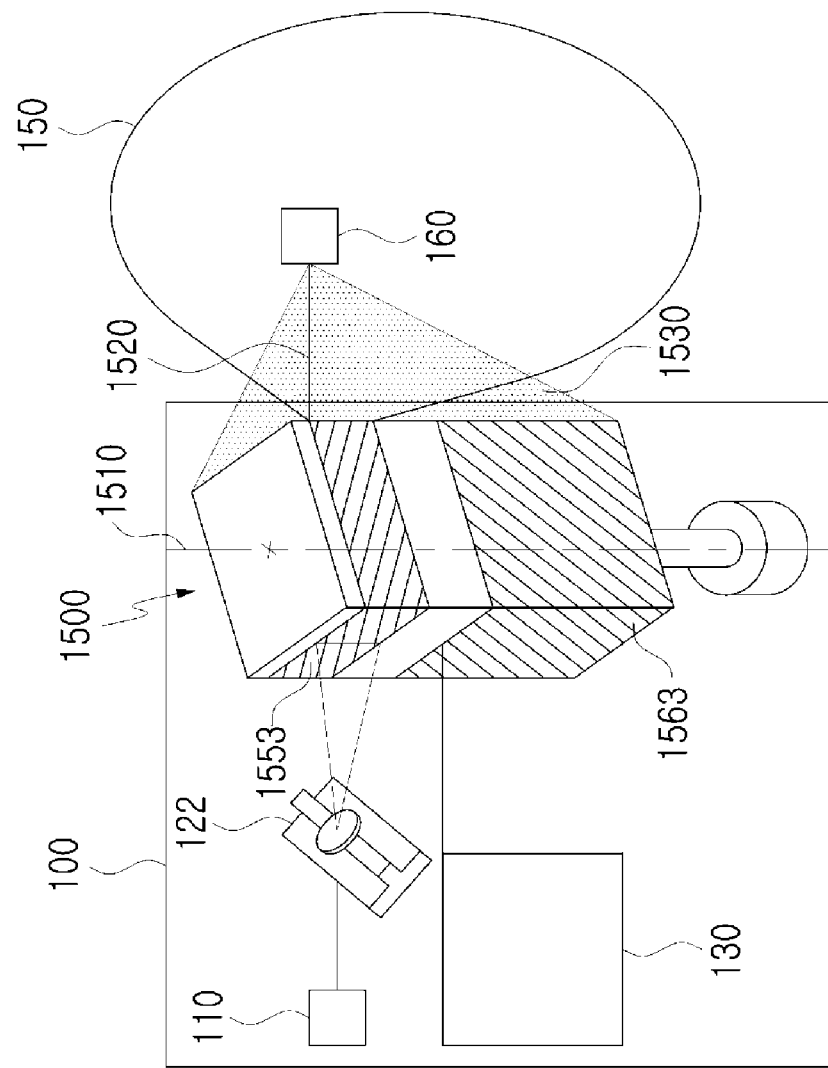
FIG. 11 is a view for describing an irradiation portion and a light reception portion of a rotating polygon mirror according to still another embodiment.

5.3.1.3 Rotating Polygon Mirror of Lidar Device Including Nodding Mirror and Rotating Polygon Mirror FIG. 11 is a view for describing an irradiation portion and a light reception portion of a rotating polygon mirror according to still another embodiment Referring to FIG. 11, laser light irradiated from the nodding mirror 122 may have an irradiation field in the form of a line and may be incident on a reflective surface of the rotating polygon mirror 1500. Although not shown in FIG. 11, the laser light irradiated from the nodding mirror 122 may also have an irradiation field in the form of a plane.

When the laser light irradiated from the nodding mirror 122 has an irradiation field in the form of a line, in the rotating polygon mirror 1500, an irradiation portion 1553 may have the form of a plane in which lines where the irradiation field of the irradiated laser light meets the rotating polygon mirror 1500 are connected in a rotating direction of the rotating polygon mirror 1500. Therefore, in this case, the irradiation portion 1555 of the rotating polygon mirror 1500 may be disposed, at each reflective surface, in the form of a plane having a normal line perpendicular to the rotating shaft 1510 of the rotating polygon mirror 1500.

In addition, the laser light irradiated from the irradiation portion 1553 of the rotating polygon mirror 1500 and then irradiated toward the scan field 150 of the lidar device 100 may be reflected from the object 160 present within the scan field 150, and laser light 1530 reflected from the object 160 may be reflected within a wider range than the irradiated laser light 1520. Therefore, the laser light 1530 reflected from the object 160 may be parallel with the irradiated laser light 1520 and may be received within a wider range by the lidar device 100.

In this case, the laser light 1530 reflected from the object 160 may be transmitted in a larger size than a size of each reflective surface of the rotating polygon mirror 1500. A light reception portion 1563 of the rotating polygon mirror 1500 is a portion for causing the sensor 130 to receive the laser light 1530 reflected from the object 160 and may be a portion of the reflective surface of the rotating polygon mirror 1500 whose size is smaller than that of the reflective surface. For example, when, as shown in FIG. 11, the laser light 1530 reflected from the object 160 is transmitted toward the sensor 130 via the rotating polygon mirror 1500, a portion of the reflective surface of the rotating polygon mirror 1500 reflecting the laser light 1530 toward the sensor 130 so that the laser light 1530 is transmitted thereto may be the light reception portion 1563. Therefore, the light reception portion 1563 of the rotating polygon mirror 1500 may be a portion at which a portion of the reflective surface reflecting the laser light 1530 toward the sensor 130 so that the laser light 1530 is transmitted thereto is extended in the rotating direction of the rotating polygon mirror 1500.

In addition, when the lidar device 100 further includes a condensing lens disposed between the rotating polygon mirror 1500 and the sensor 130, the light reception portion 1563 of the rotating polygon mirror 1500 may be a portion at which a portion of the reflective surface reflecting the laser light 1530 toward the condensing lens so that the laser light 1530 is transmitted thereto is extended in the rotating direction of the rotating polygon mirror 1500.

Although the irradiation portion 1553 and the light reception portion 1563 of the rotating polygon mirror 1500 have been illustrated in FIG. 11 as being spaced apart from each other, the irradiation portion 1553 and the light reception portion 1563 of the rotating polygon mirror 1500 may also partially overlap with each other, or the irradiation portion 1553 may be included inside the light reception portion 1563.

5.3.2 Irradiation Path and Light Reception Path of Lidar Device Including Rotating Polygon Mirror Having Irradiation Portion and Light Reception Portion A path along which laser light output from the laser light emitting unit of the lidar device reaches an object located within a scan field will be referred to as the irradiation path, and a path along which laser light reflected from the object reaches the sensor will be referred to as the light reception path.

The irradiation path and light reception path of the lidar device including the rotating polygon mirror having the irradiation portion and the light reception portion will be described below.

5.3.2.1 Lidar Device Including Rotating Polygon Mirror

Referring back to FIG. 9, the lidar device 100 according to an embodiment may include the laser light emitting unit 110, the rotating polygon mirror 1500, and the sensor 130.

Here, laser light output from the laser light emitting unit 110 of the lidar device 100 may be irradiated toward the scan field 150 of the lidar device 100 via the rotating polygon mirror 1500.

Specifically, laser light may be output from the laser light emitting unit 110 toward the rotating polygon mirror 1500, and the rotating polygon mirror 1500 may receive and reflect the output laser light to irradiate the laser light toward the scan field 150 of the lidar device 100. In this case, an irradiation field of the output laser light may be in the form of a point.

In this case, the irradiation portion 1551 of the rotating polygon mirror 1500 may have the form of a line in which points where the output laser light meets the rotating polygon mirror 1500 are connected in the rotating direction of the rotating polygon mirror 1500. Therefore, in this case, the irradiation portion 1551 of the rotating polygon mirror 1500 may be disposed, at each reflective surface, in the form of a line which is perpendicular to the rotating shaft 1510 of the rotating polygon mirror 1500.

In addition, the irradiation path of the lidar device 100 may be a path extending from the laser light emitting unit 110 to the scan field 150 via the irradiation portion 1551 of the rotating polygon mirror 1500. Therefore, the irradiation portion 1551 of the rotating polygon mirror 1500 may be included in the irradiation path of the lidar device 100.

In addition, the laser light irradiated toward the scan field 150 of the lidar device 100 may be reflected from the object 160 present within the scan field 150 and transmitted toward the sensor 130 via the rotating polygon mirror 1500.

Specifically, the laser light irradiated toward the scan field 150 of the lidar device 100 may be reflected from the object 160 present within the scan field 150 of the lidar device 100. Also, the laser light reflected from the object 160 may move toward the rotating polygon mirror 1500, and the rotating polygon mirror 1500 may receive and reflect the laser light 1530 reflected from the object 160 to irradiate the laser light 1530 toward the sensor 130.

In this case, the light reception portion 1561 of the rotating polygon mirror 1500 is a portion for causing the sensor 130 to receive the laser light 1530 reflected from the object 160 and may be a portion of the reflective surface of the rotating polygon mirror 1500 whose size is smaller than that of the reflective surface. Therefore, in this case, the light reception portion 1561 of the rotating polygon mirror 1500 may be a portion at which a portion of the reflective surface reflecting the laser light 1530 toward the sensor 130 so that the laser light 1530 is transmitted thereto is extended in the rotating direction of the rotating polygon mirror 1500.

In addition, the light reception path of the lidar device 100 may be a path extending from the object 160 to the sensor 130 via the light reception portion 1561 of the rotating polygon mirror 1500. Therefore, the light reception portion 1561 of the rotating polygon mirror 1500 may be included in the light reception path of the lidar device 100.

In addition, the laser light 1530 reflected from the object 160 may be irradiated toward the sensor 130 via the rotating polygon mirror 1500. That is, the laser light 1530 reflected from the object 160 may be irradiated toward the sensor 130 via the rotating polygon mirror 1500, and the lidar device 100 may include another optical device, such as a condensing lens, disposed between the rotating polygon mirror 1500 and the sensor 130.

5.3.2.2 Lidar Device Including First Scanner and Rotating Polygon Mirror

Referring back to FIG. 10, the lidar device according to an embodiment may include the laser light emitting unit 110, the first scanner 121, and the sensor 130.

Here, laser light output from the laser light emitting unit 110 of the lidar device 100 may be irradiated toward the scan field 150 of the lidar device 100 via the first scanner 121 and the rotating polygon mirror 1500.

Specifically, laser light may be output from the laser light emitting unit 110 toward the first scanner 121, and the first scanner 121 may receive and reflect the output laser light to irradiate the laser light toward the rotating polygon mirror 1500, and the rotating polygon mirror 1500 may receive and reflect the laser light irradiated thereto to irradiate the laser light toward the scan field 150 of the lidar device 100. In this case, an irradiation field of the output laser light may be in the form of a point, and an irradiation field of the laser light irradiated from the first scanner 121 may be in the form of a line or a plane.

When laser light irradiated from the first scanner 121 has an irradiation field in the form of a line, the irradiation portion 1552 of the rotating polygon mirror 1500 may have the form of a plane in which lines where the irradiation field of the irradiated laser light meets the rotating polygon mirror 1500 are connected in the rotating direction of the rotating polygon mirror 1500. Therefore, in this case, the irradiation portion 1552 of the rotating polygon mirror 1500 may be disposed, at each reflective surface, in the form of a plane having a normal line perpendicular to the rotating shaft 1510 of the rotating polygon mirror 1500.

In addition, the irradiation path of the lidar device 100 may be a path moving toward the irradiation portion of the rotating polygon mirror 1500 from the laser light emitting unit 110 via the first scanner 121 and extending to the scan field 150 via the irradiation portion 1552 of the rotating polygon mirror 1500. Therefore, the irradiation portion 1552 of the rotating polygon mirror 1500 may be included in the irradiation path of the lidar device 100.

In addition, the laser light irradiated toward the scan field 150 of the lidar device 100 may be reflected from the object 160 present within the scan field 150 and be transmitted toward the sensor 130 via the rotating polygon mirror 1500.

Specifically, the laser light irradiated toward the scan field 150 of the lidar device 100 may be reflected from the object 160 present within the scan field 150 of the lidar device 100. Also, the laser light 1530 reflected from the object 160 may move toward the rotating polygon mirror 1500, and the rotating polygon mirror 1500 may receive and reflect the laser light 1530 reflected from the object 160 to irradiate the laser light 1530 toward the sensor 130.

In this case, the light reception portion 1562 of the rotating polygon mirror 1500 is a portion for causing the sensor 130 to receive the laser light 1530 reflected from the object 160 and may be a portion of the reflective surface of the rotating polygon mirror 1500 whose size is smaller than that of the reflective surface. Therefore, in this case, the light reception portion 1562 of the rotating polygon mirror 1500 may be a portion at which a portion of the reflective surface reflecting the laser light 1530 toward the sensor 130 so that the laser light 1530 is transmitted thereto is extended in the rotating direction of the rotating polygon mirror 1500.

In addition, the light reception path of the lidar device 100 may be a path extending from the object 160 to the sensor 130 via the light reception portion 1562 of the rotating polygon mirror 1500. Therefore, the light reception portion 1562 of the rotating polygon mirror 1500 may be included in the light reception path of the lidar device 100.

In addition, the laser light reflected from the object 160 may be irradiated toward the sensor 130 via the rotating polygon mirror 1500. That is, the laser light 1530 reflected from the object 160 may be irradiated toward the sensor 130 via the rotating polygon mirror 1500, and the lidar device 100 may include another optical device, such as a condensing lens, disposed between the rotating polygon mirror 1500 and the sensor 130.

5.3.2.3 Lidar Device Including Nodding Mirror and Rotating Polygon Mirror

Referring back to FIG. 11, the lidar device 100 according to an embodiment may include the laser light emitting unit 110, the nodding mirror 122, the rotating polygon mirror 1500, and the sensor 130.

Here, laser light output from the laser light emitting unit 110 of the lidar device 100 may be irradiated toward the scan field 150 of the lidar device 100 via the nodding mirror 122 and the rotating polygon mirror 1500.

Specifically, laser light may be output from the laser light emitting unit 110 toward the nodding mirror 122, and the nodding mirror 122 may receive and reflect the output laser light to irradiate the laser light toward the rotating polygon mirror 1500, and the rotating polygon mirror 1500 may receive and reflect the laser light irradiated thereto to irradiate the laser light toward the scan field 150 of the lidar device 100. In this case, an irradiation field of the output laser light may be in the form of a point, and an irradiation field of the laser light irradiated from the nodding mirror may be in the form of a line or a plane.

When laser light irradiated from the nodding mirror 122 has an irradiation field in the form of a line, the irradiation portion 1553 of the rotating polygon mirror 1500 may have the form of a plane in which lines where the irradiation field of the irradiated laser light meets the rotating polygon mirror 1500 are connected in the rotating direction of the rotating polygon mirror 1500. Therefore, in this case, the irradiation portion 1553 of the rotating polygon mirror 1500 may be disposed, at each reflective surface, in the form of a plane having a normal line perpendicular to the rotating shaft of the rotating polygon mirror 1500.

In addition, the irradiation path of the lidar device 100 may be a path moving toward the irradiation portion 1553 of the rotating polygon mirror 1500 from the laser light emitting unit 110 via the nodding mirror 122 and extending to the scan field 150 via the irradiation portion 1553 of the rotating polygon mirror 1500. Therefore, the irradiation portion 1553 of the rotating polygon mirror 1500 may be included in the irradiation path of the lidar device 100.

In addition, the laser light irradiated toward the scan field 150 of the lidar device 100 may be reflected from the object 160 present within the scan field 150 and be transmitted toward the sensor 130 via the rotating polygon mirror 1500.

Specifically, the laser light irradiated toward the scan field 150 of the lidar device 100 may be reflected from the object 160 present within the scan field 150 of the lidar device 100. Also, the laser light 1530 reflected from the object 160 may move toward the rotating polygon mirror 1500, and the rotating polygon mirror 1500 may receive and reflect the laser light 1530 reflected from the object 160 to irradiate the laser light 1530 toward the sensor 130.

In this case, the light reception portion 1563 of the rotating polygon mirror 1500 is a portion for causing the sensor 130 to receive the laser light 1530 reflected from the object 160 and may be a portion of the reflective surface of the rotating polygon mirror 1500 whose size is smaller than that of the reflective surface. Therefore, in this case, the light reception portion 1563 of the rotating polygon mirror 1500 may be a portion at which a portion of the reflective surface reflecting the laser light 1530 toward the sensor 130 so that the laser light 1530 is transmitted thereto is extended in the rotating direction of the rotating polygon mirror.

In addition, the light reception path of the lidar device 100 may be a path extending from the object 160 to the sensor 130 via the light reception portion 1563 of the rotating polygon mirror 1500. Therefore, the light reception portion 1563 of the rotating polygon mirror 1500 may be included in the light reception path of the lidar device 100.

In addition, the laser light 1530 reflected from the object 160 may be irradiated toward the sensor 130 via the rotating polygon mirror 1500. That is, the laser light 1530 reflected from the object 160 may be irradiated toward the sensor 130 via the rotating polygon mirror 1500, and the lidar device 100 may include another optical device, such as a condensing lens, disposed between the rotating polygon mirror 1500 and the sensor 130.

Figure 12:
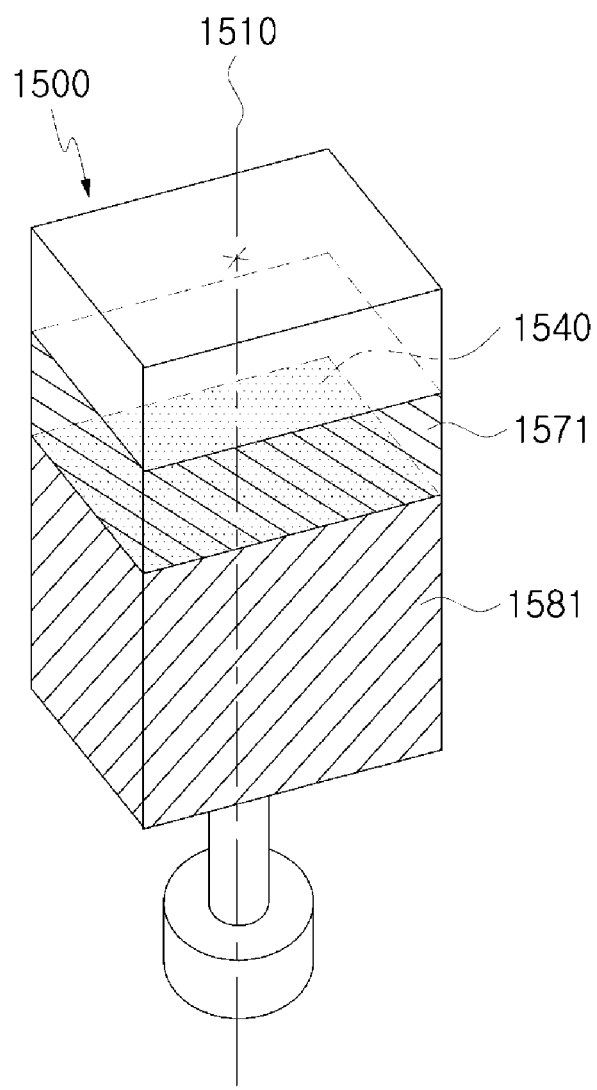
FIG. 12 is a view for describing a positional relationship between an irradiation portion and a light reception portion of a rotating polygon mirror according to an embodiment.

5.3.3 Locations of Irradiation Portion and Light Reception Portion 5.3.3.1 Division Between Irradiation Portion and Light Reception Portion FIG. 12 is a view for describing a positional relationship between an irradiation portion and a light reception portion of a rotating polygon mirror according to an embodiment.

Referring to FIG. 12, an irradiation portion 1571 and a light reception portion 1581 of a rotating polygon mirror 1500 may be set to be divided from each other.

Specifically, the rotating polygon mirror 1500 includes reflective surfaces and a body, and the body includes an upper portion, a lower portion, and a column. Also, in this case, the rotating polygon mirror may rotate about a rotating shaft 1510 passing through centers of the upper portion and the lower portion of the body.

Here, each reflective surface of the rotating polygon mirror 1500 may include the irradiation portion 1571 and the light reception portion 1581 therein, and the irradiation portion 1571 and the light reception portion 1581 may be set to be divided on the basis of a virtual cross-section 1540 which is perpendicular to the rotating shaft 1510 of the rotating polygon mirror 1500.

Here, the virtual cross-section 1540 perpendicular to the rotating shaft 1510 may be located inside the rotating polygon mirror 1500 according to sizes of the irradiation portion 1571 and the light reception portion 1581.

Here, any one of the irradiation portion 1571 and the light reception portion 1581 may be set to be at an upper side on the basis of the virtual cross-section 1540 perpendicular to the rotating shaft 1510, and in this case, the other one thereof may be set to be at a lower side on the basis of the virtual cross-section perpendicular to the rotating shaft.

When the irradiation portion 1571 and the light reception portion 1581 are divided from each other as described above, since the irradiation path and the light reception path of the lidar device are separated from the rotating polygon mirror, an error due to laser light irradiated toward the scan field may be reduced as compared with the case in which the irradiation portion 1571 and the light reception portion 1581 overlap each other, and the amount of laser light transmitted to the sensor may be increased as compared with the case in which the irradiation path and the light reception path are separated from the object within the scan field.

5.3.3.2 Spacing Between Irradiation Portion and Light Reception Portion

Figure 13:
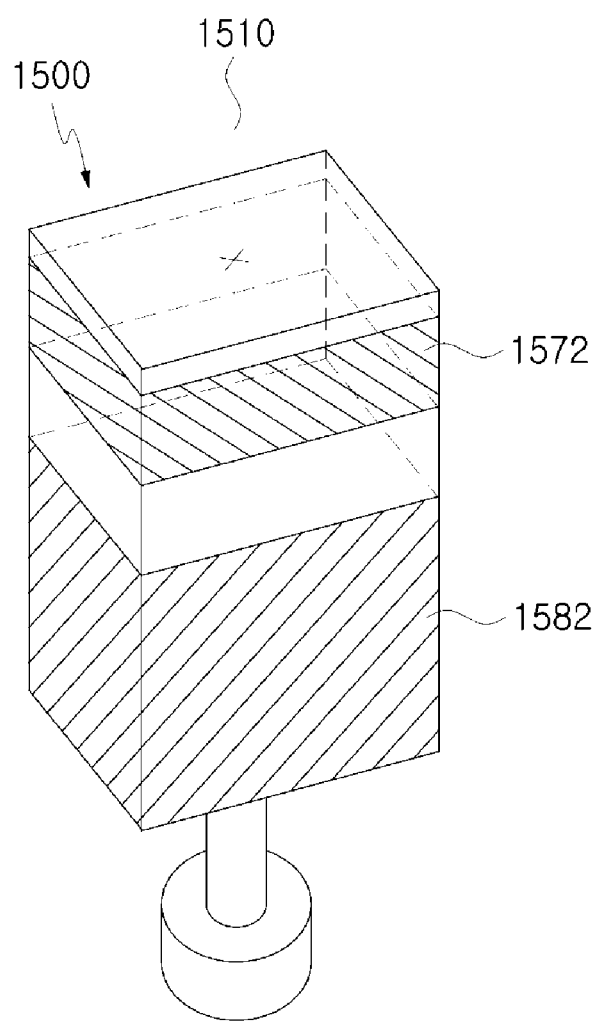
FIG. 13 is a view for describing a positional relationship between an irradiation portion and a light reception portion of a rotating polygon mirror according to another embodiment.

FIG. 13 is a view for describing a positional relationship between an irradiation portion and a light reception portion of a rotating polygon mirror according to another embodiment.

Referring to FIG. 13, an irradiation portion 1572 and a light reception portion 1582 of a rotating polygon mirror 1500 may be set to be spaced apart from each other.

Specifically, the rotating polygon mirror 1500 includes reflective surfaces and a body, and the body includes an upper portion, a lower portion, and a column. Also, in this case, the rotating polygon mirror 1500 may rotate about a rotating shaft 1510 passing through centers of the upper portion and the lower portion of the body.

Here, each reflective surface of the rotating polygon mirror 1500 may include the irradiation portion 1572 and the light reception portion 1582 therein, and the irradiation portion 1572 and the light reception portion 1582 may be set to be spaced apart on the basis of a cross-section which is perpendicular to the rotating shaft 1510 of the rotating polygon mirror 1500.

Here, the cross-section perpendicular to the rotating shaft may be located inside the rotating polygon mirror according to sizes of the irradiation portion 1572 and the light reception portion 1582.

Here, any one of the irradiation portion 1572 and the light reception portion 1582 may be located at an upper side on the basis of the cross-section perpendicular to the rotating shaft, and in this case, the other one thereof may be located at a lower side on the basis of the cross-section perpendicular to the rotating shaft, and the irradiation portion and the light reception portion may be disposed to be spaced apart from each other.

When the irradiation portion 1572 and the light reception portion 1582 are spaced apart from each other as described above, since the irradiation path and the light reception path of the lidar device are further separated from the rotating polygon mirror 1500, an error due to laser light irradiated toward the scan field may be reduced as compared with the case in which the irradiation portion 1572 and the light reception portion 1582 overlap each other, and the amount of laser light transmitted to the sensor may be increased as compared with the case in which the irradiation path and the light reception path are separated from the object within the scan field.

5.3.4 Height of Rotating Polygon Mirror

The rotating polygon mirror used in the lidar device may have an irradiation portion and a light reception portion, and when the irradiation portion and the light reception portion are divided, a height of the rotating polygon mirror may be larger than or equal to a sum of heights of the irradiation portion and the light reception portion.

5.3.4.1 Lidar Device Including Rotating Polygon Mirror

Figure 14:
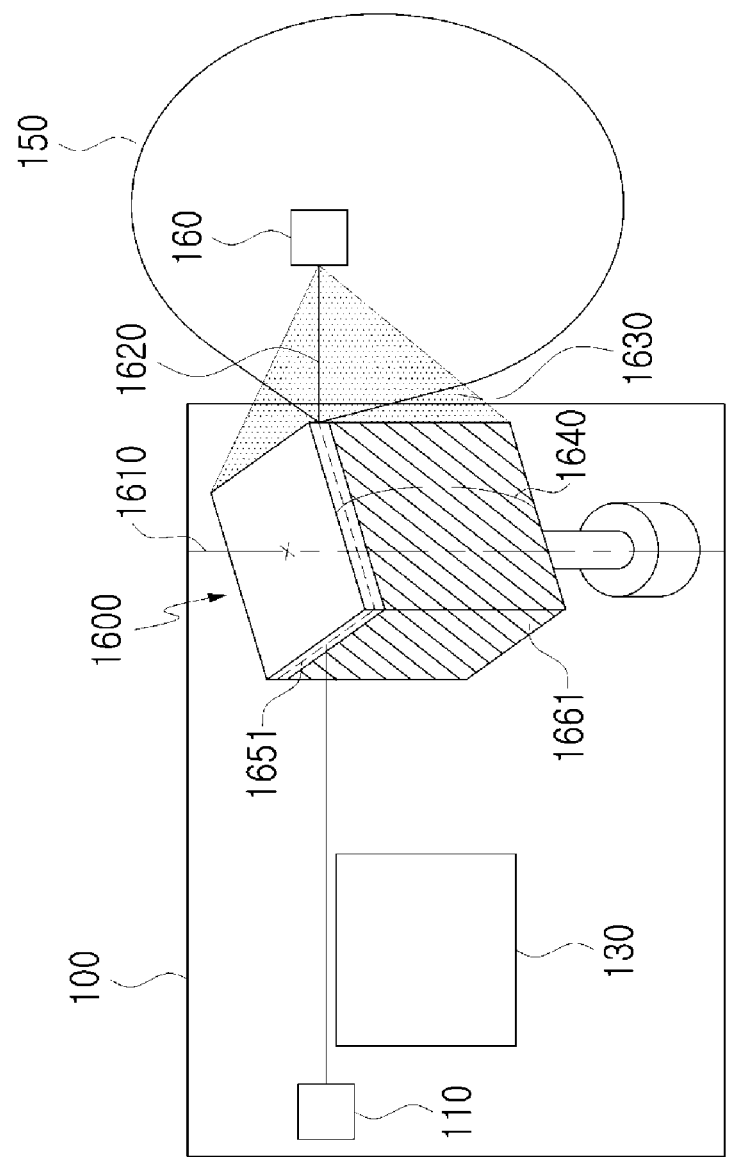
FIG. 14 is a view for describing a height of the rotating polygon mirror according to an embodiment.

FIG. 14 is a view for describing a height of the rotating polygon mirror according to an embodiment.

Referring to FIG. 14, the lidar device 100 including a rotating polygon mirror according to an embodiment may include the laser light emitting unit 110, a rotating polygon mirror 1600, and the sensor 130.

Here, when laser light output from the laser light emitting unit 110 has an irradiation field in the form of a point, an irradiation portion 1651 of the rotating polygon mirror 1600 may have the form of a line in which points where the output laser meets the rotating polygon mirror 1600 are connected in a rotating direction of the rotating polygon mirror 1600. Therefore, a height of the irradiation portion 1651 of the rotating polygon mirror 1600 may be determined on the basis of a diameter of the laser light output from the laser light emitting unit 110.

In addition, when laser light 1630 reflected from the object 160 present within the scan field 150 of the lidar device 100 is transmitted toward the sensor 130 via the rotating polygon mirror 1600, a portion of a reflective surface of the rotating polygon mirror 1600 reflecting the laser light 1630 so that the laser light 1630 is transmitted toward the sensor 130 may be a light reception portion 1661. Also, the light reception portion 1661 may have the form of a plane in which portions reflecting the laser light 1630 so that the laser light 1630 is transmitted toward the sensor 130 are connected in the rotating direction of the rotating polygon mirror 1600. Therefore, a height of the light reception portion 1661 of the rotating polygon mirror 1600 may be determined on the basis of a size of the sensor 130.

Here, since a height 1640 of the rotating polygon mirror 1600 should be larger than or equal to the sum of heights of the irradiation portion 1651 and the light reception portion 1661, the height 1640 of the rotating polygon mirror 1600 may be determined on the basis of a diameter of laser light output from the laser light emitting unit 110 and the size of the sensor 130.

In addition, when the lidar device 100 further includes a condensing lens disposed between the rotating polygon mirror 1600 and the sensor 130, the light reception portion 1661 of the rotating polygon mirror 1600 may be a portion at which a portion of the reflective surface reflecting the laser light 1630 so that the laser light 1630 is transmitted toward the condensing lens is extended in the rotating direction of the rotating polygon mirror 1600. Therefore, the light reception portion 1661 of the rotating polygon mirror 1600 may be determined on the basis of a diameter of the condensing lens.

Here, since the height 1640 of the rotating polygon mirror 1600 has to be larger than or equal to the sum of the heights of the irradiation portion 1651 and the light reception portion 1661, the height of the rotating polygon mirror 1600 may be determined on the basis of the diameter of the laser light output from the laser light emitting unit 110 and a diameter of the condensing lens.

5.3.4.2 Lidar Device Including First Scanner and Rotating Polygon Mirror

Figure 15:
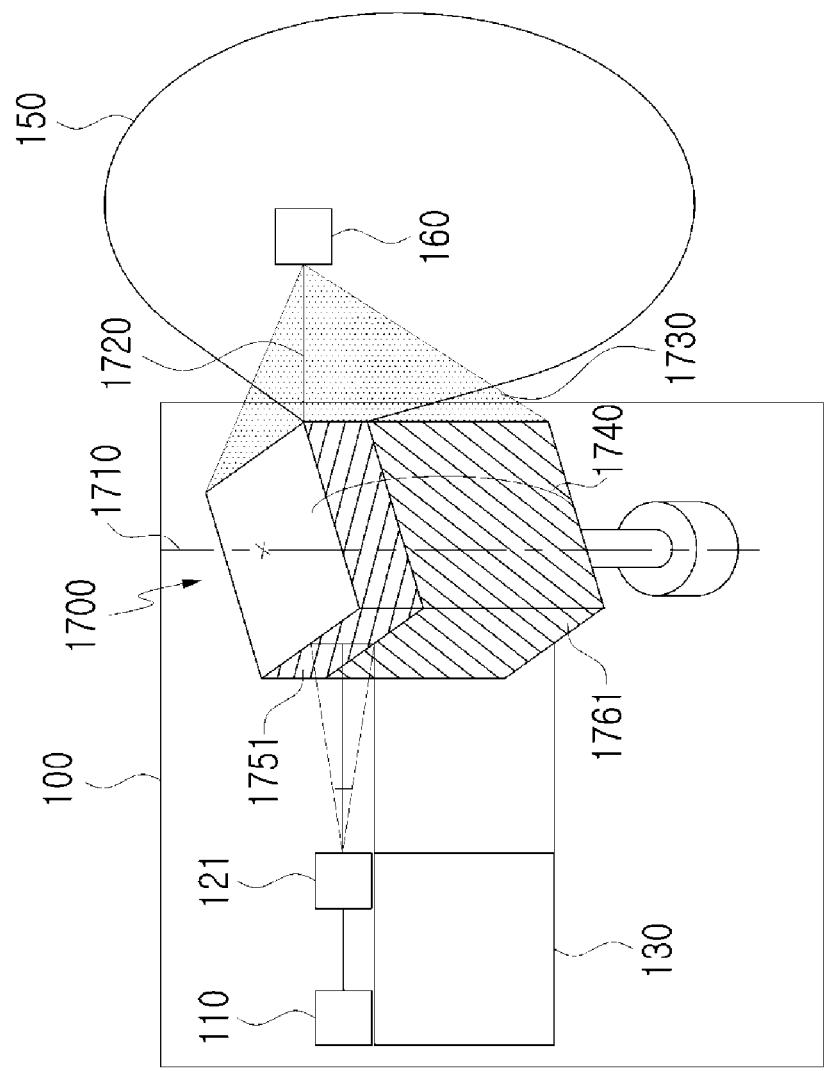
FIG. 15 is a view for describing a height of the rotating polygon mirror according to another embodiment.

FIG. 15 is a view for describing a height of the rotating polygon mirror according to another embodiment.

Referring to FIG. 15, the lidar device 100 including a rotating polygon mirror 1700 according to an embodiment may include the laser light emitting unit 110, the first scanner 121, the rotating polygon mirror 1700, and the sensor 130.

Here, when laser light irradiated from the first scanner 121 has an irradiation field in the form of a line, an irradiation portion 1751 of the rotating polygon mirror 1700 may have the form of a plane in which a group of points forming a line where the irradiation field of the irradiated laser light meets the rotating polygon mirror 1700 is connected in a rotating direction of the rotating polygon mirror 1700. Therefore, a height of the irradiation portion 1751 of the rotating polygon mirror 1700 may be determined on the basis of a distance between the first scanner 121 and the rotating polygon mirror 1700 and an angle from the first scanner 121 to the irradiation field.

In addition, when laser light 1730 reflected from the object 160 present within the scan field 150 of the lidar device 100 is transmitted toward the sensor 130 via the rotating polygon mirror 1700, a portion of a reflective surface of the rotating polygon mirror 1700 reflecting the laser light 1730 so that the laser light 1730 is transmitted toward the sensor 130 may be a light reception portion 1761. Also, the light reception portion 1761 may have the form of a plane in which portions reflecting the laser light 1730 so that the laser light 1730 is transmitted toward the sensor 130 are connected in the rotating direction of the rotating polygon mirror 1700. Therefore, a height of the light reception portion 1761 of the rotating polygon mirror 1700 may be determined on the basis of a size of the sensor 130.

Here, since a height 1740 of the rotating polygon mirror 1700 has to be larger than or equal to the sum of heights of the irradiation portion 1751 and the light reception portion 1761, the height 1740 of the rotating polygon mirror 1700 may be determined on the basis of a distance between the first scanner 121 and the rotating polygon mirror 1700, an angle from the first scanner 121 to the irradiation field, and the size of the sensor 130.

In addition, when the lidar device 100 further includes a condensing lens disposed between the rotating polygon mirror 1700 and the sensor 130, the light reception portion 1761 of the rotating polygon mirror 1700 may be a portion at which a portion of the reflective surface reflecting the laser light 1730 so that the laser light 1730 is transmitted toward the condensing lens is extended in the rotating direction of the rotating polygon mirror 1700. Therefore, the height of the light reception portion 1761 of the rotating polygon mirror 1700 may be determined on the basis of a diameter of the condensing lens.

Here, since the height 1740 of the rotating polygon mirror 1700 has to be larger than or equal to the sum of the heights of the irradiation portion 1751 and the light reception portion 1761, the height 1740 of the rotating polygon mirror 1700 may be determined on the basis of the distance between the first scanner 121 and the rotating polygon mirror 1700, the angle from the first scanner 121 to the irradiation field, and the diameter of the condensing lens.

5.3.4.3 Lidar Device Including Nodding Mirror and Rotating Polygon Mirror

Figure 16:
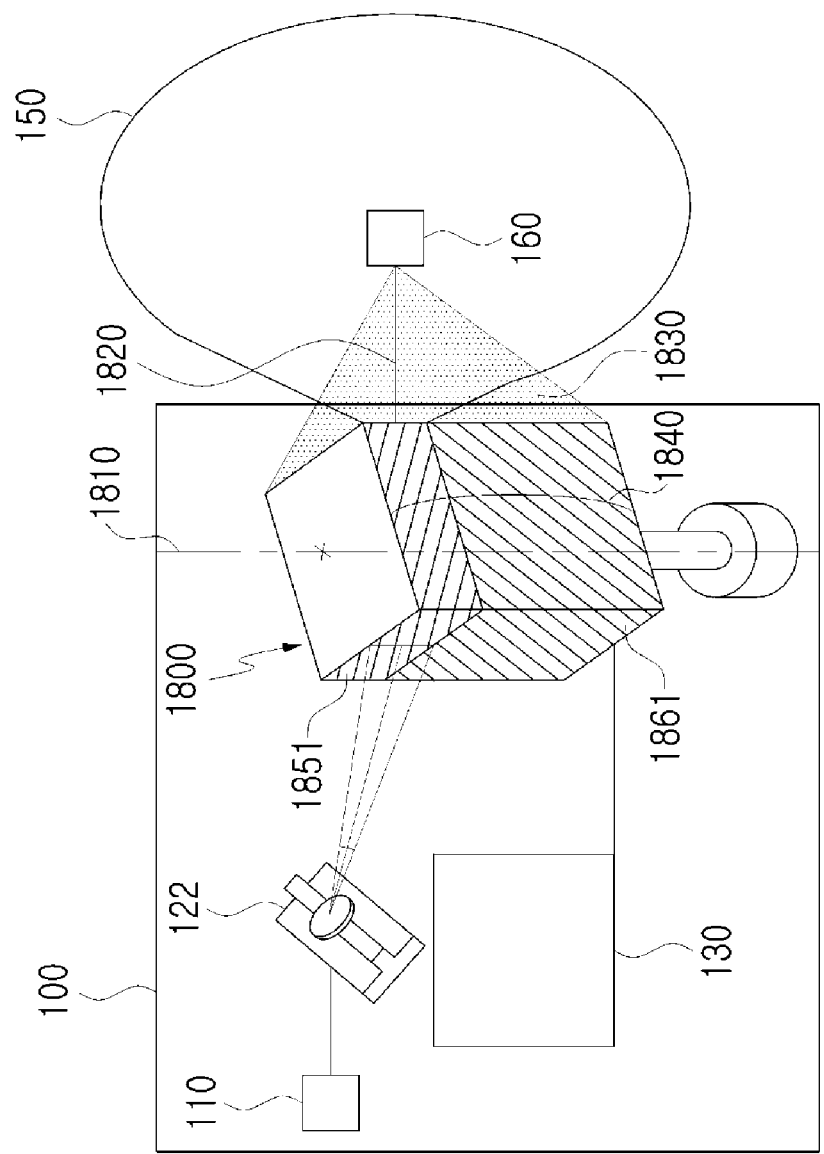
FIG. 16 is a view for describing a height of the rotating polygon mirror according to still another embodiment.

FIG. 16 is a view for describing a height of the rotating polygon mirror according to still another embodiment.

Referring to FIG. 16, the lidar device 100 including a rotating polygon mirror 1800 according to an embodiment may include the laser light emitting unit 110, the nodding mirror 122, the rotating polygon mirror 1800, and the sensor 130.

Here, when laser light irradiated from the nodding mirror 122 has an irradiation field in the form of a line, an irradiation portion 1851 of the rotating polygon mirror 1800 may have the form of a plane in which lines where the irradiation field of the irradiated laser light meets the rotating polygon mirror 1800 are connected in the rotating direction of the rotating polygon mirror 1800. Therefore, a height of the irradiation portion 1851 of the rotating polygon mirror 1800 may be determined on the basis of a distance between the nodding mirror 122 and the rotating polygon mirror 1800 and an angle from the nodding mirror 122 to the irradiation field. In this case, the angle from the nodding mirror 122 to the irradiation field may be determined on the basis of a preset angle of the nodding mirror 122.

In addition, when laser light 1830 reflected from the object 160 present within the scan field 150 of the lidar device 100 is transmitted toward the sensor 130 via the rotating polygon mirror 1800, a portion of a reflective surface of the rotating polygon mirror 1800 reflecting the laser light 1830 so that the laser light 1830 is transmitted toward the sensor 130 may be a light reception portion 1861. Also, the light reception portion 1861 may have the form of a plane in which portions reflecting the laser light 1830 so that the laser light 1830 is transmitted toward the sensor 130 are connected in the rotating direction of the rotating polygon mirror 1800. Therefore, a height of the light reception portion 1861 of the rotating polygon mirror 1800 may be determined on the basis of a size of the sensor 130.

Here, since a height 1840 of the rotating polygon mirror 1800 has to be larger than or equal to the sum of heights of the irradiation portion 1851 and the light reception portion 1861, the height 1840 of the rotating polygon mirror 1800 may be determined on the basis of a distance between the nodding mirror 122 and the rotating polygon mirror 1800, an angle from the nodding mirror 122 to the irradiation field, and the size of the sensor 130. In this case, the angle from the nodding mirror 122 to the irradiation field may be determined on the basis of a preset angle of the nodding mirror 122.

In addition, when the lidar device 100 further includes a condensing lens disposed between the rotating polygon mirror 1800 and the sensor 130, the light reception portion 1861 of the rotating polygon mirror 1800 may be a portion at which a portion of the reflective surface reflecting the laser light 1830 so that the laser light 1830 is transmitted toward the condensing lens is extended in the rotating direction of the rotating polygon mirror 1800. Therefore, the height of the light reception portion 1861 of the rotating polygon mirror 1800 may be determined on the basis of a diameter of the condensing lens.

Here, since the height 1840 of the rotating polygon mirror 1800 has to be larger than or equal to the sum of the heights of the irradiation portion 1851 and the light reception portion 1861, the height 1840 of the rotating polygon mirror 1800 may be determined on the basis of the distance between the nodding mirror 122 and the rotating polygon mirror 1800, the angle from the nodding mirror 122 to the irradiation field, and the diameter of the condensing lens. In this case, the angle from the nodding mirror 122 to the irradiation field may be determined on the basis of a preset angle of the nodding mirror 122.

5.4 Rotating Polygon Mirror Including Light Shielder

Figure 17:
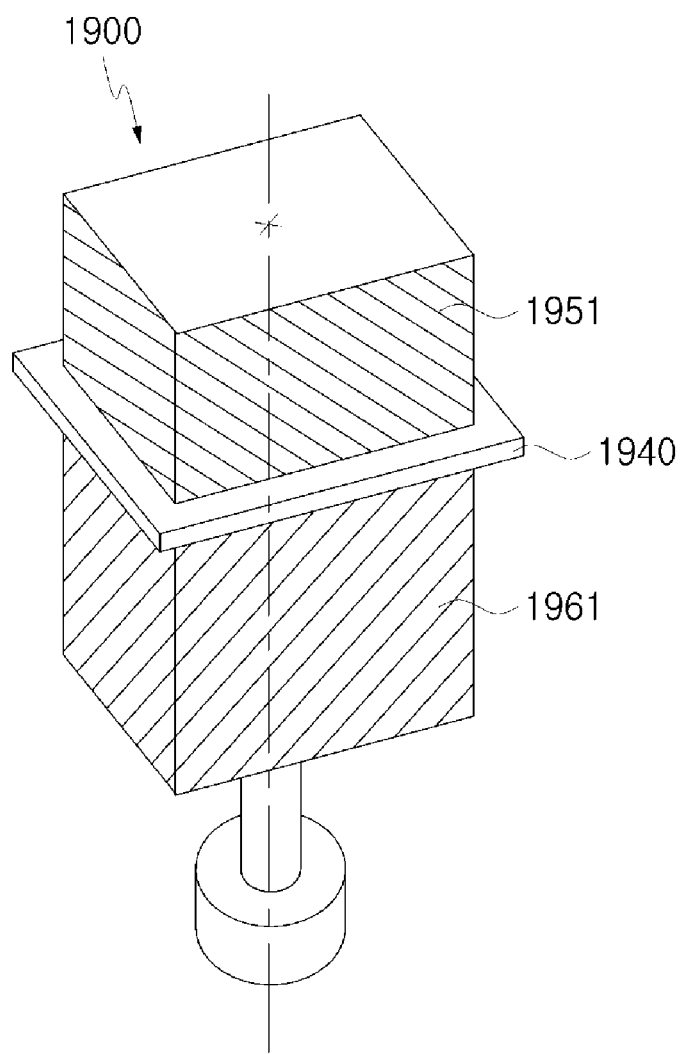
FIG. 17 is a view for describing a rotating polygon mirror including a light shielder according to an embodiment.

FIG. 17 is a view for describing a rotating polygon mirror including a light shielder according to an embodiment.

When a rotating polygon mirror 1900 is used in the lidar device, the rotating polygon mirror 1900 may have an irradiation portion 1951 and a light reception portion 1961. Also, the lidar device may have an irradiation path including the irradiation portion 1951 and a light reception path including a light reception portion 1961. However, when irregular reflection occurs at a surface of the rotating polygon mirror 1900, laser light output from the laser light emitting unit of the lidar device may also be reflected from the irradiation portion 1951 and be directly reflected toward the sensor without traveling along the irradiation path of the lidar device. This may cause an error in the lidar device for measuring a distance from an object using laser light.

Therefore, the rotating polygon mirror 1900 may further include a light shielder 1940 disposed between the irradiation portion 1951 and the light reception portion 1961 of the rotating polygon mirror 1900. The light shielder 1940 may prevent laser light from being reflected from the irradiation portion 1951 and erroneously detected by the sensor.

In addition, the light shielder 1940 may be disposed on the rotating polygon mirror 1900 or be disposed to be spaced apart from the rotating polygon mirror 1900.

In addition, when the irradiation portion 1951 and the light reception portion 1961 of the rotating polygon mirror 1900 are spaced apart from each other, the light shielder 1940 may be disposed between the irradiation portion 1951 and the light reception portion 1961.

In addition, the light shielder 1940 may be formed of a material absorbing light. Examples of the material include rubber, fabric, or the like.

6. Nodding Mirror

6.1 Structure

Figure 18:
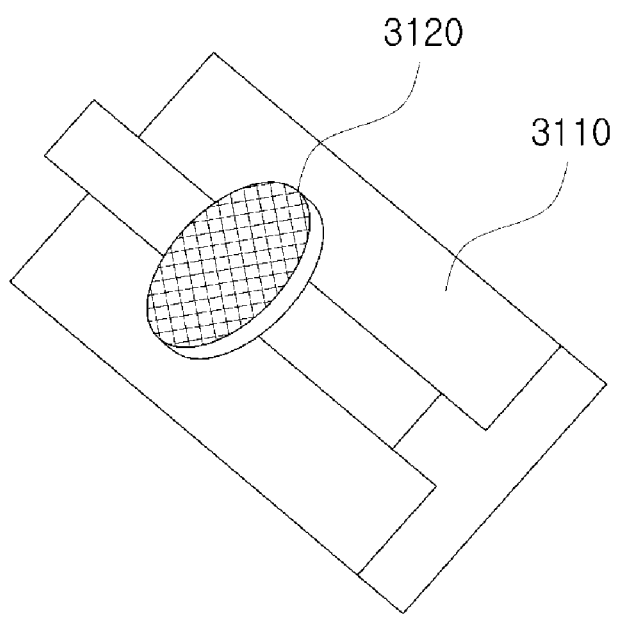
FIG. 18 is a view illustrating a nodding mirror according to an embodiment.

FIG. 18 is a view illustrating a nodding mirror according to an embodiment.

Referring to FIG. 18, a nodding mirror 3100 according to an embodiment may include a reflective surface 3120 and a body 3110, and the body 3110 may nod the reflective surface 3120. The reflective surface 3120 may be attached to the body 3110 or be connected to the body 3110 electrically and mechanically. However, the nodding mirror 3100 may include only some of the above-described elements or include more elements. For example, the nodding mirror 3100 may only include the reflective surface 3120 or only include the body 3110 to which reflective coating is applied.

The reflective surface 3120 is a surface for reflecting received laser light and may include a reflective mirror, reflective plastic, or the like but is not limited thereto.

In addition, the reflective surface 3120 may have a circular shape but is not limited thereto and may have various other shapes such as an elliptical shape, a triangular shape, a rectangular shape, and a trapezoidal shape.

In addition, the reflective surface 3120 may be nodded by an electric force, a magnetic force, an electromagnetic force, and/or a mechanical driving force but is not limited thereto.

6.2 FOV

The FOV required for the lidar device may vary according to purposes of use of the lidar device. For example, as wide a FOV as possible in the vertical and horizontal directions may be required in the case of a fixed type lidar device used for 3D mapping, and a relatively narrower FOV may be required in the vertical direction in comparison to a relatively wide FOV in the horizontal direction in the case of a lidar device disposed in an autonomous driving vehicle. Also, as wide a FOV as possible in the vertical and horizontal directions may be required for a lidar device disposed in a drone.

In addition, a resolution may vary when a FOV is narrowed under the same condition. For example, when two lidar devices which are identical except for having different FOVs are present, a lidar device having a narrower FOV may irradiate laser light to a narrower field as compared with the other lidar device having a relatively wide FOV, and accordingly, the concentration of laser light may be higher in the lidar device having a narrower FOV. Accordingly, a resolution in the lidar device having a narrower FOV may be higher than a resolution in the lidar device having a relatively wide FOV.

In addition, the scan field of the lidar device may be determined on the basis of a nodding angle of the nodding mirror. Therefore, the nodding angle of the nodding mirror may be determined on the basis of a resolution and a FOV required for the lidar device. For example, the nodding mirror may change a traveling direction of laser light to expand the scan field of the lidar device, and the scan field may be expanded by 2° every time the nodding mirror nods 1°.

6.3 Nodding Mirror Having Size Less than or Equal to Maximum Diameter of Laser Light When the lidar device includes the laser light emitting unit, laser light output from the laser light emitting unit may have a circular shape but is not limited thereto and may have various other shapes such as an elliptical shape, a rectangular shape, and a square shape. In this case, the maximum diameter of laser light may be a diameter when the shape of the laser light is circular, a long diameter (two times a long radius) when the shape of the laser light is elliptical, a length of a long side when the shape of the laser light is rectangular, and a length of a side when the shape of the laser light is square.

In addition, when the nodding mirror includes a reflective surface, the size of the nodding mirror may be defined as the size of the reflective surface. When the nodding mirror does not include a reflective surface, the size of the nodding mirror may be defined as a portion of the body capable of reflecting laser light. In this case, the size of the nodding mirror may be a diameter when the nodding mirror is circular, a long diameter (two times a long radius) when the nodding mirror is elliptical, a length of a long side when the nodding mirror is rectangular, and a length of a side when the nodding mirror is square.

In addition, when the lidar device is attached to a moving object which moves at a high speed, a high scanning speed may be required for the lidar device. In this case, when the size of the nodding mirror is small, the nodding speed may be increased while minimizing the burden on the nodding mirror.

The case in which the size of the nodding mirror is less than or equal to the maximum diameter of laser light will be described in more detail below.

6.3.1 Amount of Laser Light Obtained and Reflected by Nodding Mirror

Figure 19:
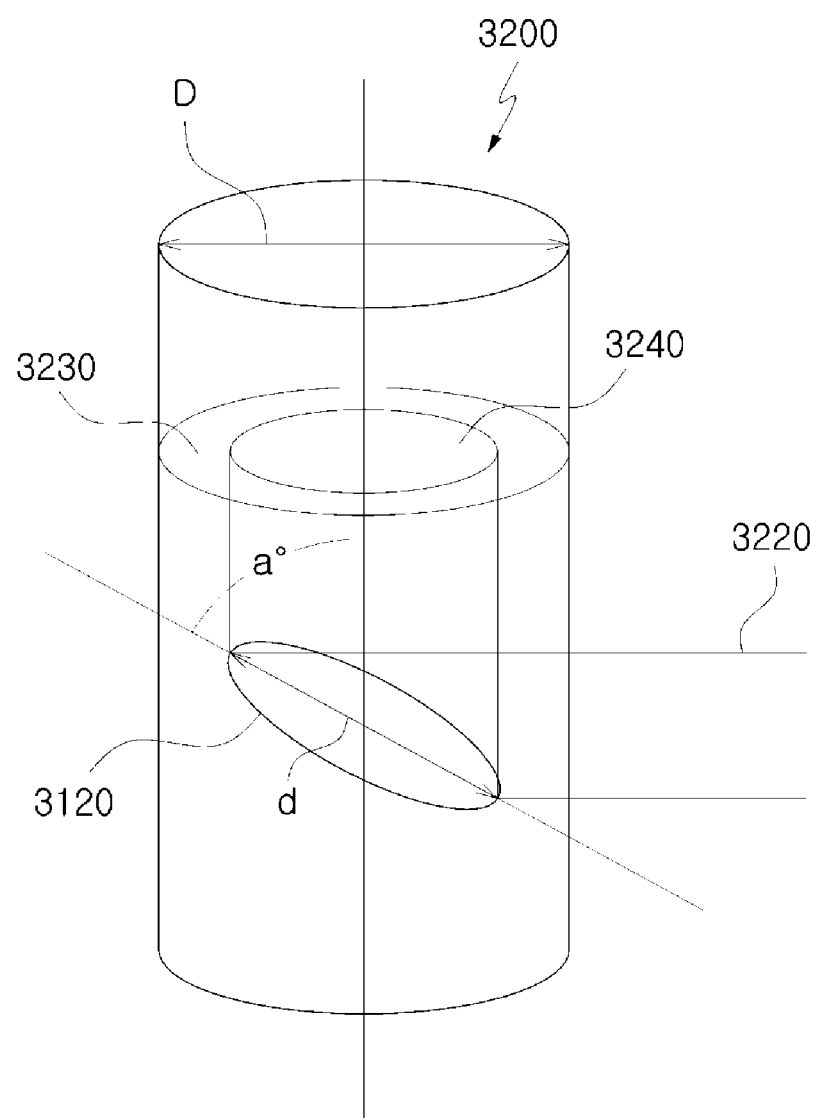
FIG. 19 is a view for describing an amount of laser light reflected by the nodding mirror according an embodiment.

FIG. 19 is a view for describing an amount of laser light reflected by the nodding mirror according an embodiment.

Referring to FIG. 19, a maximum diameter D of incident laser light 3200 may be larger than a diameter d of a reflective surface 3120 of the nodding mirror, and the amount of reflected laser light 3220 as compared with the amount of incident laser light 3200 is known. Although the incident laser light 3200, the reflected laser light 3220, and the reflective surface 3120 of the nodding mirror are assumed as having circular shapes and illustrated accordingly in the drawing, note that embodiments are not limited thereto.

When the total amount of laser light output from the laser light emitting unit and incident on the reflective surface 3120 of the nodding mirror is X, the amount of laser light reflected by the reflective surface 3120 of the nodding mirror may be determined on the basis of a cross-sectional area 3230 of the incident laser light 3200 and a cross-sectional area 3240 of a portion of the incident laser light 3200 reflected by the reflective surface 3120 of the nodding mirror.

Specifically, when the maximum diameter of the incident laser light 3200 is D, the cross-sectional area of the incident laser light 3200 is $\pi(D^2/4)$. Also, when the diameter of the reflective surface 3120 of the nodding mirror is d, the area of the reflective surface 3120 of the nodding mirror is $\pi(d^2/4)$. In this case, when an angle formed between the center of the incident laser light 3200 and the reflective surface 3120 of the nodding mirror is a, the cross-sectional area 3240 of the reflected portion of the incident laser light 3200 is $\pi(d^2/4)\sin a$.

Therefore, in this case, when the amount of the incident laser light 3200 reflected by the reflective surface 3120 of the nodding mirror is x, the x may satisfy the equation $x=X(d^2/D^2)\sin a$. Also, in this case, since the D and d may be preset values, the x may change according to the angle "a" formed between the center of the incident laser light 3200 and the reflective surface 3120 of the nodding mirror.

Therefore, the arrangement of the nodding mirror 3100 may vary as required by the lidar device including the nodding mirror 3100. The arrangement of the nodding mirror 3100 will be described in more detail below.

6.3.2 Arrangement of Nodding Mirror for Decreasing Difference in Quantities of Light Obtained and Reflected by Nodding Mirror According to Nodding Angles The lidar device may be a device for measuring a distance from the lidar device to an object using laser light. To this end, the lidar device should detect laser light reflected from the object.

In addition, laser light irradiated from the lidar device to an object present within a scan field may be irregularly reflected when being reflected from the object. Accordingly, the amount of laser light reflected from the object that is detected by the lidar device may decrease as the distance from the lidar device to the object increases.

Therefore, a distance measurable by the lidar device under the same condition may relate to an intensity of laser light irradiated from the lidar device toward the scan field. For example, as the intensity of laser light irradiated from the lidar device toward the scan field is higher, the intensity of laser light reflected from the object may also become higher. Accordingly, the lidar device may detect laser light reflected from an object present at a relatively longer distance from the lidar device.

In addition, when the size of the nodding mirror is smaller than a diameter of output laser light, the intensity of laser light reflected by the nodding mirror and irradiated from the lidar device toward the scan field may change according to the amount of laser light reflected by the nodding mirror.

In addition, in one embodiment, the lidar device may be configured to so that a difference in measurable distances decreases throughout the entire range of the scan field of the lidar device.

Figure 20:
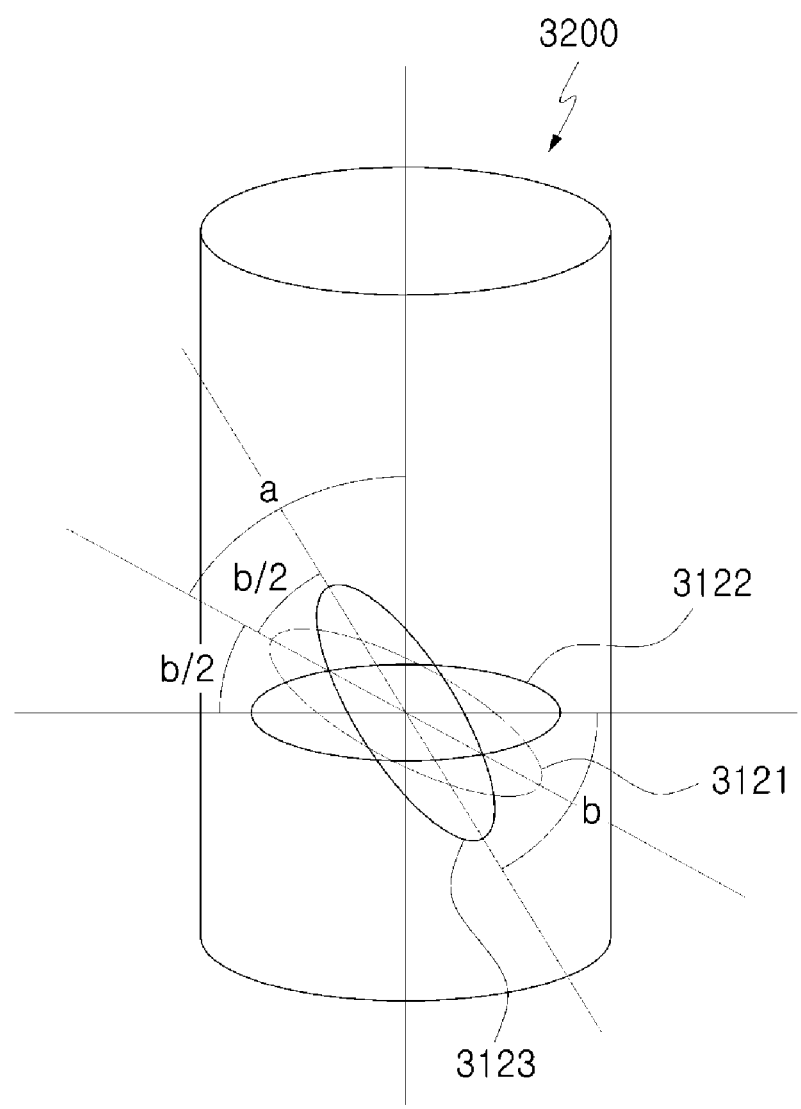
FIG. 20 is a view for describing the arrangement of the nodding mirror in which a difference in amounts of laser light reflected by the nodding mirror is small.

FIG. 20 is a view for describing the arrangement of the nodding mirror in which a difference in amounts of laser light reflected by the nodding mirror is small.

Referring to FIG. 20, when an angle formed between a center of incident laser light 3200 and a reflective surface of the nodding mirror while the nodding mirror is in an offset state 3121 is "a," and a preset angle of the nodding mirror, which is an angle for the nodding mirror to nod from the offset state, is "b," an angle formed between the center of the incident laser light 3200 and the reflective surface of the nodding mirror while the nodding mirror is in a maximum nodded state counterclockwise 3122 may be a+b/2, and an angle formed between the center of the incident laser light 3200 and the reflective surface of the nodding mirror while the nodding mirror is in a maximum nodded state clockwise 3123 may be a−b/2.

In this case, the amount of laser light reflected by the reflective surface of the nodding mirror may be minimum while the nodding mirror is in the maximum nodded state clockwise 3123 and may be maximum while the nodding mirror is in the maximum nodded state counterclockwise 3122.

In addition, when the amount of incident laser light 3200 reflected by the reflective surface of the nodding mirror is x, the x may satisfy the equation $x = X(d^2/D^2)\sin a$. In this case, as described above, X refers to the total amount of laser light incident toward the reflective surface of the nodding mirror, d refers to a diameter of the reflective surface of the nodding mirror, D refers to the maximum diameter of the incident laser light 3200, and "a" may refer to an angle formed between the center of the incident laser light 3200 and the reflective surface of the nodding mirror.

Therefore, when the amount of incident laser light 3200 reflected while the nodding mirror is in the maximum nodded state clockwise 3123 is $x_+$, the equation $x_+ = X(d^2/D^2)\sin(a-b/2)$, may be satisfied. Also, in this case, when the amount of incident laser light 3200 reflected while the nodding mirror is in the maximum nodded state counterclockwise 3122 is $x_-$, the equation $x_- = X(d^2/D^2)\sin(a+b/2)$, may be satisfied.

Therefore, for the difference in amounts of incident laser light 3200 reflected within the entire nodding angle range to be less than T %, the nodding mirror in the offset state may be arranged to have a value of "a" that satisfies the equation $\sin(a-b/2)/\sin(a+b/2) > (100-T)/100$.

For example, for the difference T in amounts of incident laser light 3200 reflected within the entire nodding angle range to be less than 5% while the preset angle "b" of the nodding mirror is 10°, the nodding mirror should be arranged so that the angle "a" formed between the center of the incident laser light 3200 and the reflective surface of the nodding mirror exceeds 73.7°.

6.3.3 Arrangement of Nodding Mirror for Increasing Difference in Quantities of Light Obtained and Reflected by Nodding Mirror According to Nodding Angles The lidar device may be a device for measuring a distance from the lidar device to an object using laser light. To this end, the lidar device should detect laser light reflected from the object.

In addition, laser light irradiated from the lidar device to an object present within a scan field may be irregularly reflected when being reflected from the object. Accordingly, the amount of laser light reflected from the object that is detected by the lidar device may decrease as the distance from the lidar device to the object increases.

Therefore, a distance measurable by the lidar device under the same condition may relate to an intensity of laser light irradiated from the lidar device toward the scan field. For example, as the intensity of laser light irradiated from the lidar device toward the scan field is higher, the intensity of laser light reflected from the object may also become higher. Accordingly, the lidar device may detect laser light reflected from an object present at a relatively longer distance from the lidar device.

In addition, when the size of the nodding mirror is smaller than a diameter of output laser light, the intensity of laser light irradiated from the lidar device toward the scan field may change according to the amount of laser light reflected by the nodding mirror.

There may be a difference of a certain value or larger in distances measurable by the lidar device throughout the entire range of the scan field. For example, when laser light irradiated from the lidar device is irradiated in parallel with the ground, the laser light irradiated from the lidar device may continue to travel before being reflected by an object present within the scan field. However, when laser light irradiated from the lidar device is irradiated toward the ground, the laser light irradiated from the lidar device may travel before being reflected from the ground. Also, in this case, as an angle formed between the ground and the laser light irradiated from the lidar device is larger, a distance traveled by the laser light until the laser light reaches the ground may be decreased. Therefore, there may be a difference in distances measureable by the lidar device between the case in which laser light irradiated from the lidar device may travel a long distance and the case in which laser light irradiated from the lidar device may only travel a short distance.

Figure 21:
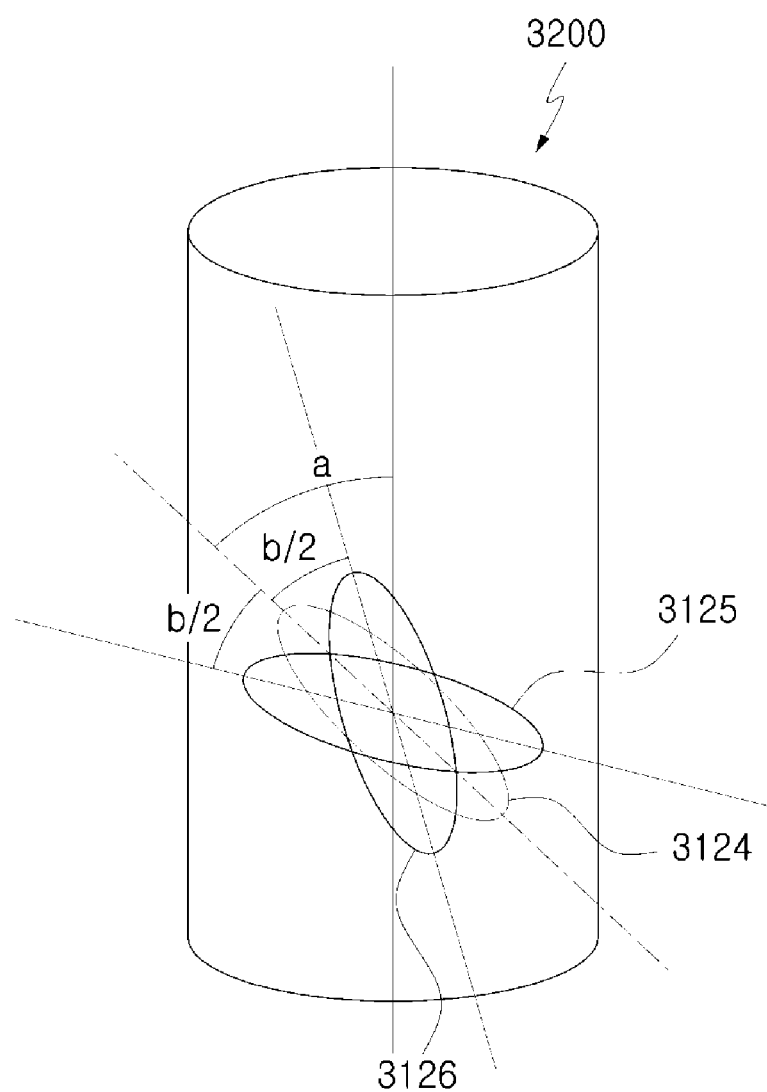
FIG. 21 is a view for describing the arrangement of the nodding mirror in which a difference in amounts of laser light reflected by the nodding mirror is large.

FIG. 21 is a view for describing the arrangement of the nodding mirror in which a difference in amounts of laser light reflected by the nodding mirror is large.

Referring to FIG. 21, an angle formed between a center of incident laser light 3200 and a reflective surface of the nodding mirror while the nodding mirror is in an offset state 3124 may be "a," an angle set for the nodding angle to nod from the offset state 3124 may be "b," an angle formed between the center of the incident laser light 3200 and the reflective surface of the nodding mirror while the nodding mirror is in a maximum nodded state counterclockwise 3125 may be a+b/2, and an angle formed between the center of the incident laser light 3200 and the reflective surface of the nodding mirror while the nodding mirror is in a maximum nodded state clockwise 3126 may be a−b/2.

In this case, the amount of laser light reflected by the reflective surface of the nodding mirror may be minimum while the nodding mirror is in the maximum nodded state clockwise 3126 and may be maximum while the nodding mirror is in the maximum nodded state counterclockwise 3125.

In addition, when the amount of incident laser light 3200 reflected by the reflective surface of the nodding mirror is x, the x may satisfy the equation $x = X(d^2/D^2)\sin a$. In this case, as described above, X refers to the total amount of laser light incident toward the reflective surface of the nodding mirror, d refers to a diameter of the reflective surface of the nodding mirror, D refers to the maximum diameter of the incident laser light 3200, and "a" may refer to an angle formed between the center of the incident laser light 3200 and the reflective surface of the nodding mirror.

Therefore, when the amount of incident laser light 3200 reflected while the nodding mirror is in the maximum nodded state clockwise 3126 is $x_+$, the equation $x_+ = X(d^2/D^2)\sin(a-b/2)$, may be satisfied. Also, in this case, when the amount of incident laser light 3200 reflected while the nodding mirror is in the maximum nodded state counterclockwise 3125 is $x_-$, the equation $x_-=X(d^2/D^2)\sin(a+b/2)$, may be satisfied.

Therefore, for the difference in amounts of incident laser light 3200 reflected within the entire nodding angle range to be more than U %, the nodding mirror in the offset state may be arranged to have a value of "a" that satisfies the equation $\sin(a-b/2)/\sin(a+b/2)<(100-U)/100$.

For example, for the difference U in amounts of incident laser light 3200 reflected within the entire nodding angle range to exceed 15% while the preset angle "b" of the nodding mirror is 10°, the nodding mirror should be arranged so that the angle "a" formed between the center of the incident laser light 3200 and the reflective surface of the nodding mirror is less than 47.2°.

6.3.4 Arrangement of Nodding Mirror for Preventing Laser Light, which is Obtained and Reflected by Nodding Mirror, from Returning When the amount of incident laser light 3200 that is reflected from the reflective surface of the nodding mirror is x, the x may satisfy the equation $x=X(d^2/D^2)\sin a$. In this case, as described above, X refers to the total amount of laser light incident toward the reflective surface of the nodding mirror, d refers to a diameter of the reflective surface of the nodding mirror, D refers to the maximum diameter of the incident laser light 3200, and "a" may refer to an angle formed between the center of the incident laser light 3200 and the reflective surface of the nodding mirror. Therefore, the value of x may become larger as the "a" becomes closer to 90°. However, when the "a" becomes greater than or equal to a predetermined angle, an angle at which the incident laser light 3200 is reflected back in a direction in which the incident laser light 3200 has been incident may be generated within the nodding angle range of the nodding mirror, and it may not be possible to use such returned laser light in scanning surroundings by the lidar device.

Figure 22:
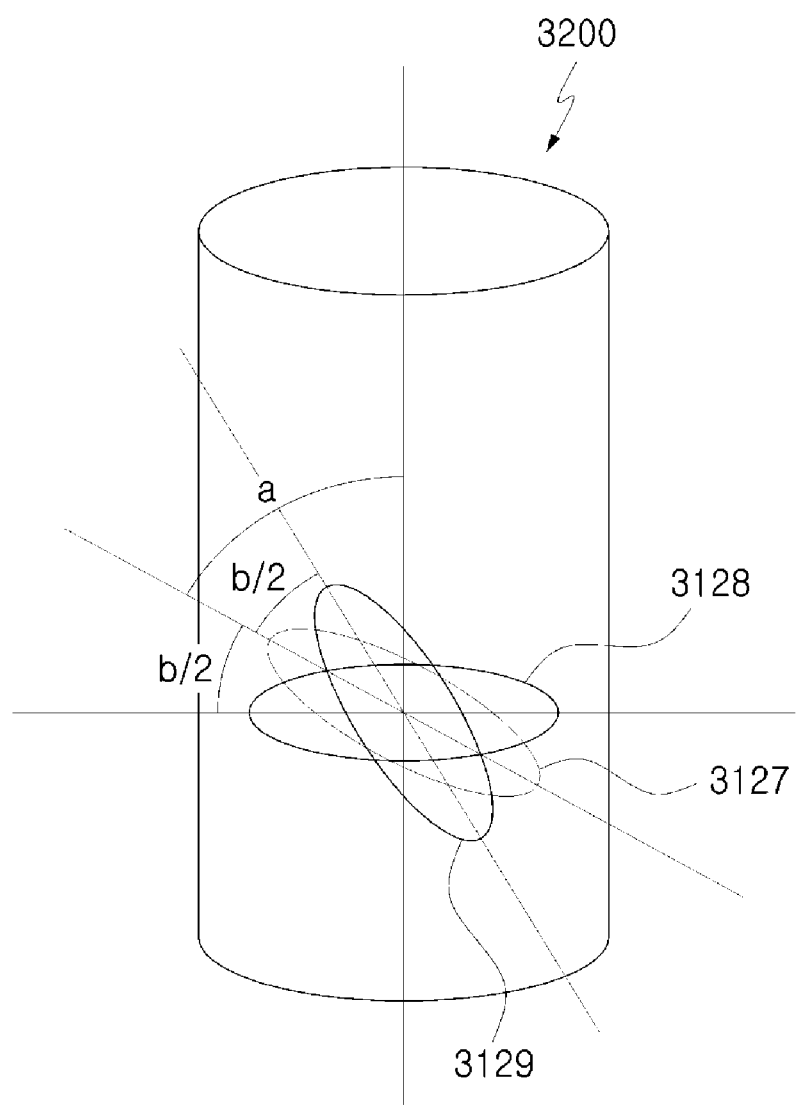
FIG. 22 is a view for describing the arrangement of the nodding mirror in which laser light reflected from the nodding mirror is prevented from returning.

FIG. 22 is a view for describing the arrangement of the nodding mirror in which laser light reflected from the nodding mirror is prevented from returning.

Referring to FIG. 22, an angle formed between a center of incident laser light 3200 and a reflective surface of the nodding mirror while the nodding mirror is in an offset state 3127 may be "a," an angle set for the nodding angle to nod from the offset state 3127 may be "b," an angle formed between the center of the incident laser light 3200 and the reflective surface of the nodding mirror while the nodding mirror is in a maximum nodded state counterclockwise 3128 may be a+b/2, and an angle formed between the center of the incident laser light 3200 and the reflective surface of the nodding mirror while the nodding mirror is in a maximum nodded state clockwise 3129 may be a-b/2.

In this case, the angle formed between the center of the incident laser light 3200 and the reflective surface of the nodding mirror may be the largest when the nodding mirror is in the maximum nodded state counterclockwise 3128.

In addition, for the incident laser light 3200 to return in the direction in which the incident laser light 3200 is incident, the angle formed between the center of the incident laser light 3200 and the reflective surface of the nodding mirror should be 90°.

Therefore, to prevent the incident laser light 3200 from returning in the direction in which the incident laser light 3200 has been incident, the angle "a" formed between the center of the incident laser light 3200 and the reflective surface of the nodding mirror while the nodding mirror is in the offset state 3127 should satisfy the equation a+b/2<90.

For example, when the nodding mirror nods within an angle range of 10°, the nodding mirror may have to be disposed to form an angle less than 85° with the center of the incident laser light 3200 while the nodding mirror is in the offset state 3127.

6.4 Nodding Mirror Whose Preset Angle is Changed

The lidar device is a device for detecting a distance from an object and a location of the object using laser light and may operate with a constant FOV. The FOV refers to a field detectable by the lidar device and may be defined as an angle range of a scan field with the lidar device as the origin. Therefore, a size of an irradiation field of the lidar device having a constant FOV may be increased as the distance from the object increases.

For example, when a vertical FOV of the lidar device is set to 20°, with 10° upward and 10° downward from the center of the FOV, the size of the irradiation field of the lidar device may be (20×tan 10) m at a distance of 10 m from the lidar device, may be (100×tan 10) m at a distance of 50 m from the lidar device, and may be (400×tan 10) m at a distance of 200 m from the lidar device. In this case, the size of the irradiation field assumes that the irradiation field has a flat surface, and the distance from the lidar device to the irradiation field may refer to a distance from the lidar device to a point where laser light irradiated in parallel with the ground from the lidar device meets the irradiation field.

In addition, a lidar device for measuring a distance using a TOF may irradiate laser light a limited number of times within a FOV range of the lidar device. Therefore, since laser light may be irradiated a limited number of times, when the size of the irradiation field of the lidar device becomes larger, a distance between rays of laser light may become larger. Also, when the distance between the rays of laser light becomes larger, the amount of information that may be obtained on an object may be reduced as compared with when the distance between the rays of laser light is small.

Therefore, a FOV may be changed according to a target detectable distance in order to obtain a larger amount of information on an object at a long distance from the lidar device.

6.4.1 Lidar Device Including Nodding Mirror

Figure 23:
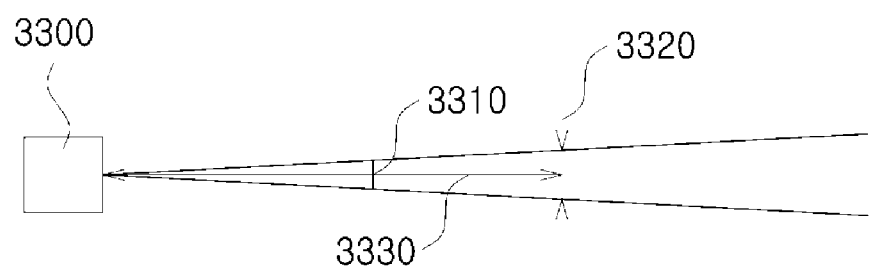
FIG. 23 is a view for describing a size of an irradiation field of the lidar device according to a nodding angle and distance of the nodding mirror.

FIG. 23 is a view for describing a size of an irradiation field of the lidar device according to a nodding angle and distance of the nodding mirror.

Referring to FIG. 23, a distance 3330 from a lidar device 3300 to an irradiation field 3320 may be k, a preset angle of the nodding mirror may be b, and a size of the irradiation field 3320 may be h. Also, as described above, a FOV 3310 may be changed by 2° every time the nodding mirror nods 1°. Therefore, when the preset angle of the nodding mirror is b, the FOV 3310 of the lidar device 3300 is 2b. As a result, in this case, the size h of the irradiation field 3320 may satisfy the equation h=2k×tan b.

Therefore, when the size of the irradiation field 3320 required for the lidar device 3300 is h according to k, which is the distance 3330 from the lidar device 3300 to the irradiation field 3320, the nodding angle b of the nodding mirror may be determined to satisfy the equation $b=\tan^{-1} h/2 k$.

In addition, the lidar device 3300 may change a FOV on the basis of a movement speed of a moving object to which the lidar device 3300 is attached. For example, when the movement speed of the moving object to which the lidar device is attached is relatively high, information at a relatively long distance may be important, and when the movement speed of the moving object to which the lidar device is attached is relatively low, information at a relatively short distance may be important. Therefore, the lidar device may narrow the FOV when the information at a long distance is important and may widen the FOV when the information at a short distance is important.

In addition, the lidar device 3300 may change a preset angle of the nodding mirror to change the FOV 3310.

In addition, the lidar device 3300 may change the FOV 3310 on the basis of a frame scanned by the lidar device 3300. For example, when the distance k is 10 m in a first frame, the lidar device may have a FOV of 28° so that the size h of the irradiation field is 5 m; when the distance k is 50 m in a second frame, the lidar device may have a FOV of 5.8° so that the size h of the irradiation field is 5 m; when the distance k is 100 m in a third frame, the lidar device may have a FOV of 2.8° so that the size h of the irradiation field is 5 m; and when the distance k is 200 m in a fourth frame, the lidar device may have a FOV of 1.4° so that the size h of the irradiation field is 5 m.

In addition, the lidar device 3300 may change the preset angle of the nodding mirror to change the FOV 3310. For example, when the FOV is 28°, the lidar device 3300 may set the preset angle b of the nodding mirror to 14°; when the FOV is 5.8°, the lidar device 3300 may set the preset angle b of the nodding mirror to 2.9°; when the FOV is 2.8°, the lidar device 3300 may set the preset angle b of the nodding mirror to 1.4°; and when the FOV is 1.4°, the lidar device 3300 may set the preset angle b of the nodding mirror to 0.7°.

Although the vertical FOV has been illustrated in FIG. 23, embodiments are not limited thereto, and should be apparent that the above description may also be applied to a horizontal FOV.

6.4.2 Lidar Device Including Nodding Mirror and Rotating Polygon Mirror

Figure 24:
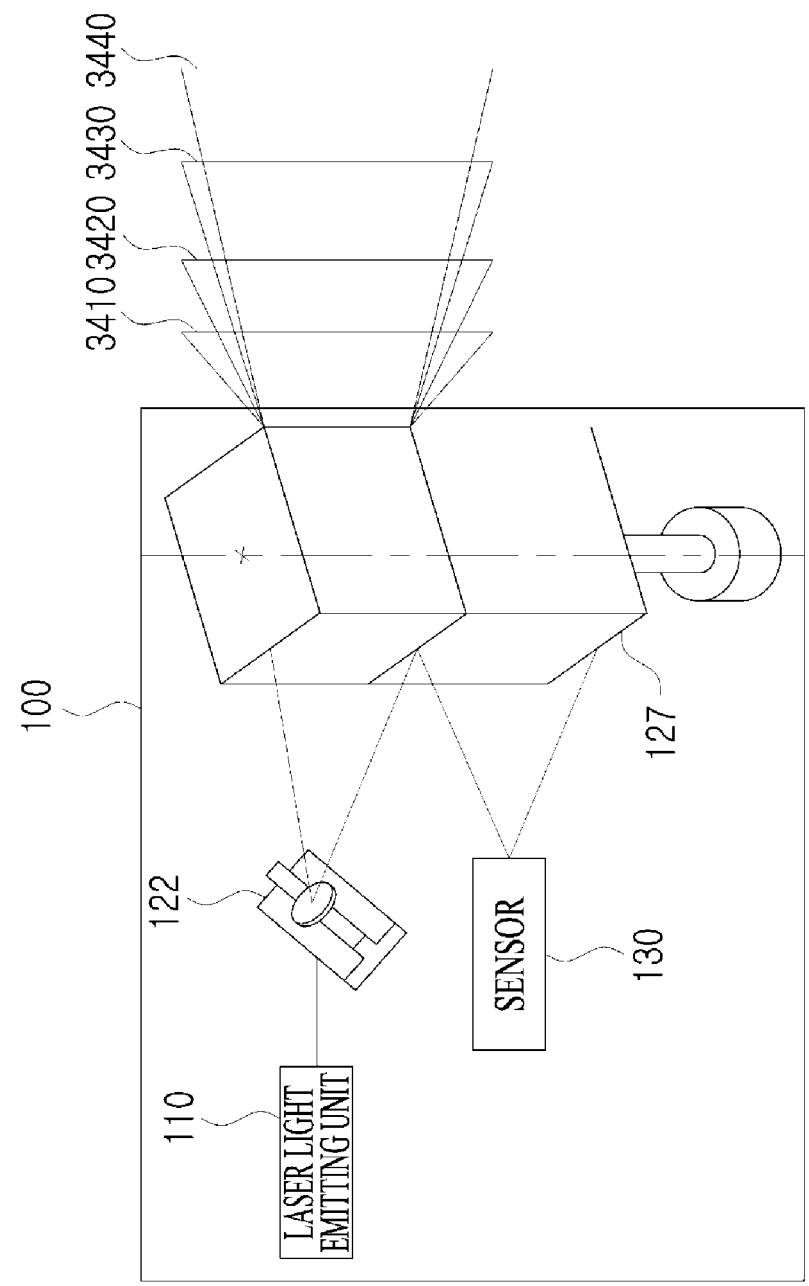
FIG. 24 is a view for describing a field of view of the lidar device according to an embodiment.

FIG. 24 is a view for describing a FOV of the lidar device according to an embodiment.

Referring to FIG. 24, the lidar device according to an embodiment may include the laser light emitting unit, the nodding mirror, the rotating polygon mirror, and the sensor.

Since the laser light emitting unit 110 and the sensor 130 have been described above with reference to FIGS. 1 and 2, detailed description on the laser light emitting unit 110 and the sensor 130 will be omitted below.

In addition, the nodding mirror 122 may continuously change a traveling direction of laser light output from the laser light emitting unit 110 in a direction perpendicular to the ground to expand an irradiation field of the laser light in the form of a line which is perpendicular to the ground. Also, in this case, the rotating polygon mirror 127 may continuously change a traveling direction of laser light irradiated from the nodding mirror 122 in a direction horizontal to the ground to expand an irradiation field of the laser light in the form of a plane. Accordingly, the scan field of the lidar device 100 may be expanded in the form of a plane. Therefore, the nodding mirror 122 may expand the scan field vertically, and the rotating polygon mirror 127 may expand the scan field horizontally.

However, only the scan field in the vertical direction has been illustrated in FIG. 24 to describe the FOV of the lidar device according to a nodding angle of the nodding mirror 122.

In addition, the lidar device 100 may change a FOV on the basis of a frame scanned by the lidar device 100. The frame may be set on the basis of one surface of the rotating polygon mirror or may also be set on the basis of rotation of the rotating polygon mirror. For example, when the distance k is 10 m in a first frame, the lidar device may have a FOV of 28° so that a size h of an irradiation field 3410 is 5 m; when the distance k is 50 m in a second frame, the lidar device may have a FOV of 5.8° so that a size h of an irradiation field 3420 is 5 m; when the distance k is 100 m in a third frame, the lidar device may have a FOV of 2.8° so that a size h of an irradiation field 3430 is 5 m; and when the distance k is 200 m in a fourth frame, the lidar device may have a FOV of 1.4° so that a size h of an irradiation field 3440 is 5 m.

In addition, the lidar device may change a preset angle of the nodding mirror to change the FOV. For example, when the FOV is 28°, the lidar device 3300 may set the preset angle b of the nodding mirror to 14°; when the FOV is 5.8°, the lidar device 3300 may set the preset angle b of the nodding mirror to 2.9°; when the FOV is 2.8°, the lidar device 3300 may set the preset angle b of the nodding mirror to 1.4°; and when the FOV is 1.4°, the lidar device 3300 may set the preset angle b of the nodding mirror to 0.7°.

Figure 25:
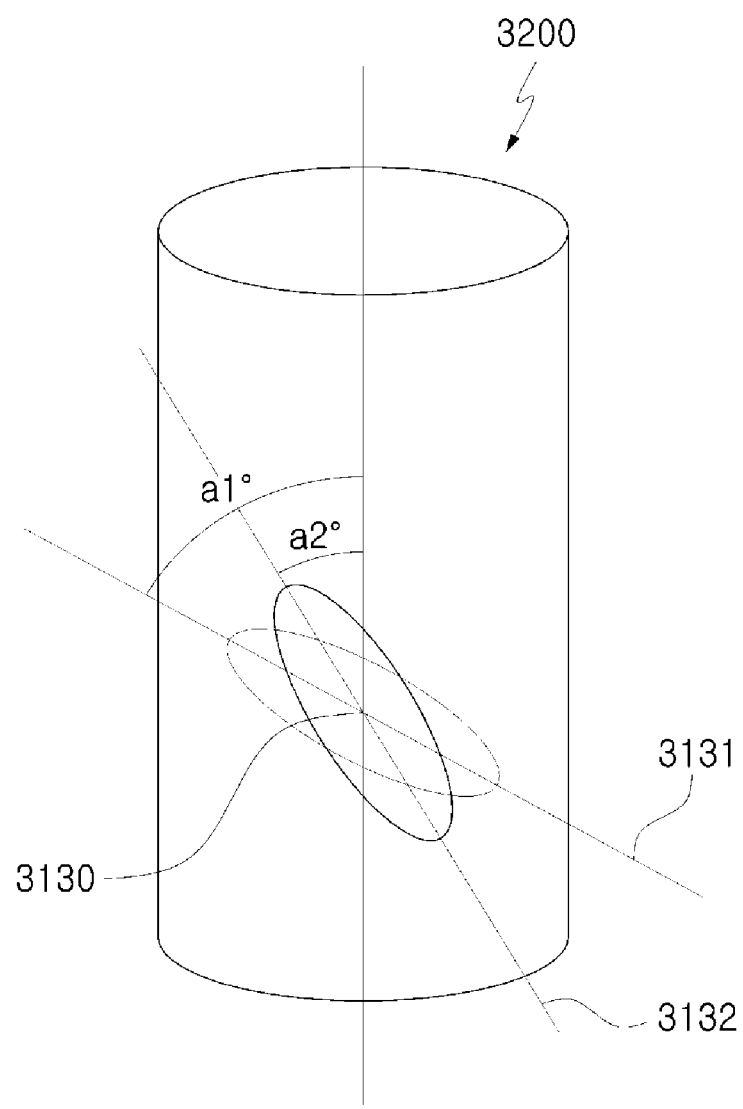
FIG. 25 is a view for describing a method of changing an angle "a" between an offset state of the nodding mirror and laser light incident on the nodding mirror according to an embodiment.
Figure 26:
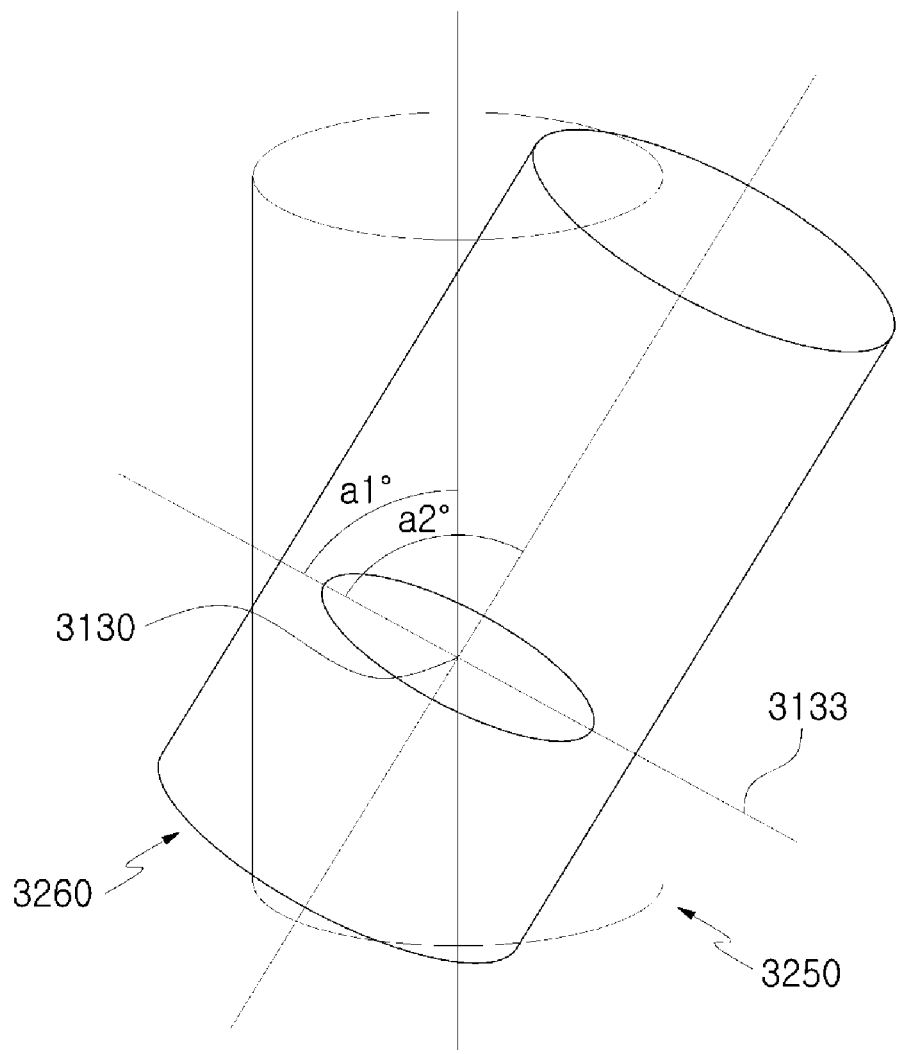
FIG. 26 is a view for describing a method of changing an angle "a" between an offset state of the nodding mirror and laser light incident on the nodding mirror according to another embodiment.

6.5 Method of Changing Angle "a" Between Offset State of Nodding Mirror and Laser Light Incident on Nodding Mirror FIGS. 25 and 26 are views for describing methods of changing an angle "a" between an offset state of the nodding mirror and laser light incident on the nodding mirror according to an embodiment.

Referring to FIG. 25, an angle "a" between an offset state of a nodding mirror 3130 and laser light 3200 incident on the nodding mirror 3130 may be changed by changing the offset state of the nodding mirror 3130 with respect to the laser light 3200 which is constantly incident on the nodding mirror 3130.

Specifically, the laser light 3200 may be constantly irradiated toward the nodding mirror 3130 in the vertical direction, and when the offset state of the nodding mirror 3130 is in a first state 3131, an angle between the offset state of the nodding mirror 3130 and the laser light 3200 incident on the nodding mirror 3130 may be a1. Also, when the offset state of the nodding mirror 3130 is in a second state 3132, an angle between the offset state of the nodding mirror 3130 and the laser light 3200 incident on the nodding mirror 3130 may be a2.

Therefore, an angle of the offset state of the nodding mirror 3130 may be changed while constantly maintaining an angle at which the laser light 3200 is irradiated toward the nodding mirror 3130, and in this way, the angle "a" between the offset state of the nodding mirror 3130 and the laser light 3200 incident on the nodding mirror 3130 may be adjusted.

Referring to FIG. 26, an angle "a" between an offset state 3133 of a nodding mirror 3130 and laser light incident on the nodding mirror 3130 may be changed by changing an angle of the laser light irradiated toward the nodding mirror 3130 with respect to the nodding mirror 3130 having the constant offset state 3133.

Specifically, the nodding mirror 3130 may have a constant angle in the offset state 3133, and when laser light 3250 in a first state is irradiated toward the nodding mirror 3130, an angle between the offset state 3133 of the nodding mirror 3130 and the laser light 3250 in the first state that is incident on the nodding mirror 3130 may be a1. Also, when laser light 3260 in a second state is irradiated toward the nodding mirror 3130, an angle between the offset state 3133 of the nodding mirror 3130 and the laser light 3260 in the second state that is incident on the nodding mirror 3130 may be a2.

Therefore, an angle at which laser light is irradiated may be changed while constantly maintaining an angle of the offset state 3133 of the nodding mirror 3130, and in this way, the angle "a" between the offset state 3133 of the nodding mirror 3130 and the laser light incident on the nodding mirror may be adjusted.

Although the cases in which only one of the offset angle of the nodding mirror and the angle at which laser light is irradiated changed have been described above with reference to FIGS. 25 and 26, the angle "a" between the offset state of the nodding mirror and the laser light incident on the nodding mirror may also be adjusted by changing both the offset angle of the nodding mirror and the angle at which laser light is irradiated.

Figure 27:
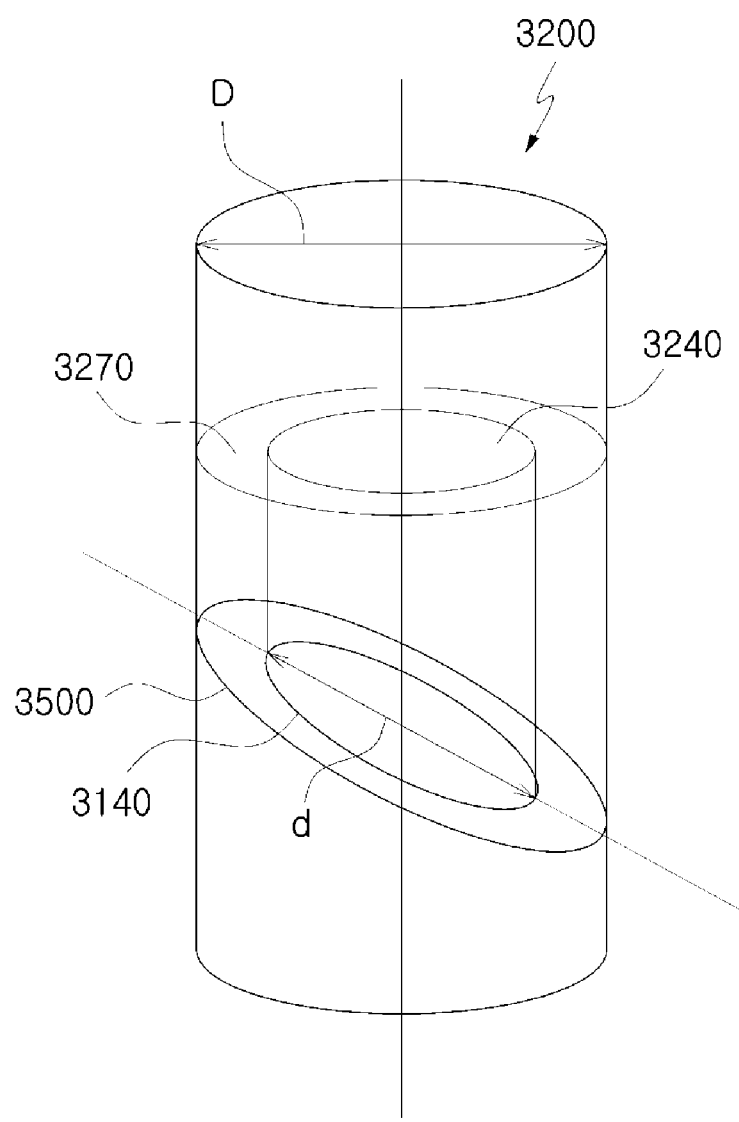
FIG. 27 is a view for describing a lidar device further including a reflective mirror disposed around a nodding mirror according to an embodiment.

6.6 Lidar Device Further Including Reflective Mirror Disposed Around Nodding Mirror FIG. 27 is a view for describing a lidar device further including a reflective mirror disposed around a nodding mirror according to an embodiment.

Referring to FIG. 27, the lidar device according to an embodiment may further include a reflective mirror 3500 disposed around a nodding mirror 3140, and the reflective mirror 3500 may include an empty space formed therein through which a reflective surface of the nodding mirror 3140 may pass.

In this case, the reflective mirror 3500 is a surface for reflecting received laser light and may include a reflective mirror, reflective plastic, or the like but is not limited thereto.

Specifically, as illustrated in FIG. 27, a maximum diameter D of laser light 3200 incident toward the nodding mirror 3140 may be larger than a diameter d of the reflective surface of the nodding mirror 3140. Therefore, the amount of laser light reflected from the nodding mirror 3140 may be a portion of the incident laser light 3200.

In addition, the lidar device may detect a distance from an object located within a scan field of the lidar device using laser light reflected from the nodding mirror 3140.

In this case, the lidar device may further include the reflective mirror 3500 disposed around the nodding mirror 3140 so that the distance from the object located within the scan field of the lidar device is detected by additionally using laser light 3270 not reflected from the nodding mirror 3140 of the laser light 3200 incident toward the nodding mirror 3140. Therefore, the reflective mirror 3500 may reflect a portion of the laser light 3270 of the incident laser light 3200 that is not reflected from the nodding mirror 3140.

The diameter of the reflective mirror 3500 may be larger than the maximum diameter D of the incident laser light 3200, but embodiments are not limited thereto. The diameter of the reflective mirror 3500 may also be less than or equal to the maximum diameter D of the incident laser light 3200.

In addition, when, as illustrated in FIG. 27, the reflective mirror 3500 is disposed around the nodding mirror 3140, the distance from the object located within the scan field of the lidar device may be detected by additionally using the portion of the laser light 3270 not reflected from the nodding mirror 3140. Also, when a nodding angle of the nodding mirror 3140 matches an angle at which the reflective mirror 3500 is disposed, since the total amount of reflected laser light increases, a distance measurable by the lidar device may be increased at the corresponding point.

Although the reflective mirror 3500 is illustrated in FIG. 27 as being disposed at the same angle as the offset state of the nodding mirror 3140, the reflective mirror 3500 may also be disposed at a different angle from the offset state of the nodding mirror 3140.

7. Lidar Device Generating Scan Pattern

Referring back to FIG. 2, the lidar device generating a scan pattern may include the laser light emitting unit, the scanner, and the sensor. The lidar device may also include only the laser light emitting unit and the sensor without the scanner or include a plurality of scanners.

In addition, when the laser light emitting unit 110 includes a plurality of laser light output elements, a direction at which laser light is irradiated from the lidar device may change according to locations at which the plurality of laser light output elements operate. Accordingly, the lidar device may have a scan pattern.

Here, the scan pattern may indicate an irradiation pattern of laser light irradiated from the lidar device 100 to the outside, and there may be one or more scan patterns. The scanner 120 may change a traveling direction of laser light output from the laser light emitting unit 110 to change a direction in which laser light is irradiated from the lidar device and may diffuse the laser light output from the laser light emitting unit 110 or change a phase of the laser light to change the size or direction of the laser light irradiated from the lidar device.

In addition, when the scanner 120 changes the direction or size of laser light irradiated from the lidar device, the lidar device may have a scan pattern according to the changed direction or size of the laser light.

In addition, when the scanner 120 is provided in plural, e.g., when the scanner 120 includes a first scanner and a second scanner, both the first and second scanners may be operated to generate a scan pattern, or an operation of any one of the first scanner and the second scanner may be controlled to generate a scan pattern.

The sensor 130 may detect laser light reflected from an object located within a scan field which is a field detectable by the lidar device 100.

7.1 Scan Pattern

Figure 28:
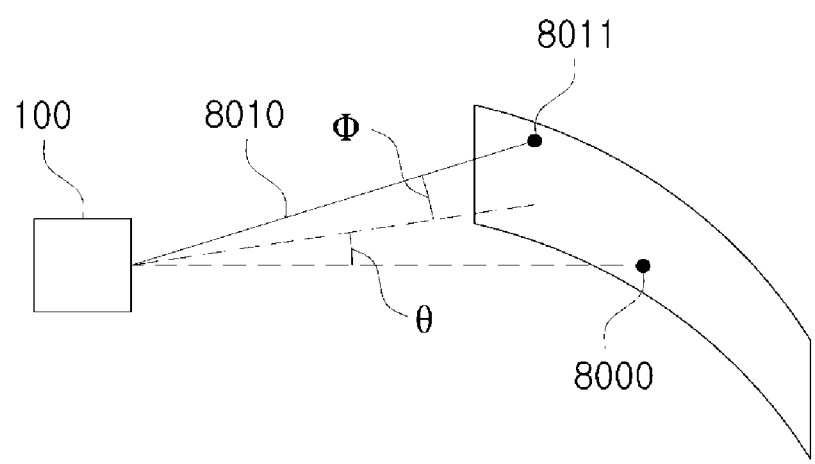
FIG. 28 is a view illustrating a lidar device and a direction of laser light irradiated from the lidar device according to an embodiment.

FIG. 28 is a view illustrating a lidar device and a direction of laser light irradiated from the lidar device according to an embodiment.

Referring to FIG. 28, laser light irradiated from the lidar device may be irradiated in a direction from the lidar device toward the surroundings thereof, and the lidar device may have a FOV.

The FOV may be a difference between a maximum value and a minimum value of a direction of laser light irradiated from the lidar device for a predetermined amount of time. For example, when a direction of laser light irradiated in the vertical direction is 10° at maximum and −10° at minimum, a vertical FOV (FOV(V)) of the lidar device may be 20°, and when a direction of laser light irradiated in the horizontal direction is 60° at maximum and −60° at minimum, a horizontal FOV (FOV(H)) of the lidar device may be 120°.

In addition, a direction of laser light irradiated from the lidar device may be defined using coordinates ($\theta$, $\phi$) with the lidar device as the origin. Also, for scanning of the FOV of the lidar device, the direction of laser light irradiated from the lidar device may have a value changing over time, and the lidar device may have a scan pattern which is a repeated pattern of the irradiation direction of the laser light that changes over time. Also, the scan pattern may be defined using ($\theta(t)$, $\phi(t)$), which is a change value of the coordinates over time.

In addition, when the lidar device is used by being attached to a moving object such as an autonomous driving vehicle, the lidar device may be required to rapidly detect an object located in the vicinity of the moving object to which the lidar device is attached and to accurately recognize the object. A speed at which the object is detected and the accuracy of recognition may vary according to the scan pattern of the lidar device. Therefore, the scan pattern of the lidar device may serve as an important factor that determines performance of the lidar device.

7.1.1 Factors that Determine Scan Pattern

As described above, the scan pattern may be defined using ($\theta(t)$, $\phi(t)$) and include a component $\theta(t)$ which is in a direction $\theta$ and a component $\phi(t)$ which is in a direction $\phi$. Also, according to an embodiment, the direction $\theta$ may refer to the horizontal direction, and the direction $\phi$ may refer to the vertical direction, but embodiments are not limited thereto.

In addition, the scan pattern ($\theta(t)$, $\phi(t)$) may include a cycle at which the pattern is repeated and include the FOV of the lidar device. For example, when the direction $\theta$ refers to the horizontal direction and the direction $\phi$ refers to the vertical direction, $\theta(t)$ may be a function of the FOV(H) and a cycle $T_\theta$ at which the pattern is repeated in the horizontal direction, and $\phi(t)$ may be a function of the FOV(V) and a cycle $T_\phi$ at which the pattern is repeated in the vertical direction.

Figure 29:
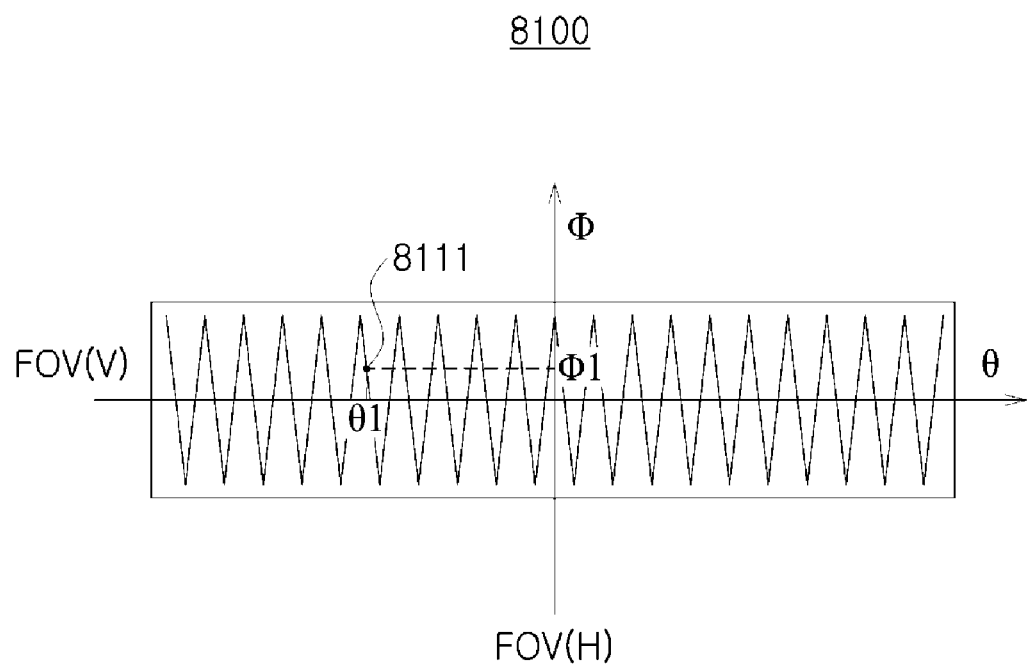
FIG. 29 is a view illustrating a scan pattern of the lidar device in a graph according to an embodiment.

FIG. 29 is a view illustrating a scan pattern of the lidar device in a graph according to an embodiment.

Referring to FIG. 29, the graph related to the scan pattern of the lidar device according to an embodiment may be drawn with a constant form within the range of FOV(V) and FOV(H) of the lidar device, and the direction of laser light irradiated from the lidar device may be indicated using coordinates with the lidar device as the origin. For example, when a direction of laser light irradiated from the lidar device at an arbitrary time point t1 is ($\theta1$, $\phi1$), the direction may be indicated at a position having the coordinates ($\theta1$, $\phi1$) as illustrated in the drawing.

In addition, referring to FIG. 29, the direction of laser light irradiated from the lidar device may have a pattern of reciprocating twenty times in the vertical direction for the same amount of time and a pattern of moving in one direction in the horizontal direction. Therefore, the scan pattern of the lidar device may have the relationship $T_\theta:T_\phi=1:20$. FIG. 29 may also be a graph of a scan pattern during the time $T_\theta$. This may become more clear when the graph is converted to a graph including a time axis.

Figure 30:
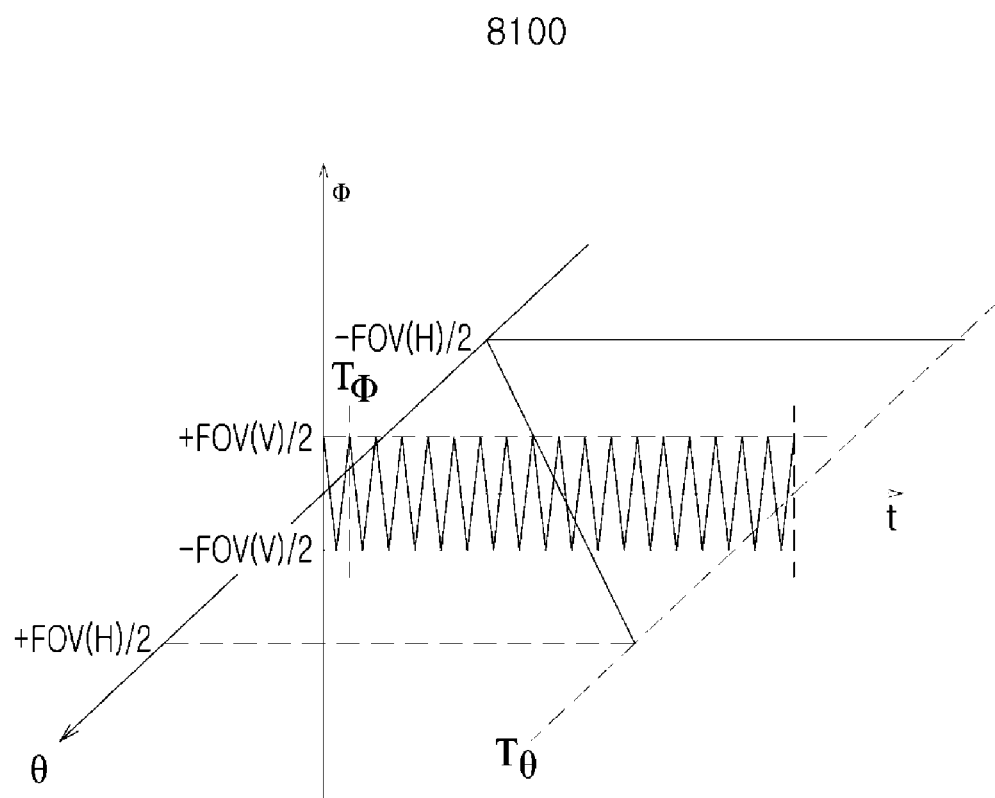
FIG. 30 is a view illustrating a scan pattern of the lidar device in a graph according to each component and time according to an embodiment.

FIG. 30 is a view illustrating a scan pattern of the lidar device in a graph according to each component and time according to an embodiment.

Referring to FIG. 30, the graph of the scan pattern ($\theta(t)$, $\phi(t)$) of the lidar device may be divided into graphs of $\theta(t)$ and $\phi(t)$ which are patterns of each component. Specifically, referring to the graph related to $\theta(t)$, the $\theta$ component pattern may have a pattern of moving from $-$FOV(H)/2 to $+$FOV(H)/2 during $T_\theta$, and the movement speed may be constant. Also, it can be seen that the $\theta$ component pattern moves in one direction during $T_\theta$. In this case, the $\phi$ component pattern may have a reciprocating pattern of moving from $+$FOV(V)/2 to $-$FOV(V)/2 and then back to $+$FOV(V)/2, and it can be seen that the reciprocation occurs twenty times during $T_\theta$.

Therefore, $\theta(t)$ and $\phi(t)$ which are patterns of each component of the scan pattern ($\theta(t)$, $\phi(t)$) of the lidar device may be expressed as functions according to repeated shapes, may include the FOV as a variable according to maximum values and minimum values of the repeated shapes, may include the cycle T as a variable according to the extent to which the shapes are repeated, and may include time t as a variable since the patterns change over time. Also, in this case, the FOV and cycle may be variables or fixed values. That is, the scan pattern of the lidar device may be determined by the FOV of the lidar device, the cycle T at which each pattern is repeated, and a function indicating a change in the direction of laser light irradiated from the lidar device, but embodiments are not limited thereto.

For convenience of description, the $\theta(t)$ may be described as a horizontal pattern, and the $\phi(t)$ may be described as a vertical pattern below.

7.1.2 Lidar Device Having Scan Pattern in which Cycle of Vertical Pattern is Shorter than Cycle of Horizontal Pattern Referring back to FIG. 30, the scan pattern of the lidar device according to an embodiment may include the vertical pattern $\phi(t)$ and the horizontal pattern $\theta(t)$, and the cycle $T_\phi$ of the vertical pattern may be shorter than the cycle $T_\theta$ of the horizontal pattern. Also, the scan pattern of the lidar device may have the cycle T at which the scan pattern expressed using the vertical pattern and the horizontal pattern is repeated, and the scan pattern may have the cycle T at which the scan pattern is repeated as one frame.

For example, FIG. 30 shows a scan pattern during the cycle $T_\theta$ of the horizontal pattern in a graph, and when the cycle $T_\theta$ of the horizontal pattern is longer than the cycle $T_\phi$ of the vertical pattern, the cycle $T_\theta$ of the horizontal pattern may be the same as the cycle T at which the scan pattern is repeated. Also, the scan pattern may be repeated on the basis of a two-cycle interval of the horizontal pattern, and in this case, two cycles of the horizontal pattern may be the same as the cycle T at which the scan pattern is repeated.

7.1.2.1 Lidar Device Having Scan Pattern Generated at Time Intervals

Figure 31:
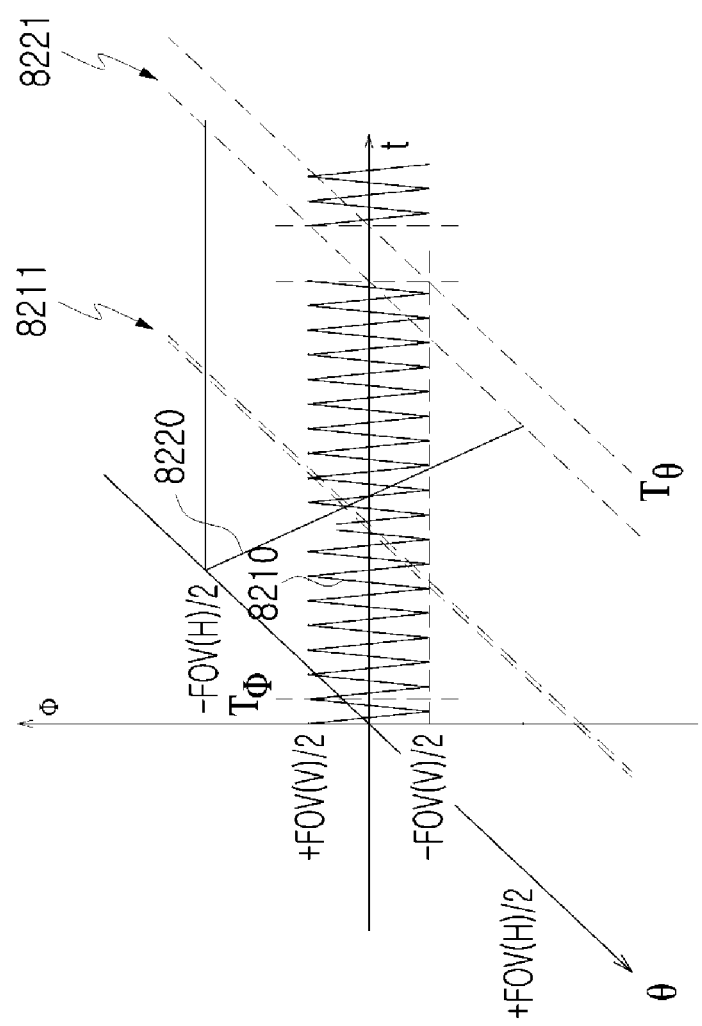
FIG. 31 is a view illustrating a scan pattern of the lidar device in a graph according to each component and time according to another embodiment.

FIG. 31 is a view illustrating a scan pattern of the lidar device in a graph according to each component and time according to another embodiment.

Referring to FIG. 31, a scan pattern 8200 of the lidar device according to an embodiment may include vertical patterns 8210 and horizontal patterns 8220, may include a time 8211 during which the scan pattern is not generated between the repeated vertical patterns 8210, and may also include a time 8221 during which the scan pattern is not generated between the repeated horizontal patterns 8220.

In this case, the times 8211 and 8221 during which the scan pattern is not generated may be times for outputting laser light from the lidar device, may be times for identifying a direction of laser light irradiated from the lidar device, or may be times for synchronizing time between elements included in the lidar device. Also, embodiments are not limited thereto, and the times may be any time necessary for the lidar device to operate accurately and promptly, such as time for outputting laser light, time for calculating a distance, time for performing time synchronization, and time for reducing heat generation due to the output of laser light.

Specifically, the time 8211 during which the scan pattern is not generated between the repeated vertical patterns 8210 may be included in a portion between the repeated vertical patterns 8210 as illustrated in FIG. 31. Although not illustrated in FIG. 31, the time 8211 may also be included between every pair of the repeated vertical patterns 8210.

In addition, the time 8221 during which the scan pattern is not generated between the repeated horizontal patterns 8220 may be included in a portion between the repeated horizontal patterns 8220 as illustrated in FIG. 31. Although not illustrated in FIG. 31, the time 8221 may also be included between every pair of the repeated horizontal patterns 8220.

In addition, the times 8211 and 8221 during which the scan pattern is not generated may be times during which laser light is not output from the laser light emitting unit included in the lidar device or may be times during which laser light is not irradiated from the scanner included in the lidar device to the outside of the lidar device.

Figure 32:
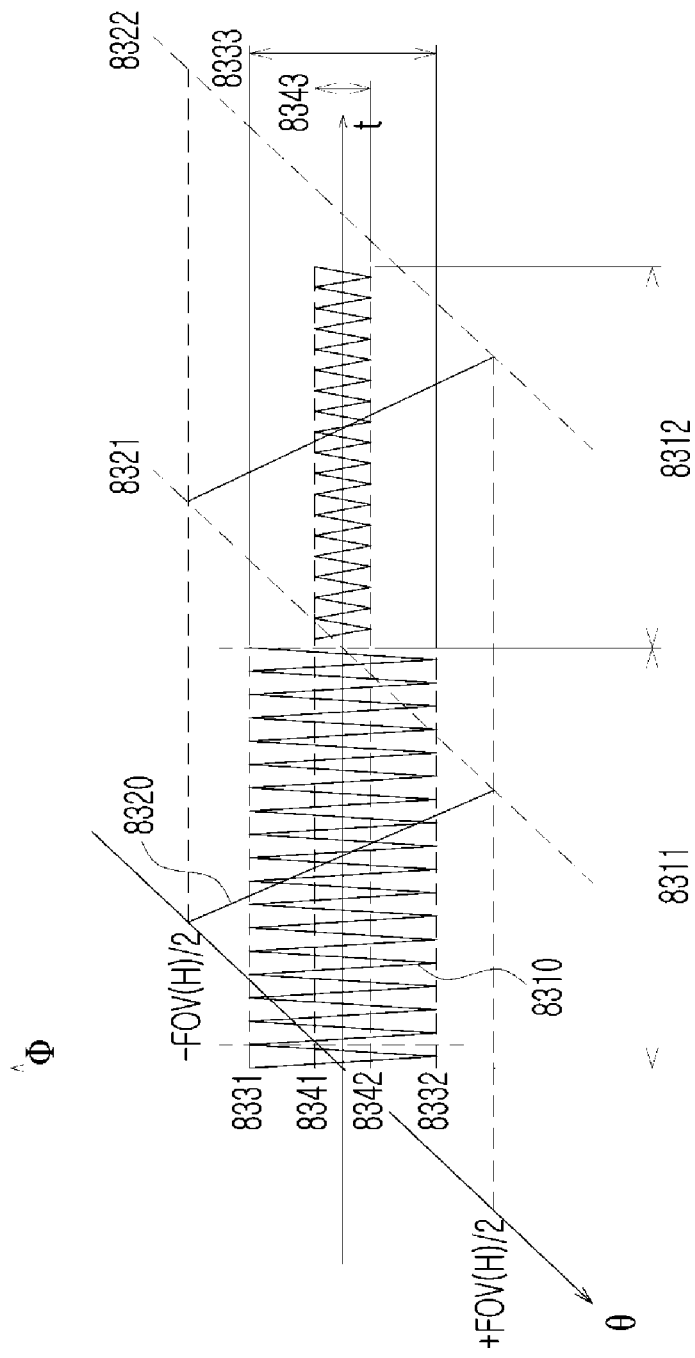
FIG. 32 is a view illustrating a scan pattern of the lidar device in a graph according to each component and time according to still another embodiment.

7.1.2.2 Lidar Device Having Scan Pattern in which FOV (V) Changes According to Cycle of Horizontal Pattern FIG. 32 is a view illustrating a scan pattern of the lidar device in a graph according to each component and time according to still another embodiment.

Referring to FIG. 32, a scan pattern 8300 of the lidar device according to an embodiment may include vertical patterns 8310 and horizontal patterns 8320, and the FOV(V) may change according to each cycle of the horizontal patterns 8320. Specifically, the scan pattern 8300 of the lidar device may include a first horizontal pattern cycle 8321 and a second horizontal pattern cycle 8322. Also, as illustrated in FIG. 32, the first horizontal pattern cycle 8321 and the second horizontal pattern cycle 8322 may have the same time value in the scan pattern 8300 of the lidar device and may have the same maximum value and minimum value, but embodiments are not limited thereto. The first horizontal pattern cycle and the second horizontal pattern cycle may also have different time values and/or different maximum values and minimum values.

In addition, a maximum value 8331 and a minimum value 8332 of a vertical pattern 8311 of the lidar device generated during the first horizontal pattern cycle 8321 may be different from a maximum value 8341 and a minimum value 8342 of a vertical pattern 8312 generated during the second horizontal pattern cycle 8322. For example, a difference 8343 between the maximum value 8341 and the minimum value 8342 of the vertical pattern 8312 generated during the second horizontal pattern cycle 8322 may be less than a difference 8333 between the maximum value 8331 and the minimum value 8332 of the vertical pattern 8311 generated during the first horizontal pattern cycle 8321. In this case, when the first horizontal pattern cycle 8321 is referred to as a first frame, and the second horizontal pattern cycle 8322 is referred to as a second frame, the FOV(V) of the second frame may be smaller than the FOV(V) of the first frame. A decrease in the FOV of the lidar device while other factors that determine the operation of the lidar device are kept unchanged may mean that a field scannable by the lidar device is reduced, which allows denser scanning to be performed in a narrow region such that a resolution of the lidar device is increased.

In addition, in the scan pattern 8300 of the lidar device, the FOV(V) may be different for each cycle of the horizontal pattern, the FOV(V) may be different for each two-cycle interval of the horizontal pattern, the FOV(V) may be different for each cycle of the horizontal pattern, or the FOV(V) may be repeated every four-cycle interval of the horizontal pattern, but embodiments are not limited thereto, and this may change fluidly as necessary.

Figure 33:
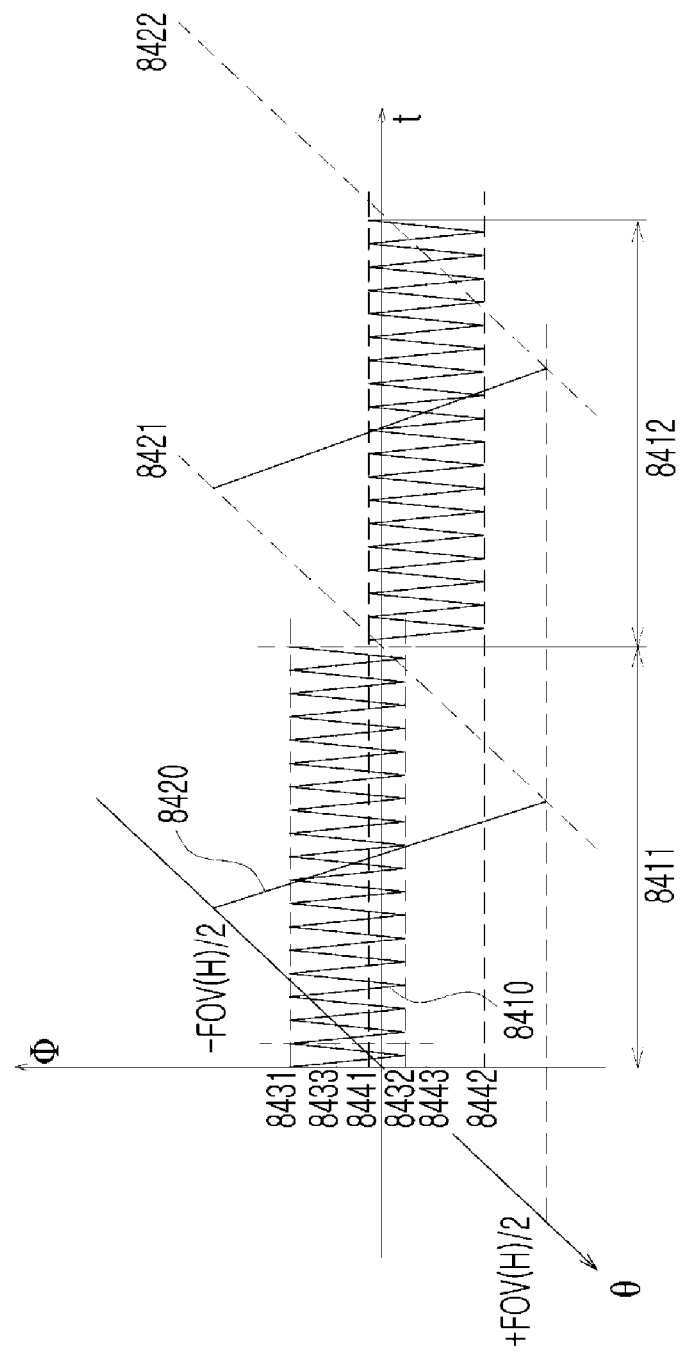
FIG. 33 is a view illustrating a scan pattern of the lidar device in a graph according to each component and time according to yet another embodiment.

7.1.2.3 Lidar Device Having Scan Pattern in which Intermediate Value of Vertical Pattern Changes According to Cycle of Horizontal Pattern FIG. 33 is a view illustrating a scan pattern of the lidar device in a graph according to each component and time according to yet another embodiment.

Referring to FIG. 33, a scan pattern 8400 of the lidar device according to an embodiment may include vertical patterns 8410 and horizontal patterns 8420, and intermediate values 8433 and 8443 of the vertical patterns 8410 may change according to cycles 8421 and 8422 of the horizontal patterns 8420. In this case, the intermediate values 8433 and 8443 of the vertical patterns 8410 may refer to intermediate values of maximum values 8431 and 8441 and minimum values 8432 and 8442 of the vertical patterns 8410.

As illustrated in FIG. 33, the horizontal patterns 8420 may include a first horizontal pattern cycle 8421 and a second horizontal pattern cycle 8422. Also, the vertical pattern 8410 may include a first intermediate value 8433, which is an intermediate value of a vertical pattern 8411 generated during the first horizontal pattern cycle 8421, and a second intermediate value 8443, which is an intermediate value of a vertical pattern 8412 generated during the second horizontal pattern cycle 8422. In this case, the first intermediate value 8433 may be greater than the second intermediate value 8443, but embodiments are not limited thereto, and the first intermediate value 8433 may also be less than the second intermediate value 8443.

In addition, the minimum value 8432 of the vertical pattern 8411 generated during the first horizontal pattern cycle 8421 may be less than the maximum value 8441 of the vertical pattern 8412 generated during the second horizontal pattern cycle 8422, but embodiments are not limited thereto, and the minimum value 8432 of the vertical pattern 8411 generated during the first horizontal pattern cycle 8421 may also be greater than the maximum value 8441 of the vertical pattern 8412 generated during the second horizontal pattern cycle 8422.

Figure 34:
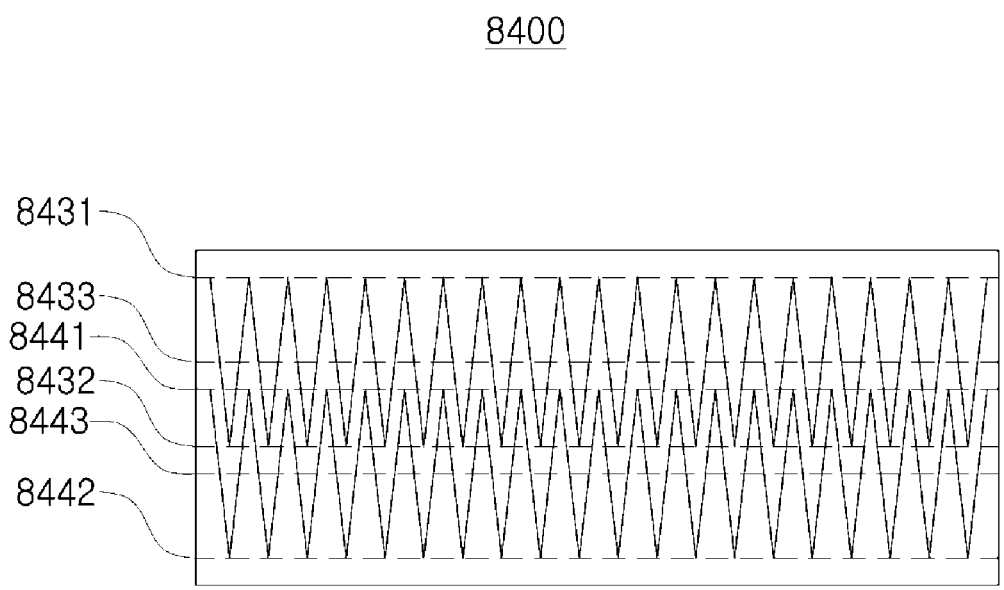
FIG. 34 is a view illustrating a scan pattern of the lidar device during one frame time in a graph according to yet another embodiment.

In addition, FIG. 34 is a view illustrating a scan pattern of the lidar device according to FIG. 33 during one frame time in a graph according to an embodiment. Referring to FIG. 34, the lidar device according to an embodiment may have the first horizontal pattern cycle and the second horizontal pattern cycle as one frame. In this case, as illustrated in FIG. 34, the lidar device may scan more of the intermediate portion in the vertical direction during one frame.

In addition, the FOV(V) of one frame of the lidar device may be a difference between the maximum value of the vertical pattern generated during the first horizontal pattern cycle and the minimum value of the vertical pattern generated during the second horizontal pattern cycle.

Therefore, in comparison to the lidar device generating one frame during the same amount of time, the lidar device may scan more of the intermediate portion in the vertical direction during one frame.

The lidar device is a device for obtaining information on a distance from an object included within a scan field using laser light and generates scan points using laser light. Therefore, the number of scan points that the lidar device may generate during a predetermined amount of time may be limited. Therefore, in the case of the lidar device used for an autonomous driving vehicle or the like, scanning more of a significant portion with the same number of scan points may be important, and in the case of the lidar device having the scan patterns illustrated in FIGS. 33 and 34, it is possible to scan more of a significant portion during the same amount of time.

Figure 35:
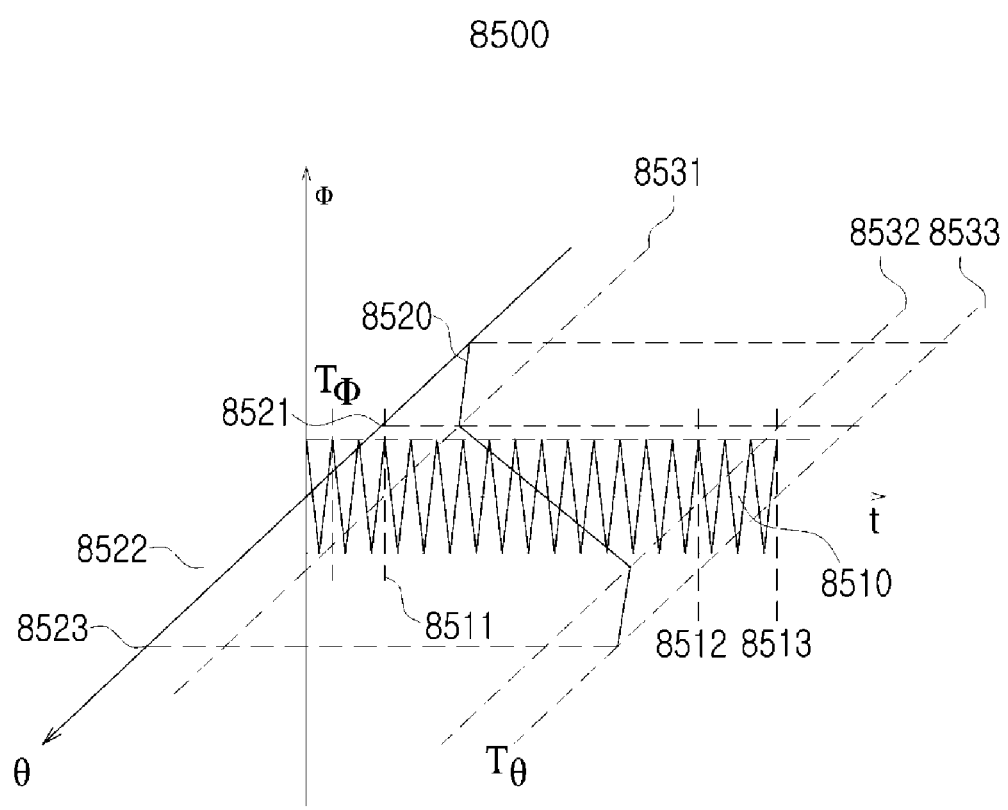
FIG. 35 is a view illustrating a scan pattern of the lidar device in a graph according to each component and time according to yet another embodiment.

7.1.2.4 Lidar Device in which Degree of Change in Direction of Laser Light Irradiated from Lidar Device Over Time Changes FIG. 35 is a view illustrating a scan pattern of the lidar device in a graph according to each component and time according to yet another embodiment.

Referring to FIG. 35, the lidar device according to an embodiment may have a scan pattern 8500 in which a degree of change in a direction of laser light irradiated from the lidar device over time changes. In this case, the change in the direction of laser light irradiated from the lidar device over time may be a scan pattern changing speed. Specifically, the variation of a horizontal component over time or the variation of a vertical component over time may be the scan pattern changing speed.

As illustrated in FIG. 35, the scan pattern 8500 of the lidar device may have vertical patterns 8510 and horizontal patterns 8520. Also, in the horizontal patterns 8520, a degree of change in a direction of laser light irradiated from the lidar device over time may change. For example, the horizontal pattern 8520 may have a first speed up to a first time point 8531, and, at the first time point 8531, the horizontal pattern 8520 may be located at a first point 8521, and the vertical pattern 8510 may be located at a point 8511 after three cycles. Also, the horizontal pattern 8520 may have a second speed from the first time point 8531 to a second time point 8532, and, at the second time point 8532, the horizontal pattern 8520 may be located at a second point 8522, and the vertical pattern 8510 may be located at a point 8512 after seventeen cycles. Also, the horizontal pattern 8520 may have a third speed from the second time point to a third time point, and, at the third time point 8533, the horizontal pattern 8520 may be located at a maximum value 8523, and the vertical pattern 8510 may be located at a point 8513 after twenty cycles. Therefore, in this case, the second speed may be lower than the first speed and the third speed. Although not illustrated in FIG. 35, the second speed may also be higher than the first speed and the third speed.

Figure 36:
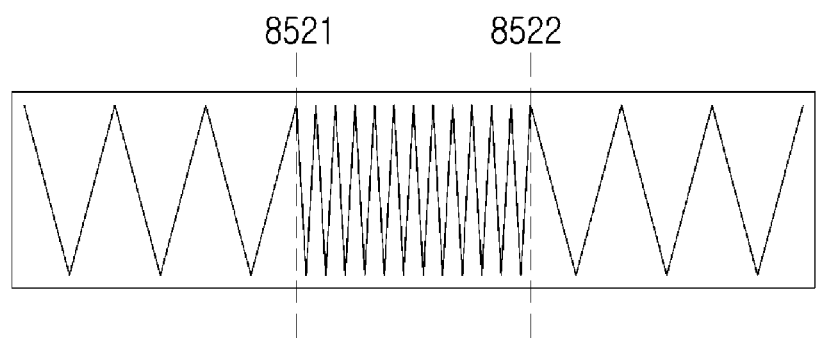
FIG. 36 is a view illustrating a scan pattern of the lidar device during one frame time in a graph according to yet another embodiment.

FIG. 36 is a view illustrating a scan pattern of the lidar device during one frame time according to yet another embodiment. Referring to FIG. 36, the lidar device according to an embodiment may have a horizontal pattern cycle $T_\theta$ as one frame. Specifically, when the horizontal pattern is located at the first point 8521, the vertical pattern may pass through a third cycle, and when the horizontal pattern passes through the second point 8522, the vertical pattern may pass through a seventeenth cycle. Therefore, when the scan pattern 8500 illustrated in FIG. 35 is represented by one frame, the lidar device may scan more of an intermediate portion in the horizontal direction during one frame. Also, the scan pattern 8500 of the lidar device corresponds to the case in which the second speed of the horizontal pattern of the lidar device is lower than the first speed and the third speed.

Therefore, in comparison to the lidar device generating one frame during the same amount of time, the lidar device may scan more of the intermediate portion in the horizontal direction.

As a result, in the case of the lidar device having the scan patterns illustrated in FIGS. 35 and 36, it is possible to scan more of a significant portion during the same amount of time.

Figure 37:
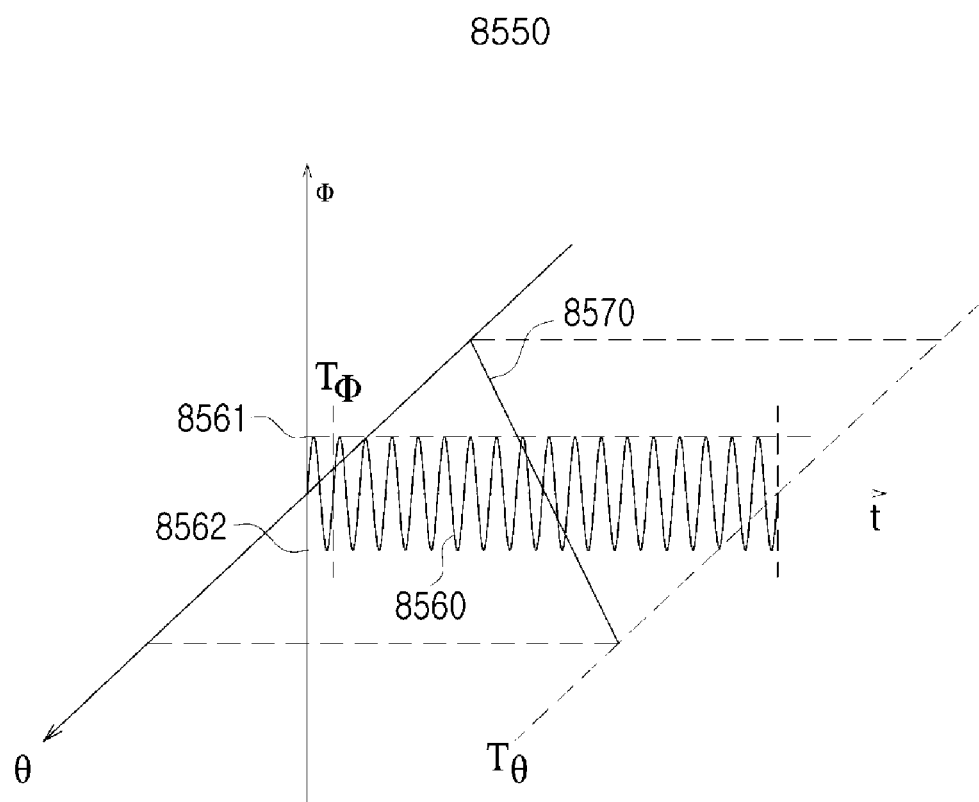
FIG. 37 is a view illustrating a scan pattern of the lidar device in a graph according to each component and time according to yet another embodiment.

FIG. 37 is a view illustrating a scan pattern of the lidar device in a graph according to each component and time according to yet another embodiment. Referring to FIG. 37, a scan pattern 8550 of the lidar device according to an embodiment may have vertical patterns 8560 and horizontal patterns 8570, and in the vertical patterns 8560, a degree of change in a direction of laser light irradiated from the lidar device over time may change. For example, as illustrated in FIG. 37, the vertical pattern 8560 may have a sinusoidal speed. Although not illustrated in FIG. 37, in the vertical pattern 8560, a speed around a maximum value 8561 and a minimum value 8562 of the vertical pattern may be higher than a speed around an intermediate value of the vertical pattern.

7.1.2.5 Lidar Device in which Initial Position of Vertical Pattern Changes According to Cycle of Horizontal Pattern The lidar device according to an embodiment may have a scan pattern in which an initial position of a vertical pattern changes according to a cycle of a horizontal pattern. In this case, the initial position of the vertical pattern may refer to a vertical component of a direction in which laser light is irradiated at a time point at which the horizontal pattern starts. For example, when a time point at which a first cycle of the horizontal pattern starts is t1, at the time point t1, a horizontal component of the direction in which laser light is irradiated may be $-FOV(H)/2$, and a vertical component thereof may be $+FOV(V)/2$. Also, when a time point at which a second cycle of the horizontal pattern starts is t2, at the time point t2, a horizontal component of the direction in which laser light is irradiated may be $-FOV(H)/2$, and a vertical component thereof may be $+FOV(V)/4$.

In addition, while the same portion is scanned twice during two cycles of the horizontal pattern when the lidar device, in which an initial position of the vertical pattern does not change according to a cycle of the horizontal pattern, sets the two cycles of the horizontal pattern as one frame, different portions are continuously scanned during two cycles of the horizontal pattern when the lidar device in which an initial position of the vertical pattern changes according to a cycle of the horizontal pattern sets the two cycles of the horizontal pattern as one frame. Therefore, in comparison to the lidar device in which the initial position of the vertical pattern does not change according to the cycle of the horizontal pattern, the lidar device in which the initial position of the vertical pattern changes according to the cycle of the horizontal pattern may have a higher resolution.

Figure 38:
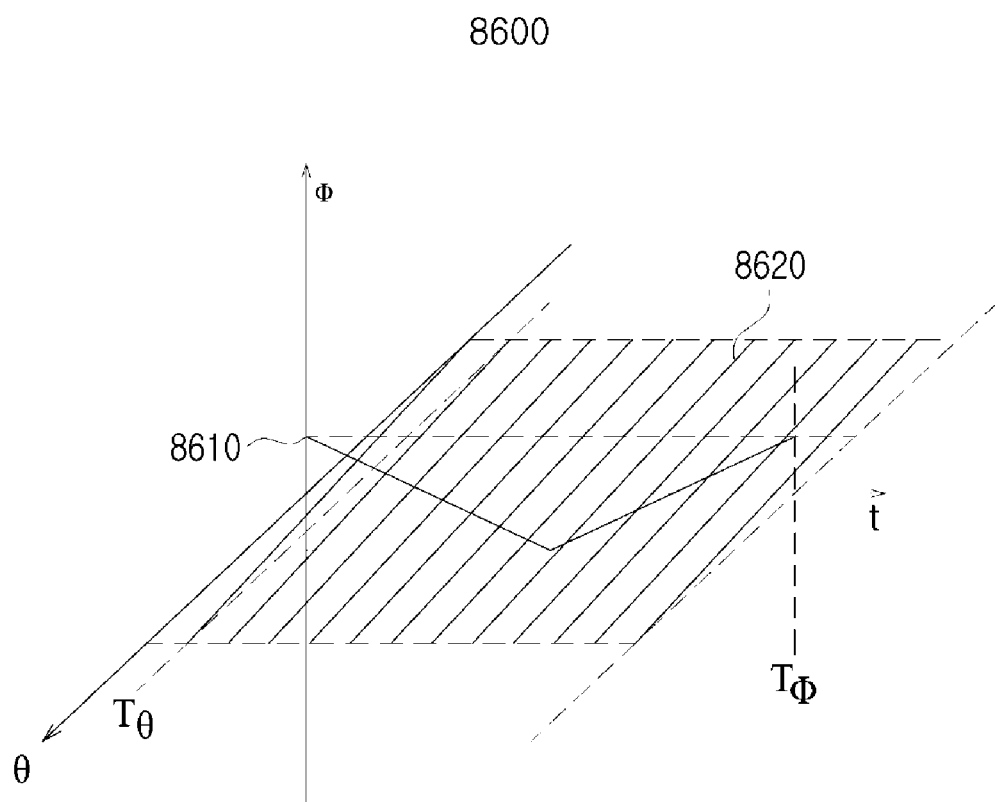
FIG. 38 is a view illustrating a scan pattern of the lidar device in a graph according to each component and time according to yet another embodiment.

7.1.3 Lidar Device Having Scan Pattern in which Cycle of Horizontal Pattern is Shorter than Cycle of Vertical Pattern FIG. 38 is a view illustrating a scan pattern of the lidar device in a graph according to each component and time according to yet another embodiment.

Referring to FIG. 38, a scan pattern 8600 of the lidar device according to an embodiment may include vertical patterns 8610 and horizontal patterns 8620, and a cycle $T_\theta$ of the horizontal pattern 8620 may be shorter than a cycle $T_\phi$ of the vertical pattern 8610. Also, the lidar device may have a cycle T at which the scan pattern 8600 represented by the vertical patterns 8610 and the horizontal patterns 8620 is repeated and may have the cycle at which the scan pattern is repeated as one frame.

Figure 39:
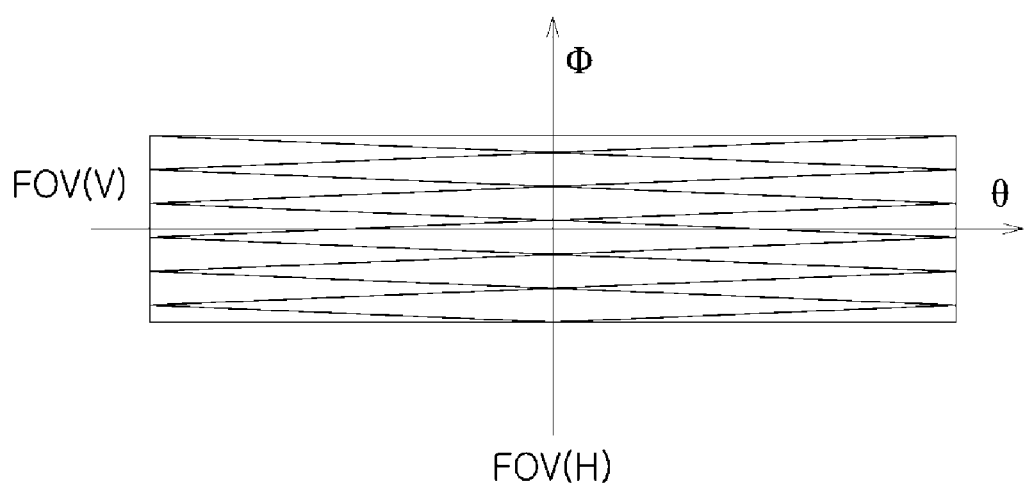
FIG. 39 is a view illustrating a scan pattern of the lidar device in a graph according to yet another embodiment.

For example, FIG. 39 is a view illustrating a scan pattern of the lidar device according to FIG. 38 in a graph according to an embodiment. Specifically, FIG. 39 illustrates the scan pattern 8600 during one cycle $T_\phi$ in a graph. When the cycle of the vertical pattern is longer than the cycle of the horizontal pattern, the cycle of the vertical pattern may be the same as the cycle at which the scan pattern is repeated. Also, the scan pattern may be repeated on the basis of a two-cycle interval of the vertical pattern, and in this case, two cycles of the vertical pattern may be the same as the cycle at which the scan pattern is repeated.

Figure 40:
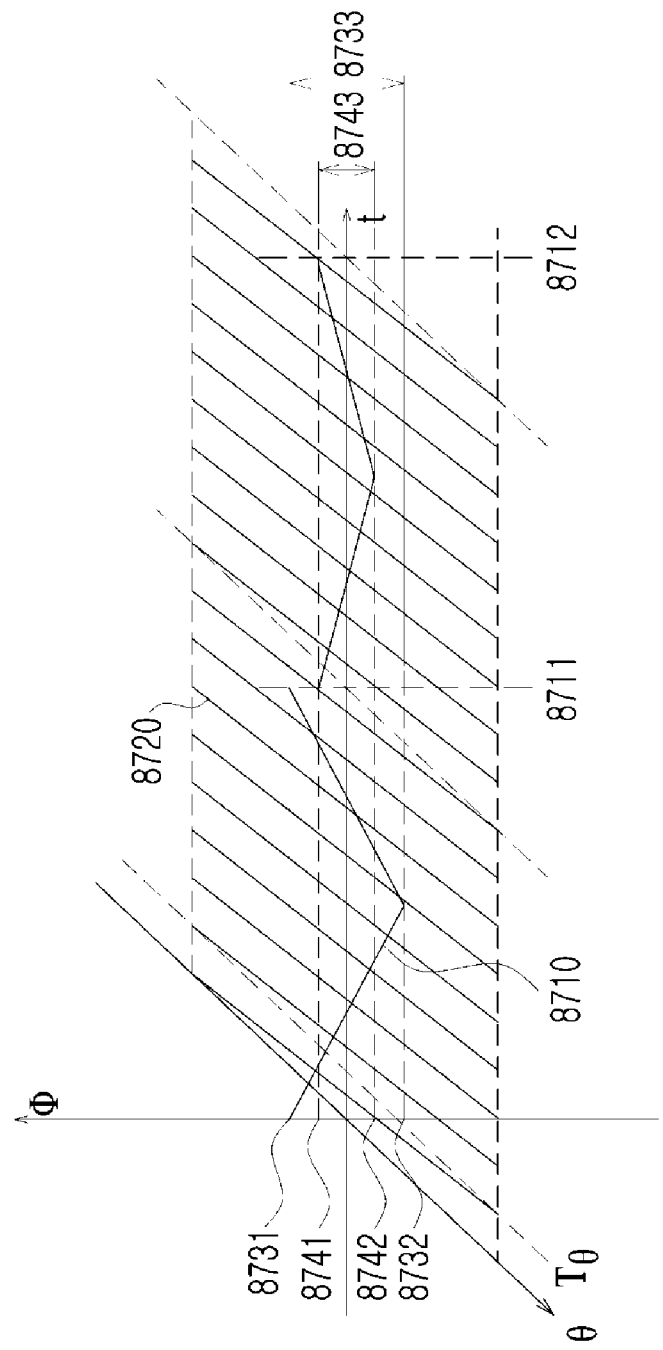
FIG. 40 is a graph illustrating a scan pattern of the lidar device in a graph according to each component and time according to yet another embodiment.

7.1.3.1 Lidar Device Having Scan Pattern in which FOV (V) Changes According to Cycle of Vertical Pattern FIG. 40 is a graph illustrating a scan pattern of the lidar device in a graph according to each component and time according to yet another embodiment.

Referring to FIG. 40, a scan pattern of the lidar device according to an embodiment may have a vertical pattern 8710 and a horizontal pattern 8720, and the FOV(V) may change according to each cycle of the vertical patterns 8710. Specifically, a scan pattern 8700 of the lidar device may include a first vertical pattern and a second vertical pattern. Although the first vertical pattern and the second vertical pattern may have the same cycle value in the scan pattern 8700 of the lidar device as illustrated in FIG. 40, embodiments are not limited thereto, and the first vertical pattern and the second vertical pattern may also have different cycle values.

In addition, a maximum value 8731 and a minimum value 8732 of a vertical pattern 8710 generated during a first vertical pattern cycle 8711 of the scan pattern 8700 of the lidar device may be different from a maximum value 8741 and a minimum value 8742 of the vertical pattern 8710 generated during a second vertical pattern cycle 8712. For example, a difference 8743 between the maximum value 8741 and the minimum value 8742 of the vertical pattern 8710 generated during the second vertical pattern cycle 8712 may be less than a difference 8733 between the maximum value 8731 and the minimum value 8732 of the vertical pattern 8710 generated during the first vertical pattern cycle 8711. In this case, when the first vertical pattern cycle 8711 is referred to as a first frame, and the second vertical pattern cycle 8712 is referred to as a second frame, the FOV(V) of the second frame may be smaller than the FOV(V) of the first frame. A decrease in the FOV of the lidar device while other factors that determine the operation of the lidar device are kept unchanged may mean that a field scannable by the lidar device is reduced, which allows denser scanning to be performed in a narrow region such that a resolution of the lidar device is increased.

In addition, in the scan pattern 8700 of the lidar device, the FOV(V) may be different for each cycle of the vertical pattern, the FOV(V) may be different for each two-cycle interval of the vertical pattern, the FOV(V) may be different for each cycle of the vertical pattern, or the FOV(V) may be repeated ever four-cycle interval of the vertical pattern, but embodiments are not limited thereto, and this may change fluidly as necessary.

Figure 41:
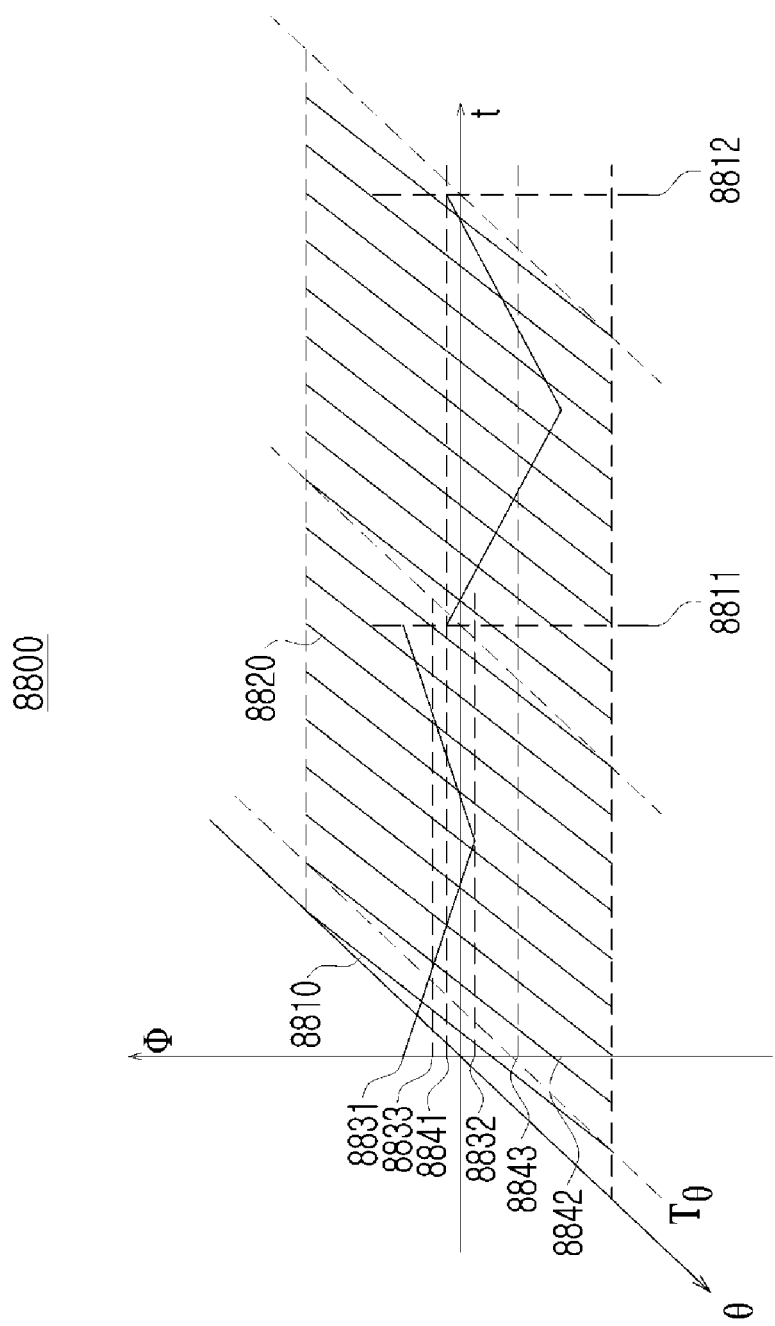
FIG. 41 is a view illustrating a scan pattern of the lidar device in a graph according to each component and time according to yet another embodiment.

7.1.3.2 Lidar Device Having Scan Pattern in which Intermediate Value of Vertical Pattern Changes According to Cycle of Vertical Pattern FIG. 41 is a view illustrating a scan pattern of the lidar device in a graph according to each component and time according to yet another embodiment.

Referring to FIG. 41, a scan pattern 8800 of the lidar device according to an embodiment may include vertical patterns 8810 and horizontal patterns 8820, and intermediate values 8833 and 8843 of the vertical patterns 8810 may change according to cycles 8811 and 8812 of the vertical patterns 8810. In this case, the intermediate values 8833 and 8843 of the vertical patterns 8810 may refer to intermediate values of maximum values 8831 and 8841 and minimum values 8832 and 8842 of the vertical patterns 8810.

As illustrated in FIG. 41, the vertical patterns 8810 may include a first vertical pattern cycle 8811 and a second vertical pattern cycle 8812. Also, the vertical patterns 8810 may include a first intermediate value 8833, which is an intermediate value of a vertical pattern generated during the first vertical pattern cycle 8811, and a second intermediate value 8843, which is an intermediate value of a vertical pattern generated during the second vertical pattern cycle 8812. In this case, the first intermediate value 8833 may be greater than the second intermediate value 8843, but embodiments are not limited thereto, and the first intermediate value 8833 may also be less than the second intermediate value 8843.

In addition, the minimum value 8832 of the vertical pattern 8810 generated during the first vertical pattern cycle 8811 may be less than the maximum value 8841 of the vertical pattern 8810 generated during the second vertical pattern cycle 8812, but embodiments are not limited thereto, and the minimum value 8832 of the vertical pattern 8810 generated during the first vertical pattern cycle 8811 may also be greater than the maximum value 8841 of the vertical pattern 8810 generated during the second vertical pattern cycle 8812.

Figure 42:
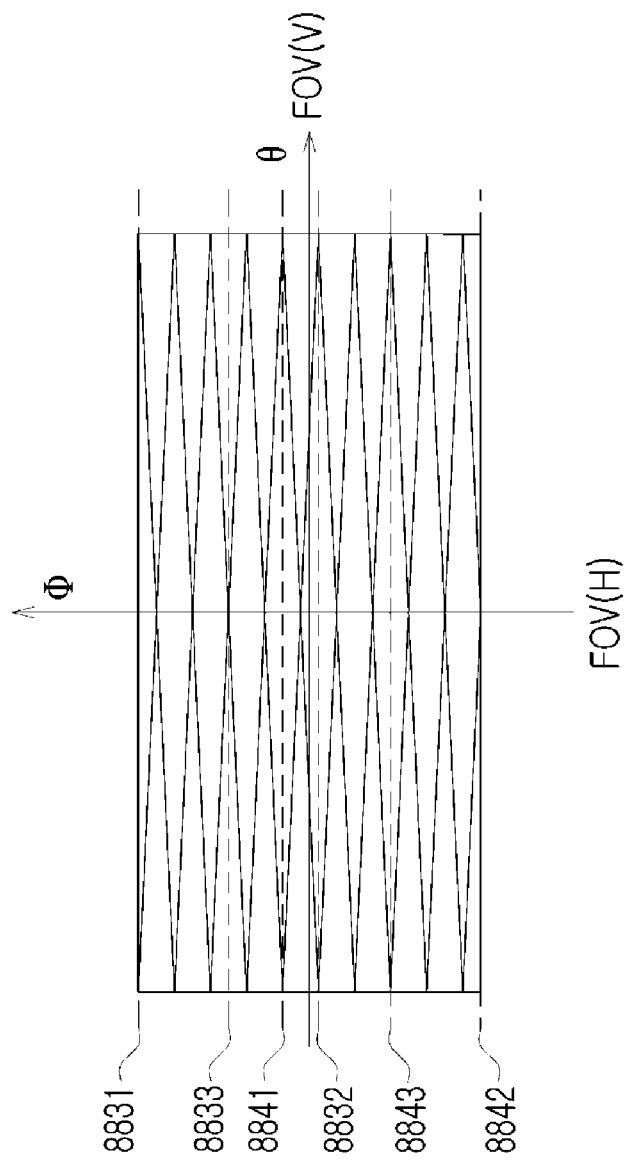
FIG. 42 is a view illustrating a scan pattern of the lidar device in a graph according to yet another embodiment.

FIG. 42 is a view illustrating a scan pattern of the lidar device according to FIG. 41 in a graph according to an embodiment. Referring to FIG. 42, the lidar device according to an embodiment may have the first vertical pattern cycle 8811 and the second vertical pattern cycle 8812 as one frame. In this case, as illustrated in FIG. 42, the lidar device may scan more of an intermediate portion in the vertical direction during one frame.

In addition, the FOV(V) of one frame of the lidar device may be a difference between the maximum value of the vertical pattern generated during the first vertical pattern cycle and the minimum value of the vertical pattern generated during the second vertical pattern cycle.

Therefore, in comparison to the lidar device generating one frame during the same amount of time, the lidar device may scan more of the intermediate portion in the vertical direction during one frame.

The lidar device is a device for obtaining information on a distance from an object included within a scan field using laser light and generates scan points using laser light. Therefore, the number of scan points that the lidar device may generate during a predetermined amount of time may be limited. Therefore, in the case of the lidar device used for an autonomous driving vehicle or the like, scanning more of a significant portion with the same number of scan points may be important, and in the case of the lidar device having the scan patterns illustrated in FIGS. 41 and 42, it is possible to scan more of a significant portion during the same amount of time.

7.2 Lidar Device Including Nodding Mirror and Rotating Polygon Mirror

Referring back to FIG. 4, the lidar device according to an embodiment may include the laser light emitting unit, the nodding mirror, the rotating polygon mirror, and the sensor. Also, the lidar device may generate a scan pattern.

Since the laser light emitting unit 110 and the sensor 130 have been described above with reference to FIGS. 1 and 2, detailed description on the laser light emitting unit 110 and the sensor 130 will be omitted below.

The nodding mirror 122 may be an implementation of the above-described first scanner 121. The nodding mirror 122 may nod within a preset angle range about one axis or may also nod within preset angle ranges about two axes. In this case, the nodding mirror may generate the scan pattern. Specifically, the scan pattern may include a horizontal pattern and a vertical pattern, and the nodding mirror may generate the vertical pattern.

In addition, the rotating polygon mirror 127 may be an implementation of the above-described second scanner 126. The rotating polygon mirror 127 may rotate about one axis. In this case, the rotating polygon mirror may generate the scan pattern. Specifically, the rotating polygon mirror may generate the horizontal scan pattern.

In addition, the horizontal pattern and the vertical pattern may include a cycle at which each pattern is repeated and may include a maximum value and a minimum value. In this case, the cycle, maximum value, and minimum value of the vertical pattern may be set by the nodding mirror, and the cycle, maximum value, and minimum value of the horizontal pattern may be set by the rotating polygon mirror.

In addition, the lidar device may generate the scan patterns illustrated in FIGS. 28 and 29. Specifically, for the lidar device to generate the scan pattern in which the cycle of the vertical pattern is shorter than the cycle of the horizontal pattern, the nodding speed of the nodding mirror may be higher than the rotating speed of the rotating polygon mirror. Also, in this case, even when a slope of a reflective surface of the rotating polygon mirror is not constant in a process of manufacturing the rotating polygon mirror, an influence thereof on the scanning accuracy of the lidar device may be small. Specifically, when the nodding speed of the nodding mirror is higher than the rotating speed of the rotating polygon mirror by a predetermined level or more, time during which the rotating polygon mirror rotates at an angle forming one surface of the rotating polygon mirror may be set as one frame, and therefore, even when there is an error in the slope of each reflective surface of the rotating polygon mirror, the error may be compensated for by using a plurality of frames.

In addition, the lidar device may generate the scan pattern illustrated in FIG. 31. Specifically, for the lidar device to generate the scan pattern including time during which the scan pattern is not generated between the vertical patterns, the laser light emitting unit may have time during which the laser light emitting unit does not output laser light, or the nodding mirror may have time during which the nodding mirror reflects laser light to the inside of the lidar device.

In addition, for the lidar device to generate the scan pattern including time during which the scan pattern is not generated between the horizontal patterns, the laser light output unit may have time during which the laser light emitting unit does not output laser light, or the nodding mirror may have time during which the nodding mirror reflects laser light to the inside of the lidar device.

In addition, the lidar device may generate the scan pattern illustrated in FIG. 32. Specifically, for the lidar device to generate the scan pattern in which the FOV(V) changes according to each cycle of the horizontal pattern, the nodding angle of the nodding mirror may change on the basis of a rotating angle of the rotating polygon mirror. For example, when the rotating polygon mirror has four reflective surfaces, the nodding angle of the nodding mirror may change every 360/n° rotation of the rotating polygon mirror. Specifically, the nodding angle of the nodding mirror may be 10° during a 360/n° rotation of the rotating polygon mirror and may be 5° during the next 360/n° rotation of the rotating polygon mirror.

In addition, the lidar device may generate the scan pattern illustrated in FIGS. 33 and 34. Specifically, for the lidar device to generate the scan pattern in which the intermediate value of the vertical pattern changes according to the cycle of the horizontal pattern, slopes of the reflective surfaces of the rotating polygon mirror may be different from each other.

Figure 43:
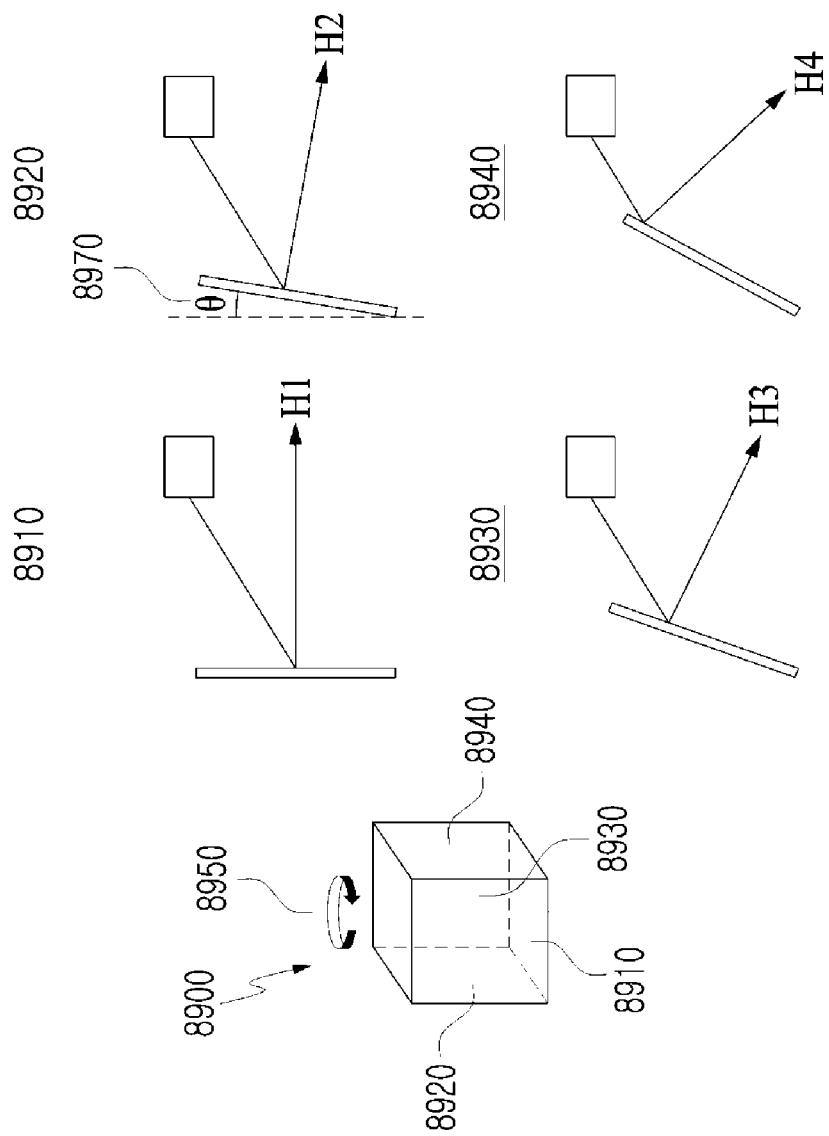
FIG. 43 is a view related to a rotating polygon mirror of the lidar device according to an embodiment.

For example, FIG. 43 is a view related to a rotating polygon mirror of the lidar device according to an embodiment, and referring to FIG. 43, a rotating polygon mirror 8900 of the lidar device according to an embodiment includes a rotating shaft 8950 and a plurality of reflective surfaces 8910, 8920, 8930, and 8940. Also, the plurality of reflective surfaces 8910, 8920, 8930, and 8940 may be tilted at different angles about the rotating shaft 8950. Also, in this case, an intermediate value of the vertical pattern may change according to degrees at which the reflective surfaces 8910, 8920, 8930, and 8940 of the rotating polygon mirror 8900 are tilted. Specifically, a first surface 8910 of the rotating polygon mirror is tilted at a first angle about the rotating shaft, and a second surface 8920 of the rotating polygon mirror is tilted at a second angle 8970 about the rotating shaft. In this case, an intermediate value of a vertical pattern generated by the first surface 8910 may be determined according to the first angle, and an intermediate value of a vertical pattern generated by the second surface 8920 may be determined according to the second angle 8970.

In addition, the lidar device may generate the scan pattern illustrated in FIGS. 35 and 36. Specifically, for the lidar device to generate the scan pattern in which a degree of change in the direction of laser light irradiated from the lidar device over time changes, the nodding speed of the nodding mirror may not be constant according to the nodding angle, and the rotating speed of the rotating polygon mirror may not be constant according to the rotating angle.

For example, the rotating speed of the rotating polygon mirror may change for the speed of the horizontal pattern to change, and the nodding speed of the nodding mirror may have a sinusoidal form for the speed of the vertical pattern to change sinusoidally.

In addition, the lidar device may generate the scan pattern illustrated in FIGS. 38 and 39. Specifically, for the lidar device to generate the scan pattern in which the cycle of the horizontal pattern is shorter than the cycle of the vertical pattern, the rotating speed of the rotating polygon mirror may be higher than the nodding speed of the nodding mirror.

In addition, the lidar device may generate the scan pattern illustrated in FIG. 40. Specifically, for the lidar device to generate the scan pattern in which the FOV(V) changes according to each cycle of the vertical pattern, the nodding angle of the nodding mirror may change every time the nodding mirror nods. For example, the nodding angle of the nodding mirror may be 10° when the nodding mirror nods for an $n^{th}$ time and may be 5° when the nodding mirror nods for an $(n+1)^{th}$ time.

In addition, the lidar device may generate the scan pattern illustrated in FIGS. 41 and 42. Specifically, for the lidar device to generate the scan pattern in which the intermediate value of the vertical pattern changes according to the vertical pattern cycle, the maximum value and the minimum value of the nodding angle of the nodding mirror may change. For example, when a maximum value of the first vertical pattern is referred to as a first maximum value, a minimum value of the first vertical pattern is referred to as a first minimum value, a maximum value of the second vertical pattern is referred to as a second maximum value, and a minimum value of the second vertical pattern is referred to as a second minimum value, the nodding mirror may having nodding angles such that the nodding mirror nods from the first maximum value to the first minimum value, nods from the first minimum value to the second maximum value, nods from the second maximum value to the second minimum value, and nods from the second minimum value to the first maximum value.

The method according to an embodiment may be implemented in the form of a program command that is executable by various computer means and be recorded in a computer readable recording medium. The computer readable recording medium may include a program command, a data file, a data structure, and the like alone or in combination. The program command recorded in the medium may be a program command particularly designed for the embodiment or a program command which is known by one of ordinary skill in the computer software art and usable. Examples of the computer readable recording medium include hardware devices particularly configured to store and execute program commands such as magnetic media such as a hard disk, a floppy disk, and a magnetic tape, optical media such as a compact disk read-only memory (CD-ROM) and a digital versatile disk (DVD), magneto-optical media such as a floptical disk, and semiconductor storage devices such as a ROM, a random access memory (RAM), and a flash memory. Examples of the program command include high-level language codes that are computer-executable by using an interpreter and the like as well as machine language codes such as those formed by a compiler. The above-mentioned hardware device may be configured to serve as one or more software modules to execute operations of the embodiment, and vice versa.

Although embodiments of the present disclosure have been described above using limited embodiments and drawings, one of ordinary skill in the art should be capable of modifying and changing the above-described embodiments in various ways. For example, the above-described techniques may be performed in a different order from the above-described method, and/or the above-described elements such as a system, a structure, a device, and a circuit may be coupled or combined in a different form from the above-described method, or suitable results may be achieved even when the elements are replaced or substituted with other elements or their equivalents.

Therefore, other implementations, embodiments, and equivalents of the appended claims also belong to the scope of the claims below.

What is claimed is:

1. A light detection and ranging (lidar) device which measures for measuring a distance using a laser comprising:
    a laser emitter configured to emit a laser;
    a nodding mirror configured to nod about a first axis, wherein the nodding mirror includes a reflective surface configured to reflect the laser emitted from the laser emitter, wherein a size of the reflective surface is less than or equal to a maximum diameter of the laser;
    a rotating polygon mirror configured to rotate about a second axis perpendicular to the first axis, wherein the rotating polygon mirror includes a plurality of reflective surfaces each configured to reflect the laser reflected from the nodding mirror, and wherein a size of each of the plurality of reflective surfaces is greater than the maximum diameter of the laser; and
    a sensor configured to detect a laser reflected from an object;
    wherein the lidar device further comprises an irradiation portion configured to irradiate an irradiation laser toward the object based on the laser reflected by the rotating polygon mirror,
    wherein the lidar device has a first field of view defined in a horizontal direction and a second field of view defined in a vertical direction, the first field of view being greater than the second field of view,
    wherein an intensity of the irradiation laser is configured to vary with a direction of the irradiation laser,
    wherein a first variation in intensity resulting from a change in the vertical direction of the irradiation laser is greater than a second variation in intensity resulting from a change in the horizontal direction of the irradiation laser, and
    wherein the laser emitter, the nodding mirror and the rotating polygon mirror are arranged such that:
    (i) the laser emitted from the laser is reflected from the rotating polygon mirror after being reflected from the nodding mirror,
    (ii) a horizontal component of the direction of the irradiation laser is changed by the rotating polygon mirror,
    (iii) a vertical component of the direction of the irradiation laser is changed by the nodding mirror, and
    (iv) as the vertical component of the direction of the irradiation laser increases, the intensity of the irradiation laser increases, while an intensity of the laser emitted from the laser emitter is maintained the same.

2. The lidar device of claim 1, wherein an angle (a) between the reflective surface in an offset state of the nodding mirror and the laser emitted to the nodding mirror is determined by an equation sin(a−b/2)/sin(a+b/2)>=(95)/100, so that a difference between an amount of laser reflected from the nodding mirror in a first state in which the nodding mirror nods at an angle of (−b/2) from the offset state and an amount of laser reflected from the nodding mirror in a second state in which the nodding mirror nods at an angle (+b/2) from the offset state is less than or equal to 5% of an amount of laser reflected from the nodding mirror in the second state, and
    wherein the nodding mirror is configured to nod within a preset angle range between the angle (−b/2) and the angle (+b/2) from the offset state.

3. The lidar device of claim 2, wherein the angle (a) is less than (90−b/2).

4. The lidar device of claim 1, wherein an angle (a) between the reflective surface in an offset state of the nodding mirror and the laser emitted to the nodding mirror is determined by an equation sin(a−b/2)/sin(a+b/2)=<(85)/100, so that a difference between an amount of laser reflected from the nodding mirror in a first state in which the nodding mirror nods at an angle of (−b/2) from the offset state and an amount of laser reflected from the nodding mirror in a second state in which the nodding mirror nods at an angle (+b/2) from the offset state is greater than or equal to 15% of an amount of laser reflected from the nodding mirror in the second state, and
    wherein the nodding mirror is configured to nod within a preset angle range between the angle (−b/2) and the angle (+b/2) from the offset state.

5. The lidar device of claim 1, wherein the nodding mirror is configured to nod within a preset angle range, and wherein the preset angle range of the nodding mirror is changed on the basis of a speed of a moving object in which the lidar device is disposed.

6. The lidar device of claim 1, wherein the nodding mirror is configured to nod within a preset angle range, and wherein the preset angle range of the nodding mirror is changed on the basis of one frame of the lidar device.

7. The lidar device of claim 1, wherein the irradiation portion is configured to irradiate a first irradiation laser at a first time in which the nodding mirror is in a first state, and irradiate a second irradiation laser at a second time in which the nodding mirror is in a second state,
    wherein the first state represents a state that the nodding mirror nods at an angle (+x) from an offset state of the nodding mirror,
    wherein the second state represents a state that the nodding mirror nods at an angle (−x) from the offset state of the nodding mirror,
    wherein the first irradiate laser is reflected from a first point and detected by the sensor, and the second irradiate laser is reflected from a second point and detected by the sensor,
    wherein a vertical position of the first point is greater than a vertical position of the second point, and
    wherein a distance between the first point and the lidar device is greater than a distance between the second point and the lidar device.

8. The lidar device of claim 1, wherein the irradiation portion is configured to irradiate a first irradiation laser at a first time in which the nodding mirror is in a first state, and irradiate a second irradiation laser at a second time in which the nodding mirror is in a second state,
  wherein the first state represents a state that the nodding mirror nods at an angle (+x) from an offset state of the nodding mirror,
  wherein the second state represents a state that the nodding mirror nods at an angle (−x) from the offset state of the nodding mirror,
  wherein the first laser is reflected from a first point and detected by the sensor, and the second laser is reflected from a second point and detected by the sensor,
  wherein a vertical position of the first point is less than a vertical position of the second point, and
  wherein a distance between the first point and the lidar device is greater than a distance between the second point and the lidar device.

9. The lidar device of claim 1, wherein the irradiation portion is configured to irradiate a first irradiation laser at a first time in which the nodding mirror is in a first state to reflect a first emitted laser emitted from the laser emitter, and a second irradiation laser at a second time in which the nodding mirror is in a second state to reflect a second emitted laser emitted from the laser emitter,
  wherein a vertical component of a direction of the first irradiation laser is greater than a vertical component of a direction of the second irradiation laser, and
  wherein an intensity of the first irradiation laser is greater than an intensity of the second irradiation laser despite that an intensity of the first emitted laser is the same as an intensity of the second emitted laser.

10. The lidar device of claim 1, wherein the plurality of reflective surfaces of the rotating polygon mirror are configured to form different angles with respect to a rotating shaft of the rotating polygon mirror.

11. The lidar device of claim 1, wherein the size of the reflective surface is a diameter when the nodding mirror is circular, a long diameter when the nodding mirror is elliptical, a length of a long side when the nodding mirror is rectangular, and a length of a side when the nodding mirror is square.

12. The lidar device of claim 1, wherein each of the plurality of reflective surfaces of the rotating polygon mirror comprises the irradiation portion.

* * * * *

UNITED STATES PATENT AND TRADEMARK OFFICE
CERTIFICATE OF CORRECTION

PATENT NO. : 11,808,889 B2
APPLICATION NO. : 16/709729
DATED : November 7, 2023
INVENTOR(S) : Ji Seong Jeong It is certified that error appears in the above-identified patent and that said Letters Patent is hereby corrected as shown below:

In the Specification

Column 3, Line 3, delete "laser" and insert -- laser. --.

Column 6, Line 62, delete "embodiment." and insert -- embodiment; --.

Column 9, Line 52, delete "objet" and insert -- object --.

Column 9, Line 64, delete "path" and insert -- path. --.

Column 33, Line 23, delete "embodiment" and insert -- embodiment. --.

Column 46, Line 27, delete "measureable" and insert -- measurable --.

Column 57, Line 26, delete "$T_\theta as$" and insert -- $T_\theta$ as --.

In the Claims

Column 63, Line 25, Claim 1, delete "ranging_(lidar)" and insert -- ranging (lidar) --.

Column 63, Line 25-26, Claim 1, after "device" delete "which measures".

Signed and Sealed this
Thirtieth Day of January, 2024

Katherine Kelly Vidal
*Director of the United States Patent and Trademark Office*